(12) United States Patent
Dicken et al.

(10) Patent No.: US 11,806,624 B2
(45) Date of Patent: Nov. 7, 2023

(54) ON DEVICE GAME ENGINE ARCHITECTURE

(71) Applicant: Zynga Inc., San Francisco, CA (US)

(72) Inventors: Luke Dicken, San Francisco, CA (US); Johnathan Pagnutti, San Francisco, CA (US); Yang Wen, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 16/948,502

(22) Filed: Sep. 21, 2020

(65) Prior Publication Data

US 2022/0088483 A1    Mar. 24, 2022

(51) Int. Cl.
| | |
|---|---|
| *A63F 13/00* | (2014.01) |
| *A63F 13/67* | (2014.01) |
| *A63F 13/355* | (2014.01) |
| *A63F 13/45* | (2014.01) |
| *A63F 13/79* | (2014.01) |

(52) U.S. Cl.
CPC ............ *A63F 13/67* (2014.09); *A63F 13/355* (2014.09); *A63F 13/45* (2014.09); *A63F 13/79* (2014.09)

(58) Field of Classification Search
CPC ............. G07F 17/3262; G07F 17/3225; G07F 17/3237; G07F 17/3241
See application file for complete search history.

(56) References Cited

U.S. PATENT DOCUMENTS

| | | | |
|---|---|---|---|
| 6,099,408 A | 8/2000 | Schneier et al. | |
| 9,044,675 B2 * | 6/2015 | Stafford | A63F 13/67 |
| 9,498,704 B1 | 11/2016 | Cohen et al. | |
| 10,105,603 B2 | 10/2018 | Bucher et al. | |
| 10,105,608 B1 | 10/2018 | George et al. | |
| 10,237,615 B1 | 3/2019 | Gudmundsson et al. | |
| 10,293,260 B1 | 5/2019 | Evans et al. | |
| 10,387,514 B1 | 8/2019 | Yang et al. | |
| 10,556,182 B2 | 2/2020 | Ntoulas et al. | |
| 10,946,281 B2 | 3/2021 | Fear et al. | |

(Continued)

OTHER PUBLICATIONS

"U.S. Appl. No. 16/948,496, Non Final Office Action dated Aug. 16, 2021", 8 pages.

(Continued)

*Primary Examiner* — David L Lewis
*Assistant Examiner* — Eric M Thomas
(74) *Attorney, Agent, or Firm* — Schwegman Lundberg & Woessner, P.A.

(57) ABSTRACT

A game server receives data associated with gameplay of one or more user accounts, the one or more user accounts being used for playing a designated game. The game server computes, for the one or more user accounts, a player model representing previous in-game behavior of the one or more user accounts. The game server identifies, based on the player model, configuration values for the designated game. The configuration values represent data to specify operation of the designated game. The configuration values represent at least one of a game mechanics configuration and a game parameter configuration. The game server causes transmission of the configuration values to a client device. The configuration values cause the client device to adjust a game engine at the client device based on the previous in-game behavior of the one or more user accounts.

18 Claims, 40 Drawing Sheets

(56) References Cited

U.S. PATENT DOCUMENTS

| | | | |
|---|---|---|---|
| 11,291,915 | B1 | 4/2022 | Dicken et al. |
| 11,318,386 | B2 | 5/2022 | Dicken et al. |
| 11,420,115 | B2 | 8/2022 | Dicken et al. |
| 11,465,052 | B2 | 10/2022 | Dicken et al. |
| 11,565,182 | B2 | 1/2023 | Dicken et al. |
| 2002/0178212 | A1 | 11/2002 | Sirhall |
| 2006/0246973 | A1 | 11/2006 | Thomas et al. |
| 2007/0054717 | A1 | 3/2007 | Youm et al. |
| 2007/0066403 | A1 | 3/2007 | Conkwright |
| 2008/0096668 | A1 | 4/2008 | Yoshioka |
| 2008/0162268 | A1 | 7/2008 | Gilbert |
| 2011/0300847 | A1 | 12/2011 | Quy |
| 2012/0109956 | A1 | 5/2012 | Ramaiyer et al. |
| 2012/0123570 | A1 | 5/2012 | Guinn |
| 2012/0317064 | A1 | 12/2012 | Hagiwara et al. |
| 2013/0184070 | A1 | 7/2013 | Gadher et al. |
| 2013/0310156 | A1 | 11/2013 | Gadher et al. |
| 2013/0324209 | A1 | 12/2013 | Kishimoto et al. |
| 2014/0089399 | A1 | 3/2014 | Chun et al. |
| 2014/0324749 | A1 | 10/2014 | Peters et al. |
| 2015/0174493 | A1 | 6/2015 | Stauffer et al. |
| 2015/0230756 | A1 | 8/2015 | Luna et al. |
| 2015/0273340 | A1 | 10/2015 | Cudak et al. |
| 2016/0067611 | A1* | 3/2016 | Ware .................. A63F 13/79 463/29 |
| 2016/0067612 | A1* | 3/2016 | Ntoulas .................. A63F 13/87 463/29 |
| 2016/0256784 | A1 | 9/2016 | Schultz et al. |
| 2017/0100674 | A1 | 4/2017 | Ntoulas et al. |
| 2017/0169656 | A1* | 6/2017 | Froy, Jr. .................. G07F 9/009 |
| 2018/0001205 | A1 | 1/2018 | Osman et al. |
| 2018/0361253 | A1 | 12/2018 | Grosso |
| 2019/0091576 | A1 | 3/2019 | Taylor et al. |
| 2019/0171957 | A1 | 6/2019 | Yang et al. |
| 2019/0388787 | A1 | 12/2019 | Padmanabhan et al. |
| 2020/0168045 | A1 | 5/2020 | Idris |
| 2020/0206631 | A1 | 7/2020 | Sumant et al. |
| 2020/0250555 | A1 | 8/2020 | Kwon et al. |
| 2020/0298118 | A1 | 9/2020 | Yannakakis et al. |
| 2021/0001229 | A1 | 1/2021 | Somers et al. |
| 2021/0027182 | A1 | 1/2021 | Harris et al. |
| 2021/0146258 | A1 | 5/2021 | Pedersen et al. |
| 2022/0088474 | A1 | 3/2022 | Dicken et al. |
| 2022/0088478 | A1 | 3/2022 | Dicken et al. |
| 2022/0088481 | A1 | 3/2022 | Dicken et al. |
| 2022/0088482 | A1 | 3/2022 | Dicken et al. |
| 2022/0088484 | A1 | 3/2022 | Dicken et al. |
| 2022/0088485 | A1 | 3/2022 | Dicken et al. |
| 2022/0088486 | A1 | 3/2022 | Dicken et al. |
| 2022/0176252 | A1 | 6/2022 | Dicken et al. |
| 2022/0226730 | A1 | 7/2022 | Dicken et al. |
| 2022/0249950 | A1 | 8/2022 | Dicken et al. |
| 2023/0054150 | A1 | 2/2023 | Dicken et al. |
| 2023/0070555 | A1 | 3/2023 | Dicken et al. |
| 2023/0076907 | A1 | 3/2023 | Dicken et al. |

OTHER PUBLICATIONS

"U.S. Appl. No. 16/948,496, Non Final Office Action dated Aug. 16, 2021", 6 pages.
"U.S. Appl. No. 16/948,497, Non Final Office Action dated Aug. 26, 2021", 6 pages.
"U.S. Appl. No. 16/948,497, Response filed Jan. 26, 2022 to Non Final Office Action dated Aug. 26, 2021", 11 pgs.
"U.S. Appl. No. 17/027,477, Non Final Office Action dated Jan. 21, 2022", 15 pages.
"U.S. Appl. No. 17/027,448, Non Final Office Action dated Sep. 10, 2021", 6 pages.
"U.S. Appl. No. 16/948,496, Response filed Nov. 8, 2021 to Non Final Office Action dated Aug. 16, 2021", 10 pages.
"U.S. Appl. No. 16/948,496, Notice of Allowance dated Nov. 23, 2021", 7 pages.
"U.S. Appl. No. 16/948,503, Response filed Dec. 16, 2021 to Non Final Office Action dated Aug. 16, 2021", 10 pages.
"U.S. Appl. No. 17/027,483, Non Final Office Action dated Dec. 21, 2021", 13 pages.
"U.S. Appl. No. 17/027,502, Notice of Allowance dated Dec. 29, 2021", 7 pages.
U.S. Appl. No. 17/680,565, filed Feb. 25, 2022, Automated Prediction of User Response States Based on Traversal Behavior.
U.S. Appl. No. 17/713,862, filed Apr. 5, 2022, Operator Interface for Automated Game Content Generation.
U.S. Appl. No. 17/730,925, filed Apr. 27, 2022, Operator Interface for Automated Game Content Generation.
"U.S. Appl. No. 17/027,448, Response filed Feb. 10, 2022 to Non Final Office Action dated Sep. 10, 2021", 11 pgs.
"U.S. Appl. No. 16/948,496, 312 Amendment filed Feb. 23, 2022", 8 pages.
"U.S. Appl. No. 16/948,503, Final Office Action dated Feb. 24, 2022".
"U.S. Appl. No. 16/948,496, Supplemental Notice of Allowability dated Mar. 3, 2022", 2 pages.
"U.S. Appl. No. 17/027,483, Response filed Mar. 21, 2022 to Non Final Office Action dated Dec. 21, 2021", 10 pgs.
"U.S. Appl. No. 17/027,502, Notice of Allowability dated Apr. 8, 2022", 2 pgs.
"U.S. Appl. No. 17/713,862, Preliminary Amendment filed Apr. 8, 2022", 10 pgs.
"U.S. Appl. No. 17/027,483, Final Office Action dated Apr. 14, 2022", 9 pgs.
"U.S. Appl. No. 17/027,448, Notice of Allowance dated Apr. 14, 2022", 5 pgs.
"U.S. Appl. No. 17/027,483, Response filed Apr. 28, 2022 to Final Office Action dated Apr. 14, 2022", 8 pgs.
"U.S. Appl. No. 16/948,497, Final Office Action dated May 12, 2022", 8 pgs.
"U.S. Appl. No. 16/948,503, Final Office Action dated Jul. 15, 2022", 10 pgs.
"U.S. Appl. No. 16/948,503, Response filed Jun. 24, 2022 to Final Office Action dated Feb. 24, 2022", 11 pgs.
"U.S. Appl. No. 17/027,448, Corrected Notice of Allowability dated Jul. 22, 2022", 2 pgs.
"U.S. Appl. No. 17/027,477, Response filed Jun. 21, 2022 to Non Final Office Action dated Jan. 21, 2022", 11 pgs.
"U.S. Appl. No. 17/027,483, Notice of Allowance dated May 13, 2022", 8 pgs.
"U.S. Appl. No. 16/948,497, Non Final Office Action dated Oct. 6, 2022", 7 pgs.
"U.S. Appl. No. 16/948,497, Response filed Sep. 12, 2022 to Final Office Action dated May 12, 2022", 11 pgs.
"U.S. Appl. No. 16/948,503, Response filed Nov. 15, 2022 to Final Office Action dated Jul. 15, 2022", 11 pgs.
"U.S. Appl. No. 17/027,477, Corrected Notice of Allowability dated Oct. 13, 2022", 2 pgs.
"U.S. Appl. No. 17/027,477, Notice of Allowance dated Sep. 23, 2022", 8 pgs.
"U.S. Appl. No. 17/875,659, Preliminary Amendment filed Nov. 8, 2022".
"U.S. Appl. No. 17/889,677, Preliminary Amendment filed Nov. 14, 2022", 9 pgs.
"U.S. Appl. No. 16/948,497, Response filed Jan. 30, 2023 to Non Final Office Action dated Oct. 6, 2022", 12 pgs.
"U.S. Appl. No. 16/948,503, Non Final Office Action dated Feb. 6, 2023", 10 pgs.
"U.S. Appl. No. 16/948,503, Response filed Feb. 28, 2023 to Non Final Office Action dated Feb. 6, 2023", 11 pgs.
"U.S. Appl. No. 17/680,565, Non Final Office Action dated Jan. 11, 2023", 6 pgs.
"U.S. Appl. No. 17/680,565, Notice of Allowance dated Mar. 16, 2023", 7 pgs.
"U.S. Appl. No. 17/680,565, Response filed Feb. 27, 2023 to Non Final Office Action dated Jan. 11, 2023", 11 pgs.
"U.S. Appl. No. 17/713,862, Notice of Allowance dated Dec. 28, 2022", 7 pgs.
"U.S. Appl. No. 17/730,925, Notice of Allowance dated Feb. 1, 2023", 7 pgs.

(56) References Cited

OTHER PUBLICATIONS

"U.S. Appl. No. 16/948,497, Notice of Allowance dated Apr. 3, 2023", 7 pgs.

"U.S. Appl. No. 17/985,637, Examiner Interview Summary dated Apr. 6, 2023", 3 pgs.

\* cited by examiner

```
{
    "eTID":"e_rules_boogle_default",
    "inherits":"e_base_rules",
    "components":
    {
        "ruleset":{
            "rules":[
                {
                    "name":"toggleSelect",
                    "type":"UserAction",
                    "description":"Selecting a Tile causes it to be selected or deslected"
                    "definitions":"",
                    "preconditions":"isTile this; isAdjacentLastSelected this ;",
                    "effects":"toggleSelect this; invalidate selected; incrementCounter cli
                },
                {
                    "name":"checkSpelling",
                    "type":"EngineAction",
                    "description":"Validates spelling of selected words",
                    "definitions":"",
                    "preconditions":"isGameState this; ! isValid this; isWord selected; ! a
                    "effects":"validate selected;"
                },
                {
                    "name":"submit",
                    "type":"UserAction",
                    "description":"Submits a correctly spelled word",
                    "definitions":"",
                    "preconditions":"isWord selected; ! alreadySpelled selected ;",
                    "effects":"incrementCounter wordCounter 1; score selected; invalidate s
                    "failEffects":"toggleSelect selected ;"
                },
                {
                    "name":"gameOver",
                    "type":"EngineAction",
                    "description":"Ends the game",
                    "definitions":"",
                    "preconditions":"checkCounter time_remaining == 0;",
                    "effects":"setCounter level.won 1; gameOver this;"
                }
            ]
        }
    }
}
```

```
{
  "components": {
    "level": {
      "bgImage": "",
      "entities": [{
        "name": "GNCOrb",
        "prefab": "Prefabs/LoveLetters/GNCOrb",
        "settings": {
          "symbol": "$1"
        }
      }],
      "gridLayout": [                                           ← 214
        ["S", "$1", "R", "A", "M", "M"],
        ["*", "A", "N", "_", "K", "A"],
        ["C", "D", "P", "S", "R", "S"],
        ["S", "R", "R", "S", "*", "G"],
        ["U", "P", "_", "R", "S", "T"],
        ["C", "D", "C", "K", "T", "_", "S"],
        ["K", "V", "A", "Y", "E", "G"],
        ["Z", "P", "S", "D", "S", "S"],
        ["S", "*", "T", "T", "R", "_"]
      ],
      "initialCounters": {
        "maxTime": 190,
        "targetDepth": 9
      },
      "levelName": "Level 2",
      "levelPrefab": "Prefabs/WordMagic/GameScreen",   ← 216
      "rewardThresholds": [{
        "counter": "levelScore",
        "maxOccurrences": 1,
        "rewards": {
          "e_item_coin": 10
        },
        "threshold": 20
      },
      {
        "counter": "levelScore",
        "maxOccurrences": 1,
        "rewards": {
          "e_item_coin": 10
        },
        "threshold": 65
      }],
                                                              ← 118
      "ruleSet": "e_rules_loveletters_default",
      "seeds": [...],
      "sizeX": 6,
      "sizeY": 10,
      "starThresholds": [{                                    ← 218
        "counter": "level.won",
        "threshold": 1,
        "xpEarned": 0
      },
      {
        "counter": "levelScore",
        "threshold": 20,
        "xpEarned": 1
      },
      {
        "counter": "levelScore",
        "threshold": 65,
        "xpEarned": 2
      }],
      "tickFrequency": 1,
      "generated_word_windows": [
        ["SONS", "HAP", "AYS", "RAIS", "RYA", "CYST", "LSD"],
        ["GOPK", "CRAPY", "RATS", "LSO", "ASS", "NKCH"]
      ]
    },
    "eTID": "e_level_ftue_2",
    "inherits": "e_base_level"
  },
  ...
}
```

ON DEVICE GAME ENGINE ARCHITECTURE

BACKGROUND

Computer-implemented games are very popular. A common mechanism for the provision of computer-implemented games, particularly on mobile electronic devices, is by installation and execution of a client game application (which comprises compiled software code) stored on a client device. For some device platforms, such game applications are typically available for download and update mainly from an application store that provides access to games and applications from multiple different providers. After installation of a client game application on a client device, online gameplay is typically managed and/or facilitated by a game server of a specific game provider.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2A is a screenshot of a game definition file code defining a ruleset for a simplified example game, in accordance to some examples.

FIG. 2C is a screenshot of level configuration file code, according to one example.

The headings provided herein are merely for convenience and do not necessarily affect the scope or meaning of the terms used.

DETAILED DESCRIPTION

Introductory Overview

Some aspects of this disclosure provides for a game distribution and updating mechanism in which a compiled game engine is persistently installed on a client device, while game configuration values (which are variable to customize gameplay for different players or different identified groups of players) are provided to the client device in a separate standalone data download. In some examples, the game configuration values are provided to the client device as non-compiled data that defines game rules, the appearance and/or behavior of interactive in-game objects (also referred to herein as interactive content items), and configuration of respective game levels (for example including a gameboard layout, performance targets, and experience points and/or coin rewards for respective performance targets).

Figure 1:
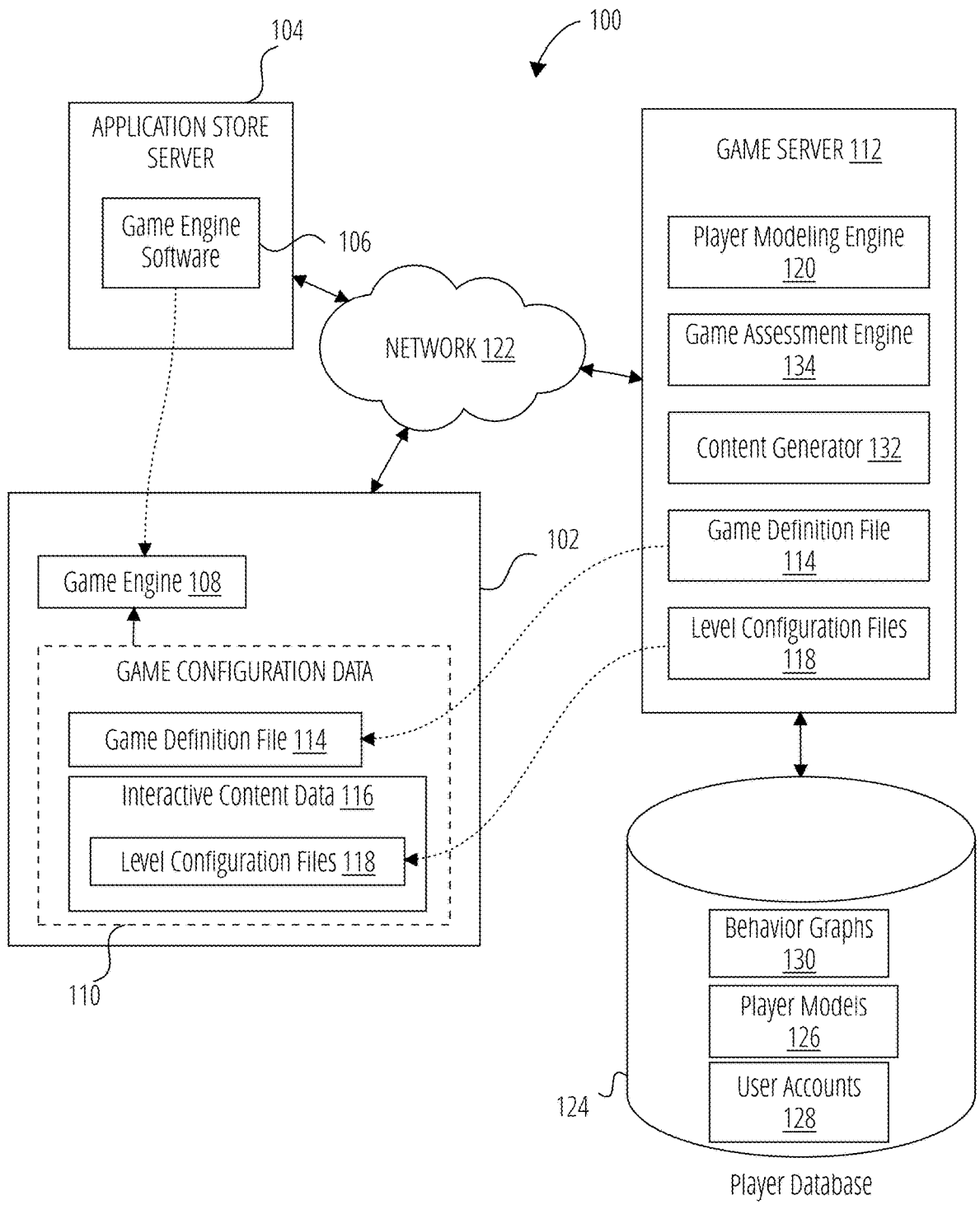
FIG. 1 illustrates a system in which computer-implemented gaming may be implemented, in accordance with some examples.

Referring briefly to FIG. 1 (which will be described at greater length later), therein is shown an example of such a game provision and management architecture, in which a client device 102 downloads from a third-party application store server 104 compiled game engine software 106 that is then installed on the client device 102 as an executable game engine 108. The game engine 108 is in this example a generic executable application that can be used, without modification, to implement different games and/or different game variants (e.g., of the same game) by cooperation with different non-compiled standalone game configuration data 110. In some examples, the game configuration data 110 may be fully or partially non-compiled. For reasons pertaining to application store service agreements (e.g., in which separate application downloads are mandated for separate games and in which a single download is to be limited to a executing a single associated game), however, the game engine 108 is in some examples limited to running only a single designated game uniquely associated with the game engine 108. In instances where a number of different games utilizing the disclosed techniques are played via the client device 102, a respective game engine 108 may be installed for each of the games, the game engines 108 being functionally identical and differing only in the identity of the respective designated games which they are to implement.

Such game configuration data 110 is in this example separately downloaded to the client device 102 from a game server 112 forming part of a game management system of a game provider. The game configuration data 110 in this example comprises separate text files or blocks of text data (structured in predefined formats that the game engine 108 is complementarily programmed to identify and implement) which respectively define different aspects of the game to be implemented on the client device 102 via the game engine 108. Upon execution, the game engine 108 in this example fetches the latest version of the game configuration data 110 from the game server 112 and executes interactive gameplay of the designated game based on the attributes and parameters defined by the game configuration data 110. In other examples, updated versions of the game configuration data 110 (e.g., to provide customized gameplay experience) are pushed to the client device 102 for consumption by the game engine 108 upon execution.

In this example, the game configuration data 110 comprises two separate interrelated functional components, namely a game definition file 114 and interactive content data 116, each of which is briefly introduced below and is described more extensively later herein. The game definition file 114 defines gameplay rules (also referred to as game mechanics). An example of a simplified version of such a textually defined ruleset 202 for a highly simplified example game (in this instance an elementary version of Boggle™) is shown in FIG. 2A.

The interactive content data 116 includes definitions of respective configurations, parameters, and/or attributes of interactive content items such as, in this example, gameboards, game pieces, game characters, powerups, consumable and/or purchasable special effect items, and the like.

The interactive content data 116 in this example includes multiple level configuration files 118 that respectively define configuration of content items in multiple corresponding units of gameplay, each level configuration file 118 in this example defining configuration values for a respective game level. As shown, the level configuration files 118 are received, at the client device 102, from the game server 112. In some cases, additional interactive content data 116, in addition to the level configuration files 118, are also received from the game server 112. In some cases, the interactive content data 116 (e.g., the level configuration files 118 or other interactive content data 116) are received, at the client device 102, from a source different from the game server 112 or are generated at the client device 102.

Figure 2B:
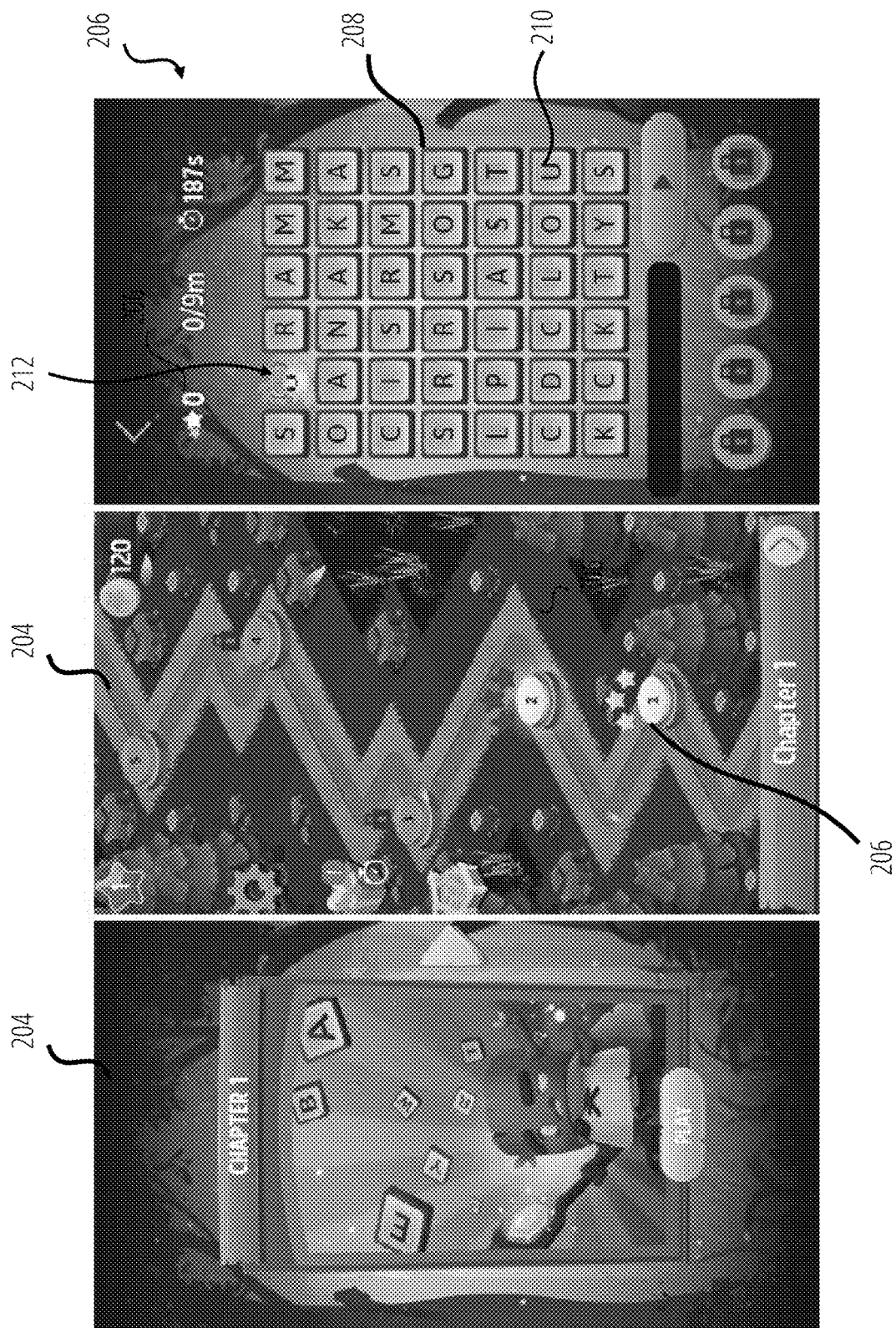
FIG. 2B is a series of screenshots showing a game event and one of a plurality of game levels forming the game event, according to some examples.

FIG. 2B shows three screenshots that illustrate an example hierarchical arrangement of levels in a word finding game with respect to which various aspects of the disclosure will be illustrated by way of example. It is emphasized that the disclosed mechanisms and techniques can equally be applied to a variety of different game types different from that which is used here merely as explanatory example. The level hierarchy in the example of FIG. 2B provides a plurality of selectively playable events 204 (only one of which is shown in FIG. 2B, titled "Chapter 1"), with each event 204 comprising a sequence of game levels 206 that in this example provide the smallest discrete units of gameplay. Each game level 206 in this example has a unique gameboard 208 comprising a rectangular grid of tile slots partly populated by letter tiles 210. The grid is to be navigated vertically downwards by a player character 212 controlled by the player and initially occupying a top row position. Tile slots occupied by letter tiles 210 are collapsed by selection of a plurality of linearly adjacent letter tiles 210 together forming a playable word, allowing the player character 212 to drop downwards. Other types of game object that are not shown in the gameboard 208 of FIG. 2B in this example include non-letter obstructions (see, e.g., brick tiles 1802 in FIG. 18A) and bombs that can be detonated to destroy both letter tiles 210 and brick tiles 1802.

A level configuration file 118 in this example defines, inter alia, the size and composition of the gameboard 208 (i.e., the identity and positions of the letter tiles 210, the positional arrangement of brick tiles 1802), the initial position of the player character 212, and performance targets and corresponding reward quanta (e.g., target completion scores/time with respective values for in-game currency and/or experience point rewards for satisfying the respective performance targets). An example of such a structured textual level configuration file 118 is shown in the extract of structured textual data of FIG. 2C. It will be noted that the level configuration file 118 includes, inter alia: a grid layout definition 214 (in which letter tiles 210 are indicated by corresponding letters, brick tiles are indicated by an "*" character, and the player character 212 is indicated by entry "$1"); coin reward parameters 216 that define thresholds and amounts for in-game currency rewards; and points reward parameters 218 that define thresholds and amounts for experience points (XP) rewards. In other examples, the level configuration file 118 may include configuration and/or definition of different interactive game objects, gameboards, elements, variables, values, and the like that are different from those In other examples, the level configuration file 118 may include different things from those specified above with respect to the current example.

It will thus be seen that the game configuration data 110 in some examples include event configuration data, which may comprise event timing and level contents or reference to corresponding level configuration files 118. Event configurations may include, for example: timing, and level contents. As mentioned above with reference to FIG. 2C, configuration data for respective levels may include, for example: a letter grid description, a ruleset reference (e.g., in a scripting language, for example, a novel data structure for consumption by a complementarily coded game engine 108), initial settings (e.g., amount of time allowed, etc.), and thresholds required for rewards and stars. In addition to the level configuration files 118 and the various aspects thereof mentioned above, the game configuration data 110 in some examples further include player configurations. The player configurations may include, for example: shop parameters, login reward parameters, experience requirements for player levels, events surfaced, and starting items.

It will be appreciated that all of these various values and configurations captured in the game configuration data 110 and reflected in the designated game when it is implemented by the game engine 108 can be fully modified, replaced, or amplified simply by modification or replacement of the standalone game configuration data 110, without any modification of the game engine 108. Such an architecture greatly facilitates customization or tuning of game variants for identified player cohorts/segments or even for players individually. In contrast to conventional application updates to game applications downloaded and installed from the application store server 104, effective updating of the designated game (including micro-targeted customization for promoting player engagement and retainment) can be done directly from the game server 112 to the client device 102 by replacement or modification of the game configuration data 110. Because the game configuration data 110 is (fully or partly) non-compiled data stored on the client device 102 in a textual file format, no installation or compiling thereof is needed for its implementation, while bandwidth and device resource loads are small compared to conventional existing mechanisms for modification or reconfiguration of game applications installed on-device.

A number of further aspects of the disclosure relate to targeted customization of game configuration and/or interactive game content for specific player clusters or player groups (also referred to herein as player cohorts). In some examples, such targeted customization includes at least partly automated generation of custom game configurations and/or at least partly automated evaluation of such computer-generated content.

Thus, e.g., in an example game such as that discussed with reference to FIG. 2A-FIG. 2C, differently configured gameboards 208 with different performance thresholds and letter tile layouts may be auto-generated and auto-evaluated for different respective player cohorts. Resultant custom game variants or custom interactive game content are in some examples provisioned or made available for players in the corresponding targeted cohort or cluster by use of the architecture described with reference to FIG. 1. In such examples, different respective targeted level configuration files 118 can thus be made available for automatic download by the client devices 102 of players in different cohorts. In this manner, practically feasible targeted customization is achievable at the large scales of popular online games (in some instances having millions of daily active users), with relatively fine levels of customization granularity achievable without incurring primitive labor costs.

Figure 3:
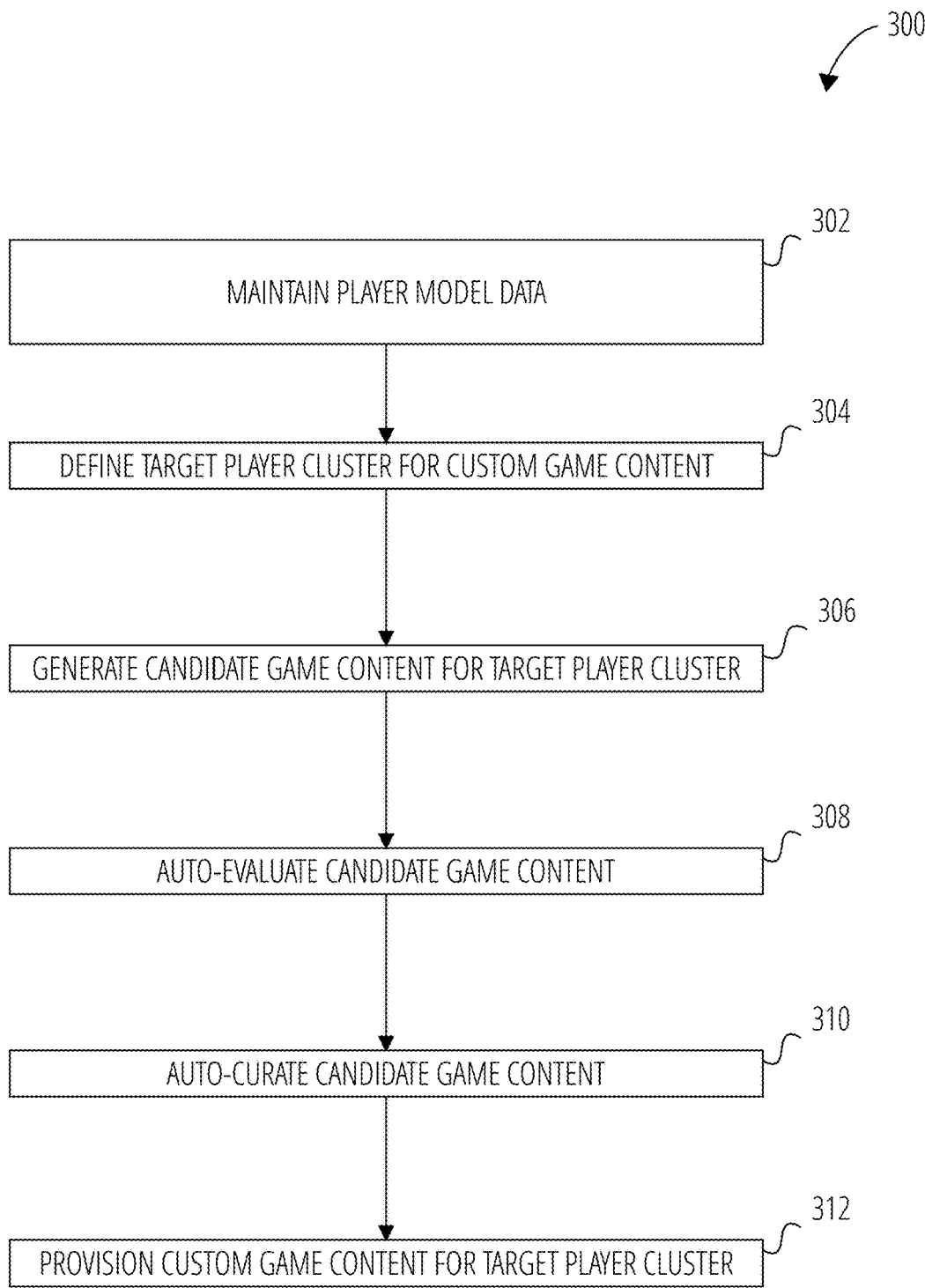
FIG. 3 data flow diagram for content generation and evaluation, in accordance with some examples.

In FIG. 3, flowchart 300 shows a high-level view of an example method for at least partly automated targeted game customization. The example method of FIG. 3 will briefly be described by way of example as being implemented by the example system of FIG. 1 with respect to the example game of FIG. 2C-FIG. 2B. At operation 302, a respective player model 126 is generated or maintained for each one of multiple user accounts 128 for a corresponding multiplicity of players of the game (see FIG. 1, in which data for the user accounts 128 is exemplified as included in player database 124 accessible by the game server 112).

As will be described in greater depth later herein, data indicating player modeling in this example comprises a respective multidimensional player model 126 maintained for each player. The player model 126 is multidimensional in that it provides an array or set of numerical values effectively defining a datapoint or vector in multi-dimensional space. The multiple dimensions comprise respective pre-defined gameplay characteristics or attributes for the associated game based on historical gameplay. In the example game of FIG. 2B, respective player model dimensions (also referred to herein as model parameters) include average length of words played, size of employed vocabulary, maximum word length, and the like. Table 1 below (discussed in the portions of the disclosure directed to Player Modeling) lists the respective dimensions of a 64-dimensional player model 126 employed in the present example. It will be appreciated that different numbers of player model dimensions and different respective dimensions can be employed for different games.

In addition, as illustrated schematically in FIG. 1, the player database 124 further includes behavior graphs 130 indicative of player behavior within the game as it relates to traversing through different screens or activities. Such game traversal behavior is to be distinguished from gameplay attributes or characteristics as mentioned above as providing respective dimensions of the player model 126. Such gameplay attributes or characteristics relate more narrowly to a player's style, behavior, gameplay patterns, or gameplay habits during actual gameplay. As will be described at length with respect to FIG. 21, historical game traversal behavior of players are processed to automatically generate respective traversal graph structures (referred to for ease of reference as behavior graphs 130), which are automatically labeled and processed using a trained neural network to identify estimated motivations for player behaviors or emotional states indicated by game interactions. Various details of such behavior graphs 130 and their use in automated custom content generation will be described later herein with reference to example traversal graph 2200 shown in FIG. 22. In this example, the behavior graphs 130 are processed to derive and populate a subset of dimension values for the player model 126 of the corresponding player. In other examples, the behavior graphs 130 may be used separately from the player models 126 to inform automated content generation and/or evaluation.

Returning to FIG. 3, the method further comprises, at operation 304, identifying a target player cluster for whom game content is to be customized. In this example, the identification or definition of a target player cluster is based on the respective multidimensional player models 126, e.g. by identifying a subset of the players whose player model vectors are clustered together in a selected number of dimensions of the player model 126. In this example, the player modeling of operation 302 and the player clustering of operation 304 are performed by a player modeling engine 120 provided by the game server 112 (FIG. 1). It will be appreciated that clusters of varying degrees of granularity can be selected dependent on operator preference. Details of such clustering will be discussed at greater length later herein. A representative player model for the target player cluster is generated for use in content generation, e.g., defining each dimensional value of the representative player model as a statistical average or value representative of the respective values for that dimension of the model vectors of the players constituting the target player cluster.

At operation 306, candidate game content for the target player cluster is automatically generated. In one example, the automated game content that is thus generated is a set of level configuration files 118 for a single game event, as discussed with reference to FIG. 2B. These custom level configuration files 118 are produced based at least in part on the representative player model for the target player cluster, so that different variants of the same game levels are generated for player clusters with different representative player models 126. An example of stepwise generation of level generation files will be described at length below with reference to FIG. 16-FIG. 18H. In this example, these procedures are performed by a content generator 132 forming part of the game server 112.

Thereafter, the auto-generated candidate game content is auto-evaluated, at operation 308. In one example, the automated evaluation comprises forecasting a user action sequence based at least in part on the applicable player model 126, and a resultant outcome of the forecast user action sequence is determined.

At operation 310, candidate game content is curated, in this example in an automated procedure, based on the outcomes produced by the action sequence forecast. In particular, this example provides for comparison of the resultant outcome to predefined target metric(s) for the forecast gameplay. If the outcome satisfies the target metric(s), the candidate game content (e.g., a set of level configuration files 118 for a particular game event) is, at operation 312, provisioned for the corresponding target player cluster, e.g., by storing the custom game content on the game server 112 for automatic download by respective client devices 102 of players who are members of the target player cluster. If, however, the candidate game content does not satisfy the target metric(s), the game assessment engine 134 (FIG. 1) by which operation 308 through operation 312 are performed iteratively adjusts and re-evaluates the level configuration files 118 until they either satisfy the target metrics or are discarded.

Figure 4:
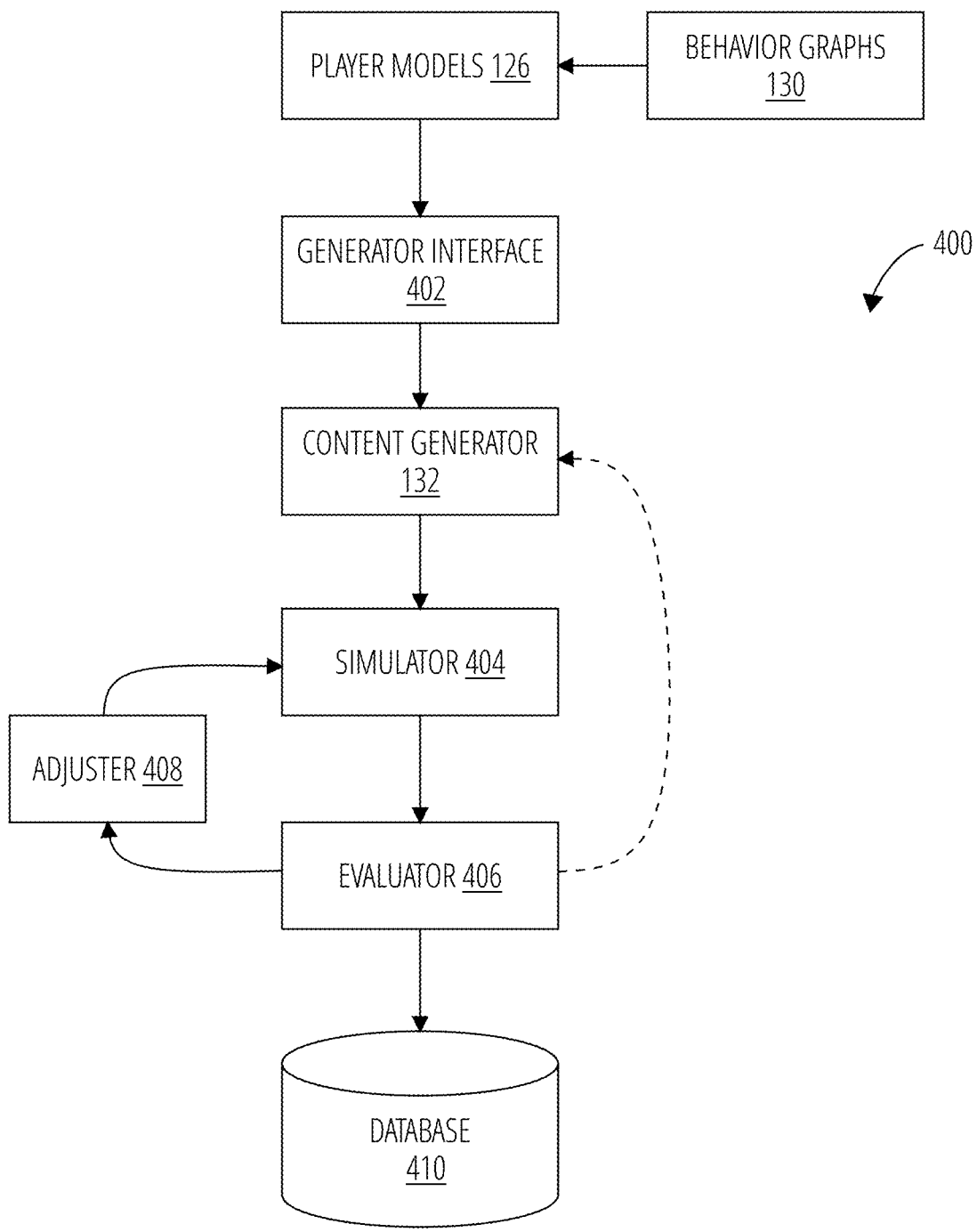
FIG. 4 is a data flow diagram for content generation and evaluation, in accordance with some example.

FIG. 4 is a data flow diagram 400 for content generation and evaluation, in accordance with some examples. Respective player models 126 for the players are generated based on historical gameplay information (corresponding to operation 302 in FIG. 3). In addition, a database of respective behavior graphs 130 for the players is generated based on historical behavior data indicating respective players' behavior in traversal through different screens and actions within the game, as mentioned above.

In this example, the behavior graphs 130 inform automated content generation by being analyzed to derive a subset of behavioral dimension values that are included in the associated player model 126. In the example of FIG. 2A-FIG. 2C, each player model 126 is made up of 64 gameplay dimensions and four traversal behavior dimensions. (Note that the number and identity of the player model dimensions or parameters can vary widely for different examples.) Worded differently, in such an example the player model 126 includes both dimensions relating to gameplay behavior as well as dimensions relating to game traversal behavior, also referred to some examples herein as motivational dimensions. In other examples, behavior graphs 130 may be provided to the content generator 132 in a manner different than through representation in the player model 126.

Based on the respective player models 126, a plurality of player clusters are identified by a clustering operation that includes calculating distances between respective player vectors (as indicated by the respective player models 126) in the multi-dimensional space defined for player modeling. It will be appreciated that an operator can vary the granularity of such clusters, so that the global set of players can thus be segmented in any desired number of player clusters, which may in some cases be overlapping. In this example, a representative player model 126 is calculated for each player cluster, each representative player model 126 representing the corresponding cluster of players, based on the corresponding underlying gameplay data. In this example, the representative player model 126 for a cluster is calculated as a vector having, for each of its predefined multiple dimensions, a numerical value defined as a statistical average of the numerical values of the corresponding dimension of the player models 126 of all players who are members of the relevant cluster. Worded differently, the representative player model is provided by a multi-dimensional vector (or datapoint in multidimensional parameter space) whose component in each dimension is the statistical average of the corresponding components of the player vectors of all players in the cluster.

At a generator interface 402 (in this example being a web-based user interface generator on a remote operator device communicating with the game server 112 via the network 122), an operator triggers content generation by selecting constraints and/or target metric values for content that is to be generated. In this example, the operator selects or identifies via the generator interface 402: a particular player cluster (corresponding to operation 304, FIG. 3); the number of game levels that are to be generated/configured together to form a game event; respective target metric values for each level (e.g., a difficulty level for gameplay according to the representative player model); and an applicable ruleset 202 or game definition file 114. The representative player model 126 of the selected cluster is ingested by the generator interface 402, in this example being a hypertext markup language (HTML) interface as described below with reference to FIG. 15A-FIG. 15C.

The generator interface 402 communicates with content generator 132 (in this example provided by game server 112), which generates the content based on the information received from the generator interface 402. In this example, content generation comprising production of respective level configuration files 118 for each level of a game event to customized for the selected target cluster.

The content thus generated is provided to a simulator 404. The simulator 404 simulates playing the computer-implemented game, having the generated content, as a player corresponding to the representative player model 126 of the target cluster. The evaluator 406 evaluates performance metrics (e.g., win rate) based on the simulation by the simulator 404. If the evaluated metrics meet certain criteria, they are provided to a database 410 for consumption by respective client devices 102 of players in the target cluster. Otherwise, the generated content is adjusted by the adjuster or returned to the content generator 132 for generation of new content. The output of the adjuster 408 or the content generator 132 is provide to the simulator 404 for further simulation. This process is performed iteratively for generated level generation level configuration file 118 until it is either discarded (triggering generation of a new iteration of the level configuration file 118) or satisfies the performance criteria and is stored to the database 410.

Figure 5:
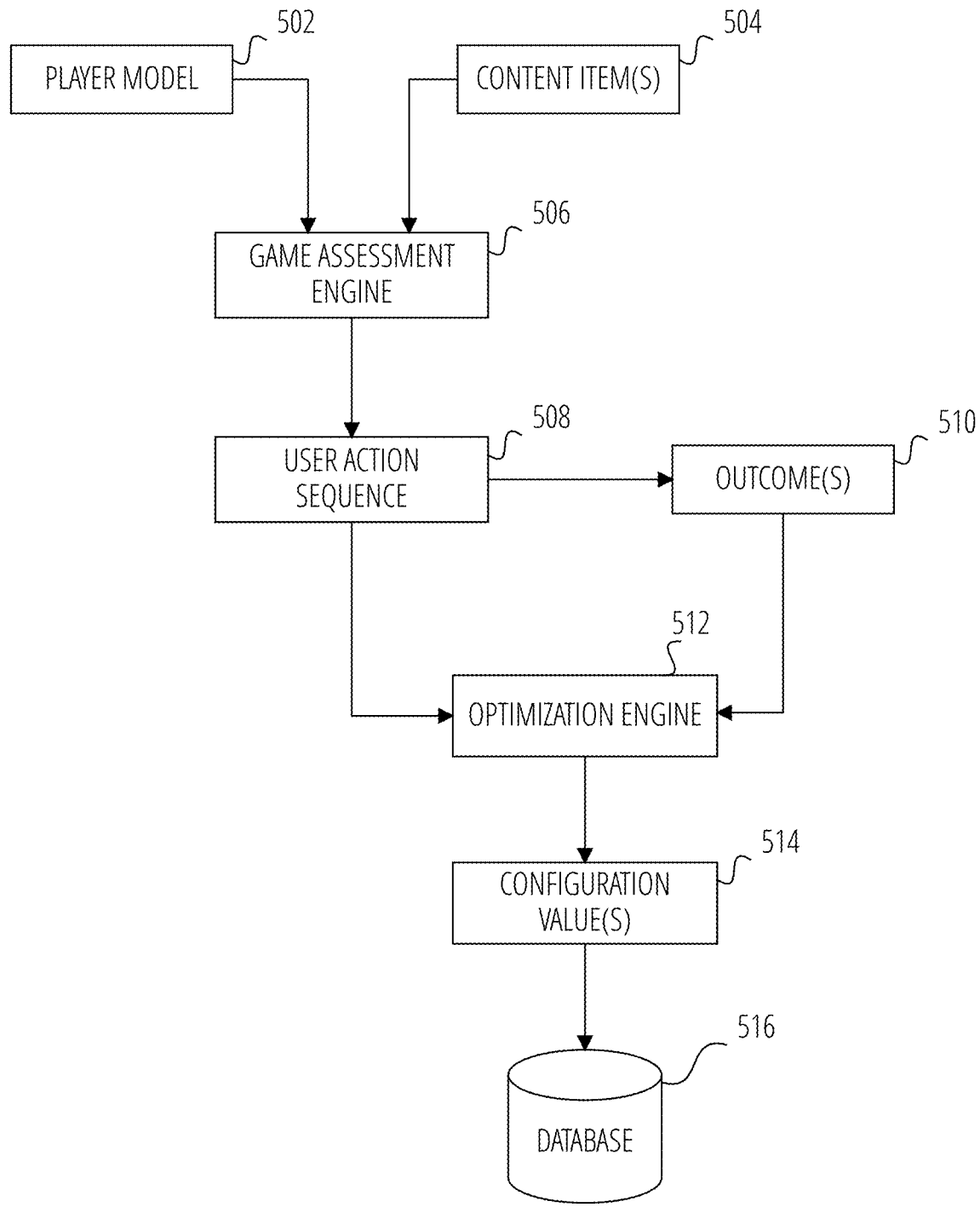
FIG. 5 is a data flow diagram for content generation and evaluation, in accordance with some example.

FIG. 5 is a data flow diagram 500 for game configuration value generation, in accordance with some examples. As shown, a player model 502 and content item(s) 504 are ingested by a game assessment engine 506. The game assessment engine 506 uses the player model 502 to generate a user action sequence 508, forecasting actions that a user, represented by the player model 502, would take in response to the content item(s) 504 being presented in a computer-implemented game. The game server 112 determines outcome(s) 510, specified in the software of the computer-implemented game, of the generated user action sequence 508. The user action sequence 508 and the outcome(s) 510 are ingested by the optimization engine 512. The optimization engine 512 optimizes configuration value (s) 514 for the content item(s) 504. The optimized configuration values 514 are stored in a database 516 for consumption by client device(s) 102 associated with the player model 502 (e.g., based on the user account(s) of the client device (s)).

Figure 6:
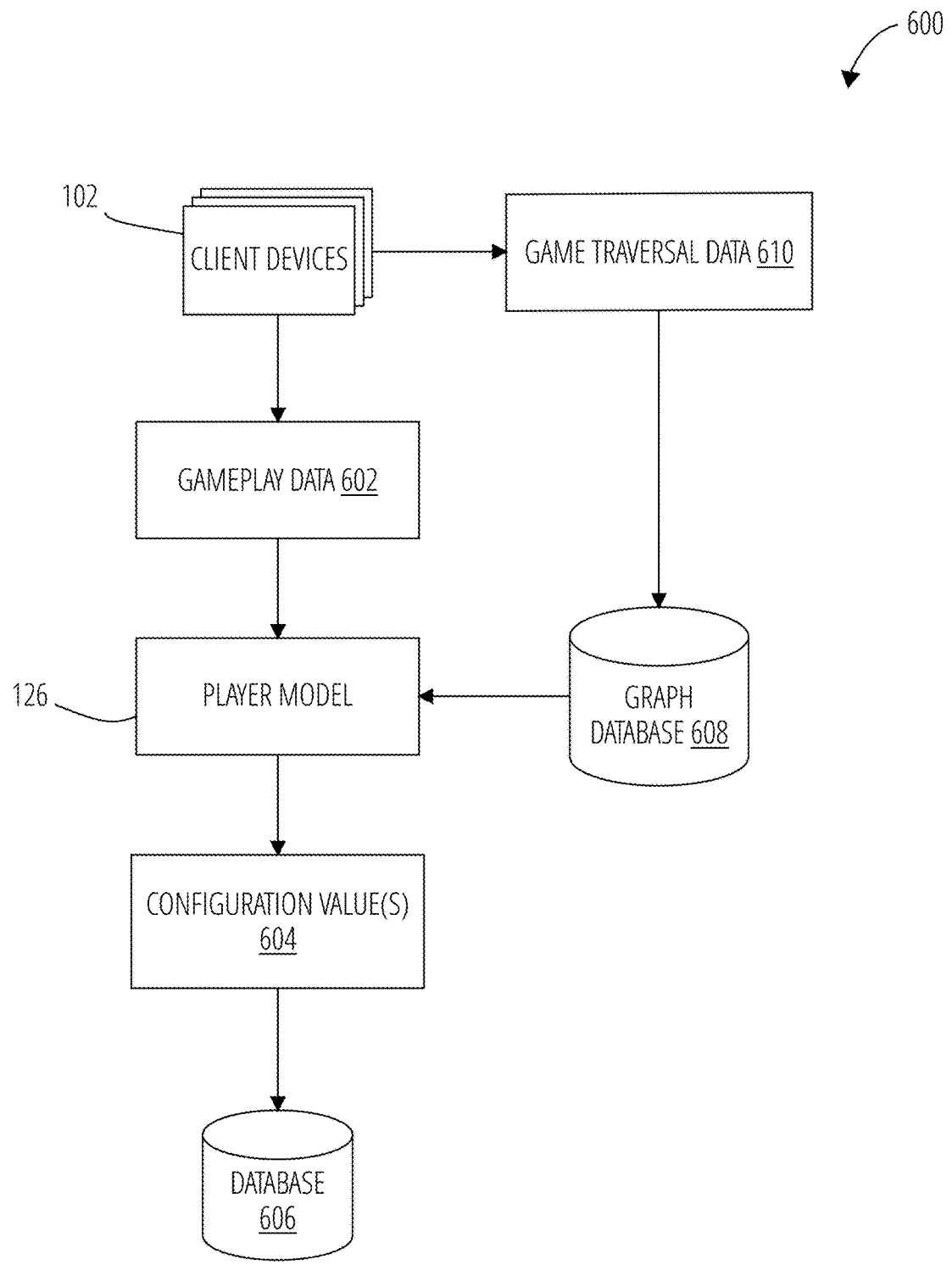
FIG. 6 is a data flow diagram for configuring a game based on a player model, in accordance with some examples.

FIG. 6 is a data flow diagram 600 for configuring a game based on a player model, in accordance with some examples, in this example being described with reference to the example s 100 of FIG. 1. When players play the game using respective client devices 102, gameplay data 602 is generated. In addition, game traversal behavior (e.g., user behavior in moving through different screens and actions within the game, in contradistinction to gameplay behavior that relates to actual gameplay) is recorded and processed to generate behavior graphs 130 (introduced in FIG. 1 and described at length with reference to FIG. 21) stored in graph database 608. The gameplay data 602 and the information stored in the graph database 608 are used to generate a player model 126 representative of behavior of a cluster cohort of players. As described elsewhere, the representative player model 126 is in some examples compiled by creating a respective multidimensional parametric player model 126 for each player, identifying player clusters by identifying clusters of datapoints indicated by respective individual player models 126 in a multidimensional parameter space defined by predefined player model parameters, and generating a representative player model 126 based on the constituent player models 126 of an identified target cluster. In other examples, an individual player model 126 is identified as representative of a target player cluster, and is used for game configuration specific to the target player cluster.

The player model 126 maps to configuration value(s) 604 for the game. The configuration value(s) 604 may be determined for the player model 126 using the techniques described throughout this document (e.g., with one or more of the multiple player model parameters mapping one-to-one or in respective combination to a plurality of different configurations and features of a level configuration file 118 (FIG. 2C). After the configuration value(s) 604 are determined, they are stored in a database 606 for ingestion by client devices 102 corresponding to the player model 126.

DETAILED DESCRIPTION

Example System Architecture

In view of the above introductory overview, some aspects of the disclosure will now be discussed at greater length. As used herein, a game includes a piece of entertainment that one or more players engage with according to particular objectives. For each game there is articulated a set of rules that govern how the players are allowed to modulate some representation of the current state of play over time, and the consequences of that modulation. A game can be uniquely described by its rules along with its Initial Game State.

A game state may refer to a snapshot of the game at a given point in time. The location of the pieces in Chess along with whose turn it is to make the next move would be a representation of its game state. For some computer-implemented games, this Game State is significantly more complex, capturing things like the current score, player's current attributes (health, ammunition etc.) and so forth. A Game State fully describes all aspects that are relevant to gameplay at a given moment. An Initial Game State provides the Game State when the game starts, and is the configuration from which players first engage with the game.

A game mechanic is the term given to a set of one or more game rules that act together to create a specific behavior within the game. For example in Chess, a "mechanic" might be based around a single piece, the way that it moves, captures opposing pieces and any special rules for that piece such as the Rook's "castling" or the Pawn's "en passant" capture ability. New pieces could be added to Chess by adding their relevant rules as a group of mechanics.

Game Configuration Values are the set of data (e.g., game parameters) that encapsulates the behavior of the game. They include a Game Definition File and Interactive Content Items that describe a variety of aspects of the game and encapsulating software product that can be configured in a variety of ways to provide distinct experiences to players.

A Game Definition File provides a complete enumeration of the rules of a game, in some example below also referred to as a ruleset. Each rule includes what must be true for the rule to be able to take effect and what the consequence of the rule is. Some rules describe actions taken by the player (e.g. moving a piece in Chess) while others describe rules that are evaluated when the Game State changes for any reason (e.g. being in 'Check' in Chess).

Interactive Content Items are the sets of items with which players interact. They may describe specific levels of a Game, typically by describing a specific Initial Game State. They also govern aspects such as how those levels are surfaced to players as part of Events, as well as a range of settings for a player such as what items will be visible to them in the "shop" built into the software, or rewards that a player will receive for logging into the game each day.

A player model may in some examples include a representation of a real, hypothetical, or representative player in multi-dimensional space, reflecting values against a number of parameters or metrics that define characteristics of play. In some examples, all parameters/metrics are normalized to contain values between 0 and 1. A single Player Model is a vector in this dimensional space, and in the case that it represents a real player, it is calculated based on their observed historical play. A Player Model can also be representative of a group of players (e.g., a cluster of vectors in the parameter space), where the vector is the blended average of the datapoints for each member of the group.

A player modeling engine may include an engine (implemented in software, hardware or a combination of software and hardware) for calculating Player Models based on analysis of historical data and clustering of similar players. In some examples, the player modeling engine (e.g., the player modeling engine 120) additional estimates aspects of player psychological features based on machine-learned label prediction, as described with reference to the example method of FIG. 21.

A Player Journey may refer to the "path" that a given player has taken to navigate through a piece of software, also referred to as game traversal. The "journey" is their transition from viewing one area of the software to another, and might capture the menu screens that are traversed or the levels that a player plays in a game. The utility of the Player Journey lies in its ability to facilitate an understanding of what a player is putting their attention on within the game, with the aim of understanding their motivations and aspirations. See in this regard again the description with reference to FIG. 21.

FIG. 1 illustrates a system in which the various aspects pertaining to creation, management, support, and provision of computer-implemented gaming may be implemented, in accordance with some examples. As shown, the system includes an application store server 104, a game server 112, a player database 124 (which may be implemented as a graph database), and a client device 102 connected to one another over a network 122. The network 122 may include one or more of the Internet, an intranet, a local area network, a wide area network, a wired network, a wireless network, and the like. The client device 102 may be a smartphone, a tablet computer, a laptop computer, a desktop computer and the like. It should be noted that the player database 124 is referred to as a "database" in this document. However, the player database 124 is not limited to any particular structure or storage format of data, and may be implemented as a data repository or a data storage unit that is not a database.

The application store server 104 may implement an application store that provides software to multiple client devices, including the client device 102. For example, the application store server 104 may be associated with the Apple App Store® or the Google Play Store®. As shown, the application store server 104 stores the game engine software 106, which is provided to the client device 102.

The game server 112 generates and stores information associated with gameplay of computer-implemented game (s). As shown, the game server 112 hosts a player modeling engine 120, which develops player models 126 (which may be multi-dimensional) for storage in the player database 124. Each player model is associated with one or multiple user accounts 128 stored in the player database 124. In some cases, a player model 126 corresponds to a cluster of user accounts 128 in a multi-dimensional space, which each dimension representing a different gameplay element or parameter. Each user account 128 is associated with a user who plays the computer-implemented game(s).

The player models 126 are used to generate game configuration data 110, including the game definition file 114 and the interactive content data 116 (including the level configuration files 118) for the game. The game configuration data 110 may represent a game mechanics configuration or a game parameter configuration. The game configuration data 110 may represent a player configuration, an event configuration, a level configuration or a scoring configuration.

The player models 126 may be used to generate a game definition file 114. The game definition file 114 stores rules for the computer-implemented game. The game definition file 114 includes rules written in non-compiled machine-readable code.

The player models 126 are used to generate interactive content data 116 customized to the individual player models, in order to increase user engagement with the computer-implemented game. The interactive content data 116 may include game boards, game pieces, game characters, and the like.

The game server 112 generates a user action forecast, forecasting user interaction with the interactive content data 116 based on the player model 126. Metrics (e.g., a win rate, a gameplay time, and the like) are computed, by the game server 112, based on the user action forecast.

The interactive content data 116 may include one or more of player configurations, event configurations, and levels. Player configurations may include: shop parameters, login reward parameters, experience requirements for player levels, events surfaced, and starting items. Event configurations may include: timing, and level contents. Levels may include: a letter grid description, a ruleset reference (e.g., in a scripting language, for example, Lex-Script), initial settings (e.g., amount of time allowed, etc.), and thresholds required for rewards and stars.

As shown, all or part of the game configuration data 110, which include the game definition file 114 and the interactive content data 116, are transmitted from the game server 112 to the client device 102. The game engine 108 of the client device 102 receives, from the application store server 104, the game engine software 106. The game engine 108 accesses the received game configuration data 110 (including the game definition file 114 and the interactive content data 116) during execution of the game engine 108. The execution of the game engine 108 at the client device 102 corresponds to gameplay of computer-implemented game (s).

During gameplay at the client device 102, which includes execution of the game engine 108, data about the gameplay of the user account 128 associated with the client device 102 are stored in the player database 124. These data are provided to the player modeling engine 120 of the game server 112 to generate a player model 126 for the user account 128 of the client device 102 (or to associate the user account 128 of the client device 102 with a previously existing player model 126).

Some examples relate to the game engine 108 for use at the client device 102. The client device stores the game engine 108 for playing a designated game. In some cases, the game engine 108 is also for playing additional games, in addition to the designated game. In some cases, the game engine 108 is for playing the designated game only. The client device 102 receives, over the network 122, game configuration data 110 that specify operation of the designated game. The game configuration data 110 represent a game mechanics configuration or a game parameter configuration. The client device 102 adjusts operation of the game engine 108 based on the received game configuration data 110, without modifying software of the game engine 108. In some examples, the game engine software 106 (which may include all of the compiled code for the game engine 108) is received entirely from the application store server 104, and not from the game server 112.

According to some examples, the game server 112 receives, from the player database 124, which communicates with the client device 102, data associated with gameplay of one or more user accounts 128, the one or more user accounts being used for playing a designated game. The game server 112 computes the player model 126 representing previous in-game behavior of the one or more user accounts. The game server 112 identifies, based on the player model 126, game configuration data 110 for the designated game. The game configuration data 110 represent data to specify operation of the designated game. The game configuration data 110 represent at least one of a game mechanics configuration and a game parameter configuration. The game server 112 causes transmission of the game configuration data 110 to the client device 102. The game configuration data 110 cause the client device 102 to adjust the game engine 108 based on the previous in-game behavior of the one or more user accounts 128.

According to some examples, the client device 102 stores the game engine 108 for playing a designated game. The client device 102 receives, over the network 122, game configuration data 110 for the designated game. The game configuration data 110 represent data to specify operation of the designated game. The client device 102 adjusts operation of the game engine 108 based on the received game configuration data 110 without modifying the game engine software 106 of the game engine 108.

Some examples relate to automated game assessment. In some examples, the player model 126 may include a set of numbers, e.g., providing respective parametric values. The game server 112 accesses the player model 126 representing a subset of players. The player model 126 is generated based on previous in-game behavior of the subset of players while playing a computer-implemented game. The game server 112 accesses a set of interactive content data 116 associated with the game. The game server 112 forecasts, using the player model 126, a sequence of user actions (e.g., the user action forecast) of the subset of players during gameplay of the game. The sequence of user actions represents a prediction of user interaction with the set of interactive content data 116. The game server 112 computes, based on the forecasted sequence of user actions and software-defined outcomes of the forecasted sequence of user actions in the game, game configuration data 110 for the set of interactive content data 116. The game server 112 causes execution of gameplay at the client device 102 associated with the player model 126. The gameplay is according to the computed game configuration data 110 for the set of interactive content data 116.

Some examples relate to fully automated dynamic custom game content generation. The game server 112 generates a set of game content items (e.g., interactive content data 116) for a designated game. The set of game content items is customized for one or more user accounts 128 based on a player model 126 (generated by the player modeling engine 120) representing the one or more user accounts 128. The player model is generated based on previous in-game behavior of the one or more user accounts while playing the designated game. The game server 112 forecasts, using the player model 126, a sequence of user actions (e.g., the user action forecast) of the one or more user accounts during gameplay of the designated game with the generated set of game content items. The sequence of user actions represents a prediction of in-game user interaction with the set of game content items. The game server 112 computes, based on the forecasted sequence of user actions and software-defined outcomes of the forecasted sequence of user actions in the designated game, a set of metrics associated with gameplay of the one or more user accounts represented by the player model in the designated game. The game server 112 determines whether the set of metrics corresponds to a predefined range (e.g., the win rate is between 50% and 70%). Upon determining that the set of metrics corresponds to the predefined range: the game server 112 stores the game configuration data 110 for transmission to the client device 102 associated with the player model 126. Upon determining that the set of metrics does not correspond to the predefined range: the game server 112 may adjust the set of content items until the set of metrics enters the predefined ranges or a stopping criterion is met.

Some examples relate to a scripting language for the game definition file 114. A machine-readable medium, such as a memory unit of the client device 102, stores the game definition file 114 for a designated game. The game definition file 114 stores rules for the designated game. The game definition file defines the rules using non-compiled machine-readable code (e.g., scripting code in a scripting language, for example, Lex-Script). The machine-readable medium also stores compiled software code for the game engine 108. The game engine is for playing multiple games including the designated game via a graphical user interface (GUI) according to the rules for the designated game defined by the game definition file.

According to some examples, the client device 102 receives (e.g., from the application store server 104) compiled software for the game engine 108 (e.g., game engine software 106). The game engine is for playing multiple games, including the designated game. The client device 102 receives (e.g., from the game server 112) the game definition file 114. The game definition file 114 stores rules for the designated game. The game definition file 114 defines the rules using non-compiled machine-readable code. The client device 102 executes the game engine 108 to enable playing of the designated game at the client device 102. To enable playing of the designated game, the client device 102 accesses the game definition file 114 and provides, via a user interface generated on the client device 102, interactive gameplay of the designated game according to the rules for the designated game defined by the game definition file 114.

In one example, a game definition file 114 may include a "toggle select" rule, which requires that a block being selected by the user is adjacent to the block that was last selected. A "submit" rule may verify that a word that the user is trying to submit has not been previously submitted. Another rule may specify that tiles that are selected are removed from the game board.

Some examples relate to a workflow for creating game content, evaluating the content, and ensuring that it meets certain criteria. The new content may be placed into the broader context of an event with unlock criteria, rewards, and so on. The game server 112 generates content that is pre-tuned for a set of users based on the player models 126.

Figure 7:
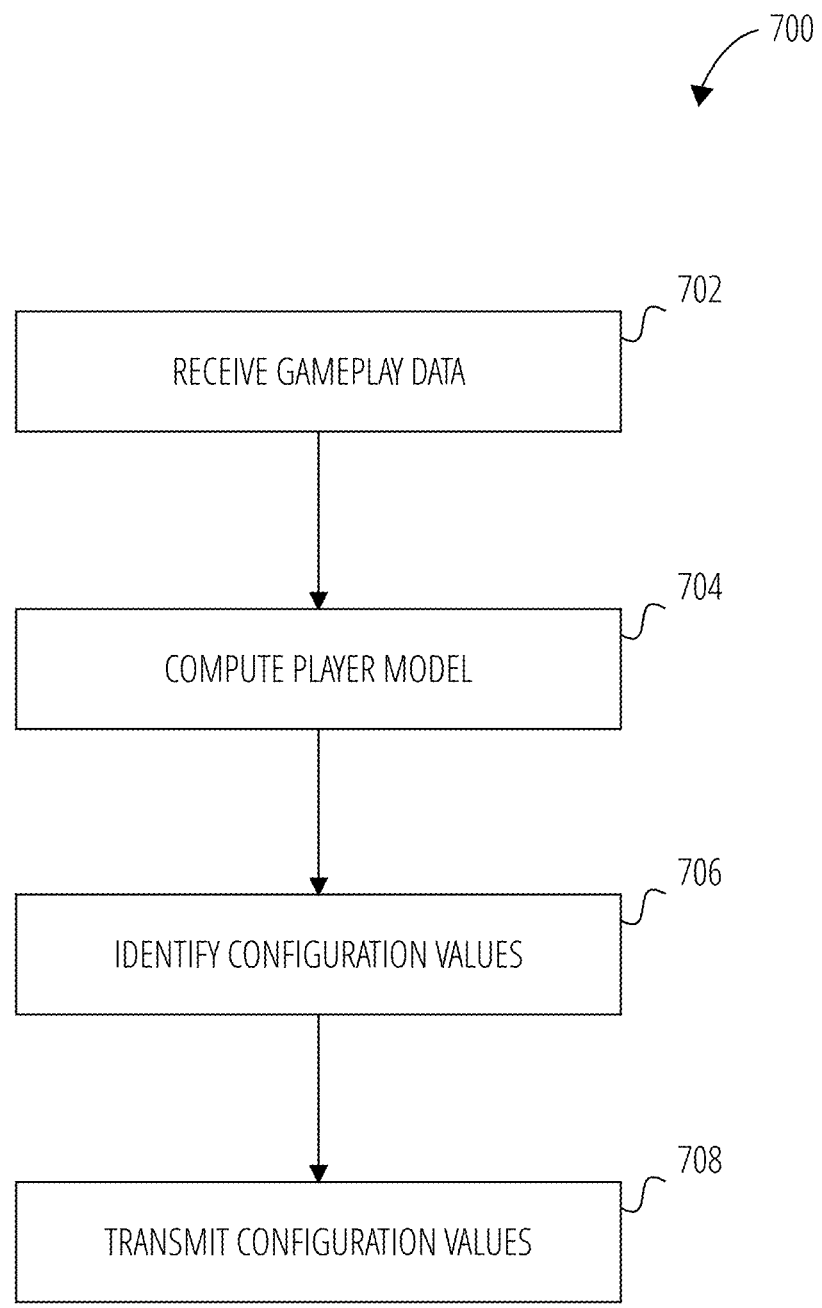
FIG. 7 is a flow chart of a method for transmitting configuration values to a client device, in accordance with some examples.

FIG. 7 is a flow chart of a method 700 for transmitting configuration values to a client device, in accordance with some examples. The method 700 may be implemented at a game server. In the example of FIG. 1, the method 800 is implemented by game server 112.

At operation 702, the game server receives data associated with gameplay of one or more user accounts. The one or more user accounts are used for playing a designated game. The data associated with the gameplay may be received from client device(s) or from a graph database storing historic gameplay data.

At operation 704, the game server computes, for the one or more user accounts, a player model representing previous in-game behavior of the one or more user accounts. The previous in-game behavior of the one or more user accounts includes playing the designated game.

At operation 706, the game server identifies, based on the player model, configuration (config) values for the designated game. The configuration values represent data to specify operation of the designated game. The configuration values may represent one or more of: a game mechanics configuration, a game parameter configuration, a player configuration (e.g., data related to a player in the game), an event configuration (e.g., data related to an event in the game), a level configuration (e.g., data related to a level of the game), and a scoring configuration (e.g., data related to scoring the game). The player model may include multiple dimensions. The game server identifies, based on the player model, the configuration values for the designated game by clustering the player model into a group of player models using statistical methods. Each group of player models corresponds to its own associated configuration values.

At operation 708, the game server causes transmission of the configuration values to a client device. The configuration values cause the client device to adjust a game engine at the client device based on the previous in-game behavior of the one or more user accounts. The configuration values are stored separately from the game engine and do not adjust the software of the game engine. The software of the game engine may have been received from an application store server, which might be different from the game server. In some cases, the configuration values are transmitted to the client device in a standalone data payload over the air. The standalone data payload is transmitted directly from the game server to the client device, without passing through the application store server. The game engine is used for playing different game(s), including the designated game, at the client device.

The client device stores the game engine. The game engine is configurable using the configuration values. The configuration values do not modify software of the game engine and are stored externally to the software of the game engine.

Figure 8:
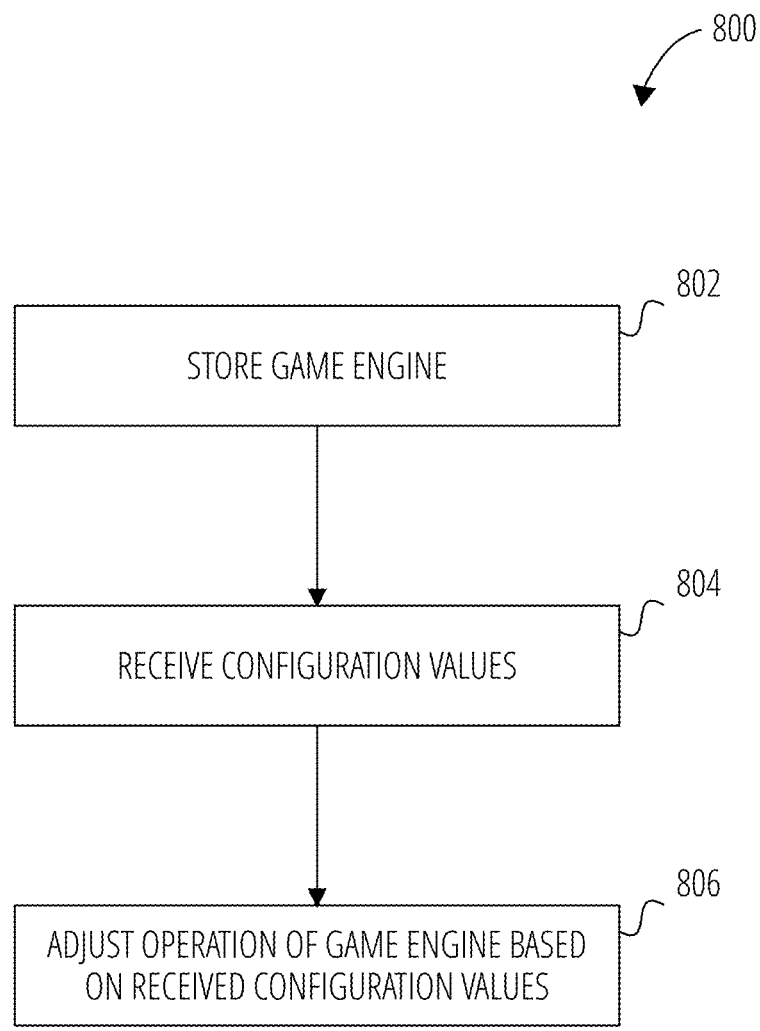
FIG. 8 is a flow chart of a method for adjusting operation of a game engine at a client device, in accordance with some examples.

FIG. 8 is a flow chart of a method 800 for adjusting operation of a game engine at a client device, in accordance with some examples. The method 800 may be implemented at the client device.

At operation 802, the client device stores, in memory, a game engine for playing a designated game and, in some cases, also additional games. Software for the game engine may be received over a network from an application store server.

At operation 804, the client device receives, over the network, configuration (config) values for the designated game. The configuration values represent data to specify operation of the designated game. In some cases, the configuration values are received, at the client device, in a standalone data payload over the air. The standalone data payload is transmitted directly from the game server to the client device, without passing through an application store server. The configuration values may be stored, in the memory of the client device, externally to the game engine.

At operation 806, the client device adjusts operation of the game engine based on the received configuration values, without modifying the software of the game engine.

According to some examples, the separation of the configuration values from the software of the game engine allows the game developer to update the game at client device(s) by controlling the game server, without frequently accessing the application store server. Software for the game engine may be updated, via the application store server, for example, once every several months (or any other time period) and the software may be the same for all client devices having the same operating system (e.g., iOS or Android). The configuration values, on the other hand, may be updated multiple times per day (or any other time period) and may be selected, by the game developer, based on the player model associated with a given user account. Thus, the designated game may be implemented differently for users with different gameplay styles, and the designated game may be modified as the user's gameplay style changes. For example, in a farming game, a user who likes cows may be given a cow as a reward for reaching a certain level. Another user, who prefers growing vegetables, may be given a carrot instead of a cow. In a modified chess game, a player who is associated with a player model that indicates interest in larger board sizes may play at a 16×16 (rather than the typical 8×8) board. A player who is associated with a player model that indicates interest in novel pieces may be offered to play with one or more novel pieces. For example, a lieutenant piece, which can move 4 squares forward or to the right, or 3 squares backward or to the left, may be added to the board.

Game Rules Definition Files

Figure 9:
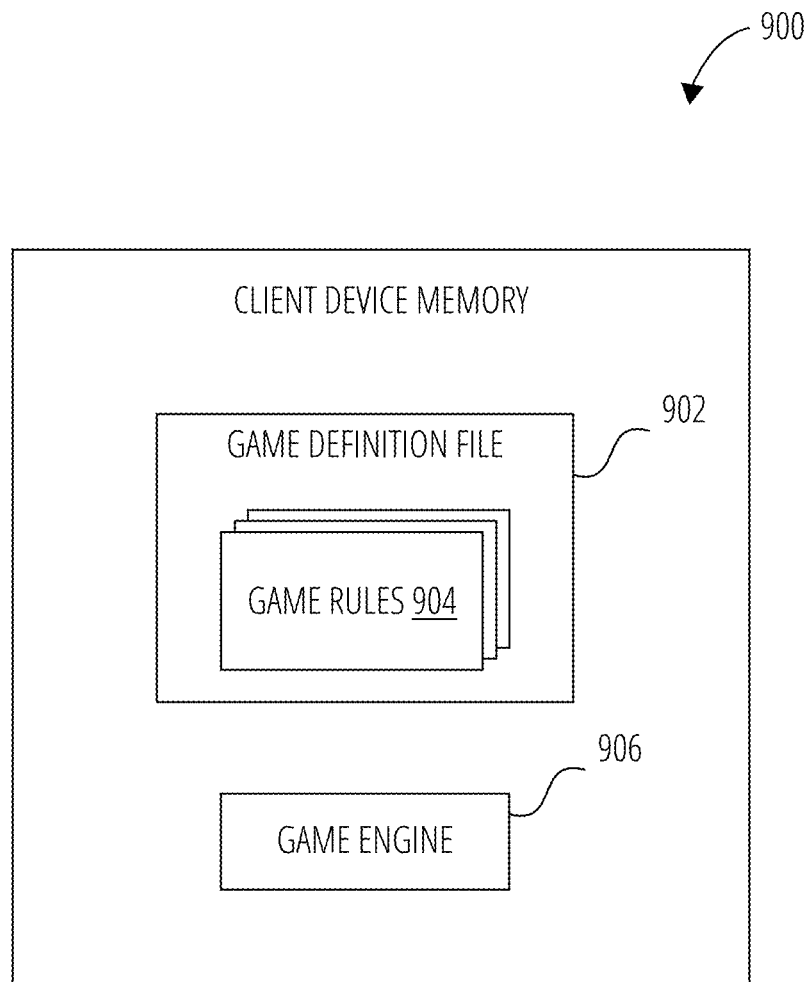
FIG. 9 is a block diagram of a client device memory for providing interactive gameplay, in accordance with some examples.

FIG. 9 is a block diagram of a client device memory 900 for providing interactive gameplay, in accordance with some examples. As shown, the memory 900 stores a game engine 906 and a game definition file 902 externally to the game engine 906. The software for the game engine 906 and the game definition file 902 may be received from different sources, but may be used for gameplay of a common designated game.

As shown, the game definition file 902 for the designated game stores game rules 904 for the designated game. The game definition file 902 defines the game rules 904 using non-compiled machine-readable code. The game engine 906 is for playing the designated game (and, in some cases, also other game(s)). The game engine enables 906 interactive gameplay of the designated game via a graphical user interface (GUI) according to the game rules 904 for the designated game defined by the game definition file 902.

In some cases, the game definition file 902 represents a formal first order predicate logic for playing the designated game via the game engine 906. At least one of the game rules 904 may include a logical manipulation of a game state in response to a user action or a current game state. The logical manipulation of the game state may indicate how a character or a content item is moved in the designated game or how points are assigned in the designated game.

Figure 10:
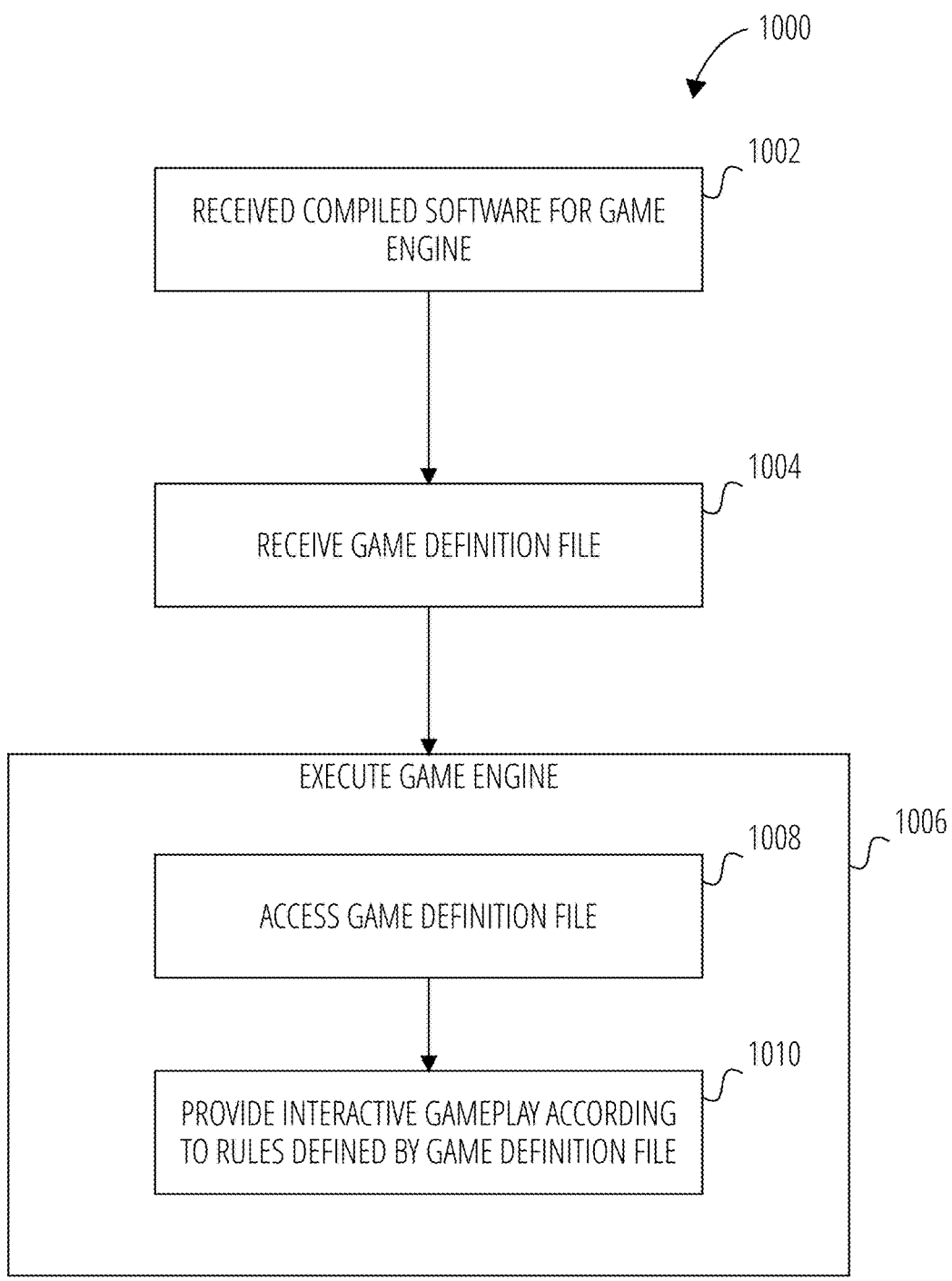
FIG. 10 is a flow chart of a method for providing interactive gameplay, in accordance with some examples.

FIG. 10 is a flow chart of a method 1000 for providing interactive gameplay, in accordance with some examples. The method 1000 may be implemented at a client device.

At operation 1002, the client device receives compiled software for a game engine. The game engine is for playing the designated game and, in some cases, also other game(s). The compiled software for the game play engine may be received, at the client device, from an application store server.

At operation 1004, the client device receives a game definition file for the designated game. The game definition file stores rules for the designated game. The game definition file defines the rules using non-compiled machine-readable code. The game definition file may be received, at the client device, from a game server. The application store server may be separate and distinct from the game server. Alternatively, at least a portion of the application store server may be identical to at least a portion of the game server.

At operation 1006, the client device executing the game engine to enable playing of the designated game via the client device. As illustrated, executing the game engine includes operations 1008 and 1010. At operation 1008, the client device accesses the game definition file. At operation 1010, the client device provides a graphical user interface (GUI) to enable interactive gameplay of the designated game according to the rules for the designated game defined by the game definition file. The interactive gameplay may include providing, via the GUI, a graphical output and receiving, via the GUI at the client device, a user input for taking a user action in the designated game.

In some examples, the client device receives an updated game definition file for the designated game. In some examples, the game definition file may be updated very frequently (e.g., once or multiple times per day) while the game engine is updated much more rarely (e.g., once per month). This technique allows the game developer to make frequent updates to the game using the game definition file, without needing to access the application store server or update the game engine. In some cases, different game rules may be provided to different client devices to enable different gameplay experiences at the different client devices. This may be used, for example, to tailor a user's gameplay experience to his/her interests or to A/B test potential new features. The client device executes the game engine at the client device to play the specified game by: accessing the updated game definition file and providing a GUI to enable interactive gameplay of the designated game according to the rules for the designated game defined by the updated game definition file. The updated game definition file may be received without receiving an updated game engine and without updating the game engine.

Multidimensional Parametric Player Modeling

As introduced above with reference to the example of FIG. 1-FIG. 6 (and expanded on briefly in FIG. 3 and FIG. 6), one aspect of the disclosure relates to methods, systems, and techniques for generating a multidimensional parametric player model representative of player behavior by one or more players in a computer game. The parametric player model thus populated is used in the identification of groups or clusters of players, and/or in at least partly automated configuration of custom game content for behavior consistent with the parametric player model. A single parametric player model (that is, a single set of parametric values corresponding to multiple predefined gameplay parameters) can be used to model the behavior of a single respective player (e.g., based on historical gameplay data 602 of that player) or to model the behavior of multiple players (e.g., based on cumulative historical gameplay data 602 for the relevant players), providing a representative player model for those players.

Various features and functionalities according to this aspect of the disclosure are described below by way of example with reference to FIG. 11-FIG. 12, which is for clarity and ease of reference described as being implemented by s 100 described previously with reference to FIG. 1. Similar system components are referenced by similar reference numbers in the examples of FIG. 12-FIG. 13, on the one hand, and the remainder of the figures, on the other hand. Note that, although various aspects relating to the player modeling are described in the example that follow as being incorporated in a system that employs, in combination, the various other aspects of this disclosure, the disclosed parametric player modeling techniques can in other examples be employed separately from at least some of the other techniques discussed herein. Thus, for example, multidimensional parametric player modeling can in some examples be used for identifying player segments or clusters based on clustering the respective player models. In other examples, parametric player modeling and partly automated game customization based thereon can be employed without provisioning the resultant customized game in an architecture comprising an on-device compiled game engine consuming non-compiled game configuration data. Note that the above-exemplified alternative incorporation of the automated content generation in broader game management architectures and methods is not exhaustive.

Referring briefly to FIG. 3 and the associated description above, it will be noted that the disclosure provides for generation and use of a parametric player model that represents gameplay behavior as a set of parametric values corresponding to a parameter set defining multiple respective gameplay parameters (interchangeably referred to herein as dimensions of a parameter space defined by the parameter set). Note that, in some examples, the player model may include not only parameters pertaining to gameplay, but additionally include one or more traversal parameters indicative of a game traversal behavior or journey (e.g., a user's non-gameplay behavior, style, action patterns, habits, or inferred motivations as it relates to moving through different screens, actions, or options within the game in one or more sessions).

The example described below with reference to FIG. 11 and FIG. 12 employs a parameter set limited to gameplay parameters, but it should be appreciated that other examples include in the player model a subset of traversal parameters. In the examples discussed previously with reference to FIG. 1-FIG. 6, as well as the examples described below with reference to FIG. 21, a player modeling engine 120 calculates a number of traversal parameters from behavior graphs 130 derived from game traversal data 610, and includes the calculated numerical values for these traversal parameters in the relevant player model. In some examples, the traversal parameters indicate parametric values for one or more psychological features associated with gameplay behavior (e.g., a player's emotional state or motivation for engagement), and are thus also referred to herein as psychological parameters or dimensions of the player model. The techniques described below with reference to gameplay parameters and modeling are thus to be understood as extending by analogy to modeling and use of traversal or psychological parameters and modeling. Thus, the techniques and mechanisms described as relating to gameplay parameters can in other examples be performed, in addition to or separately from, any number of traversal parameters. Therefore, a separate parametric traversal model can in some examples be generated and employed in automated assessment and content generation. In the example described below, the parameter set consists of 64 gameplay parameters/dimensions. In another example that employs generation and processing of behavior graphs 130 for the same game, the player model includes these 64 gameplay parameters and an additional four traversal parameters/dimensions.

Figure 11:
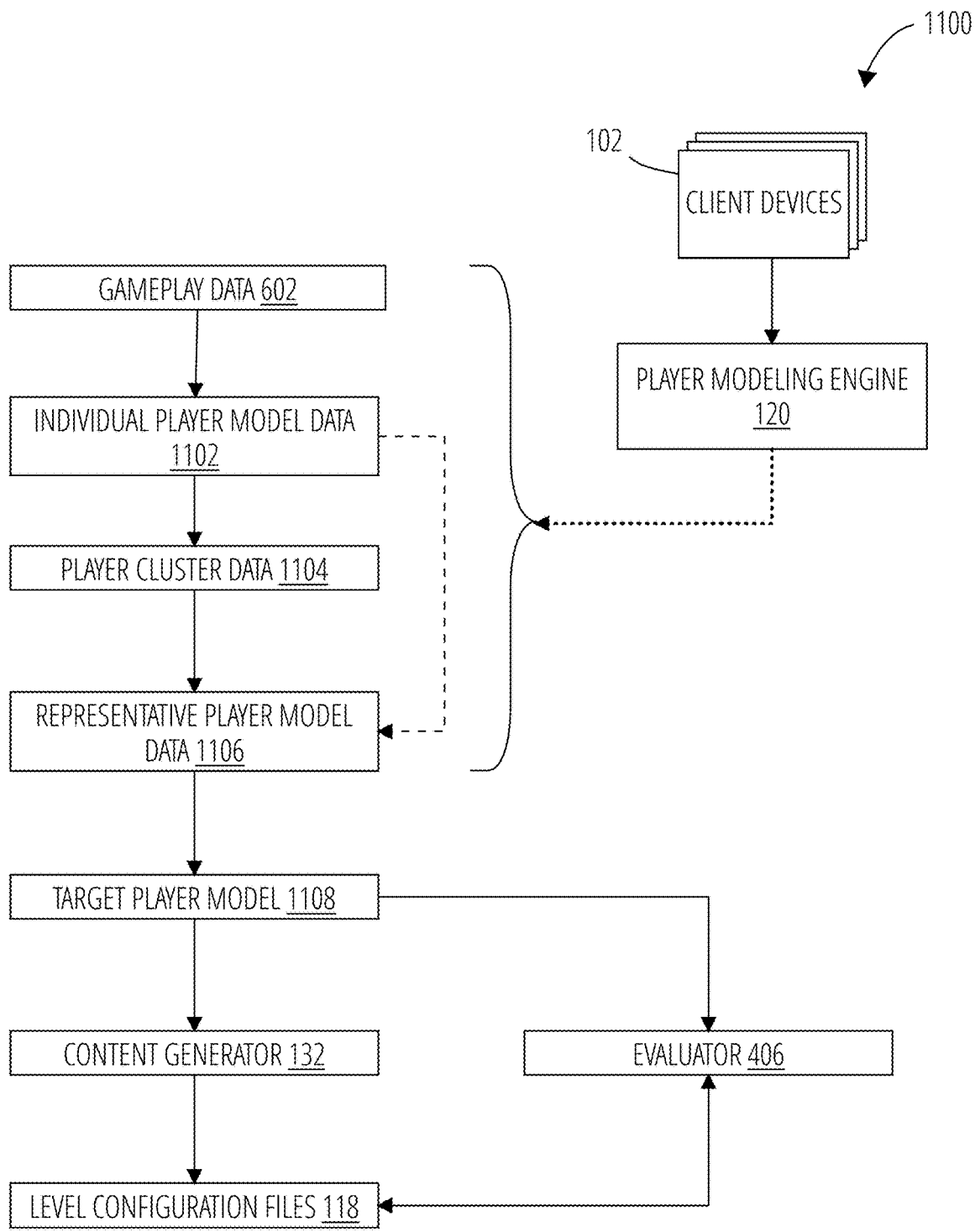
FIG. 11 is a data flow diagram illustrating the generation and use of the multidimensional parametric player model data, according to one example.
Figure 12:
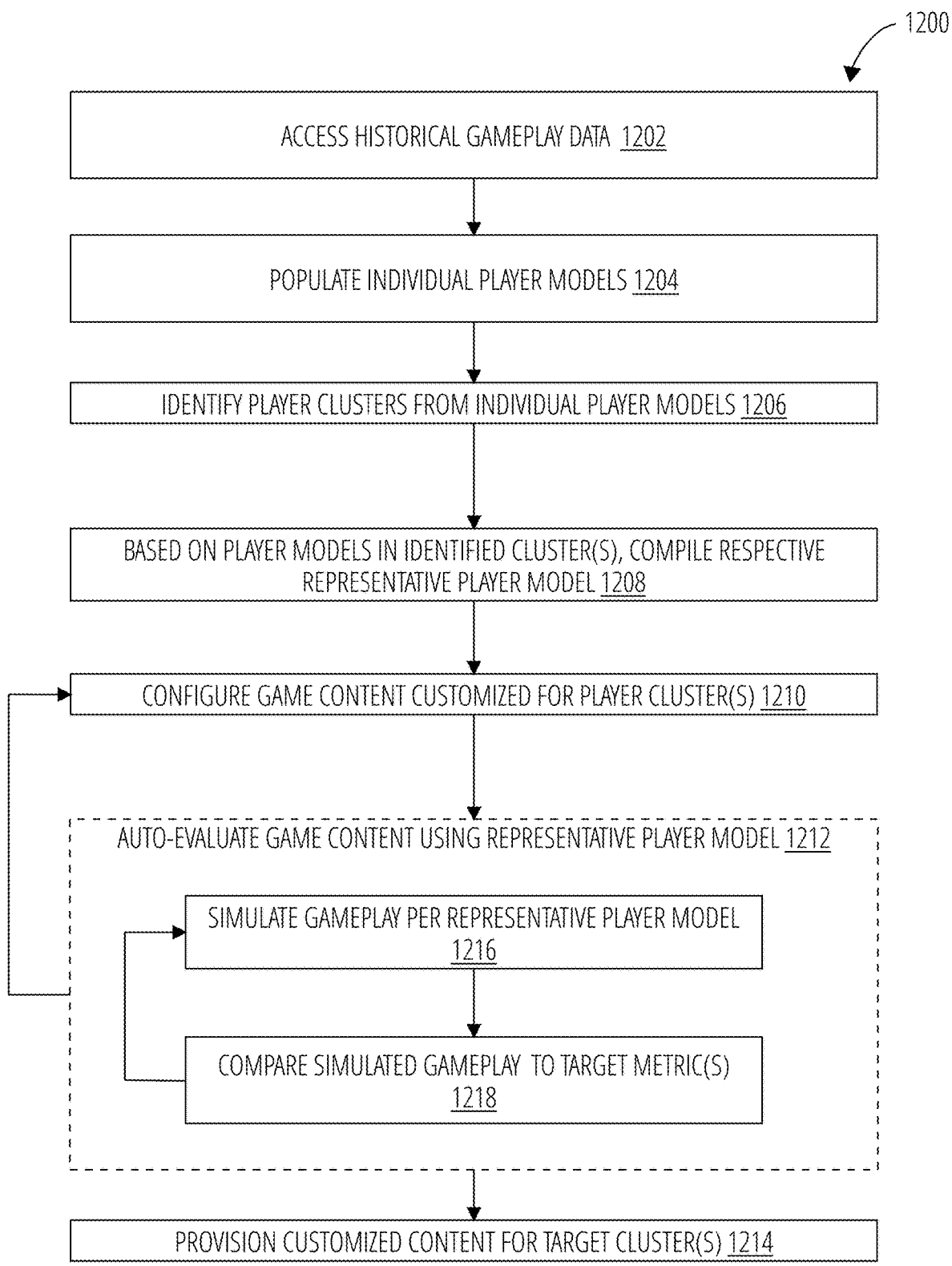
FIG. 12 is a schematic flow diagram illustrating a method for generating parametric player model data and using the player model data to customize game content, according to one example.
Figure 13:
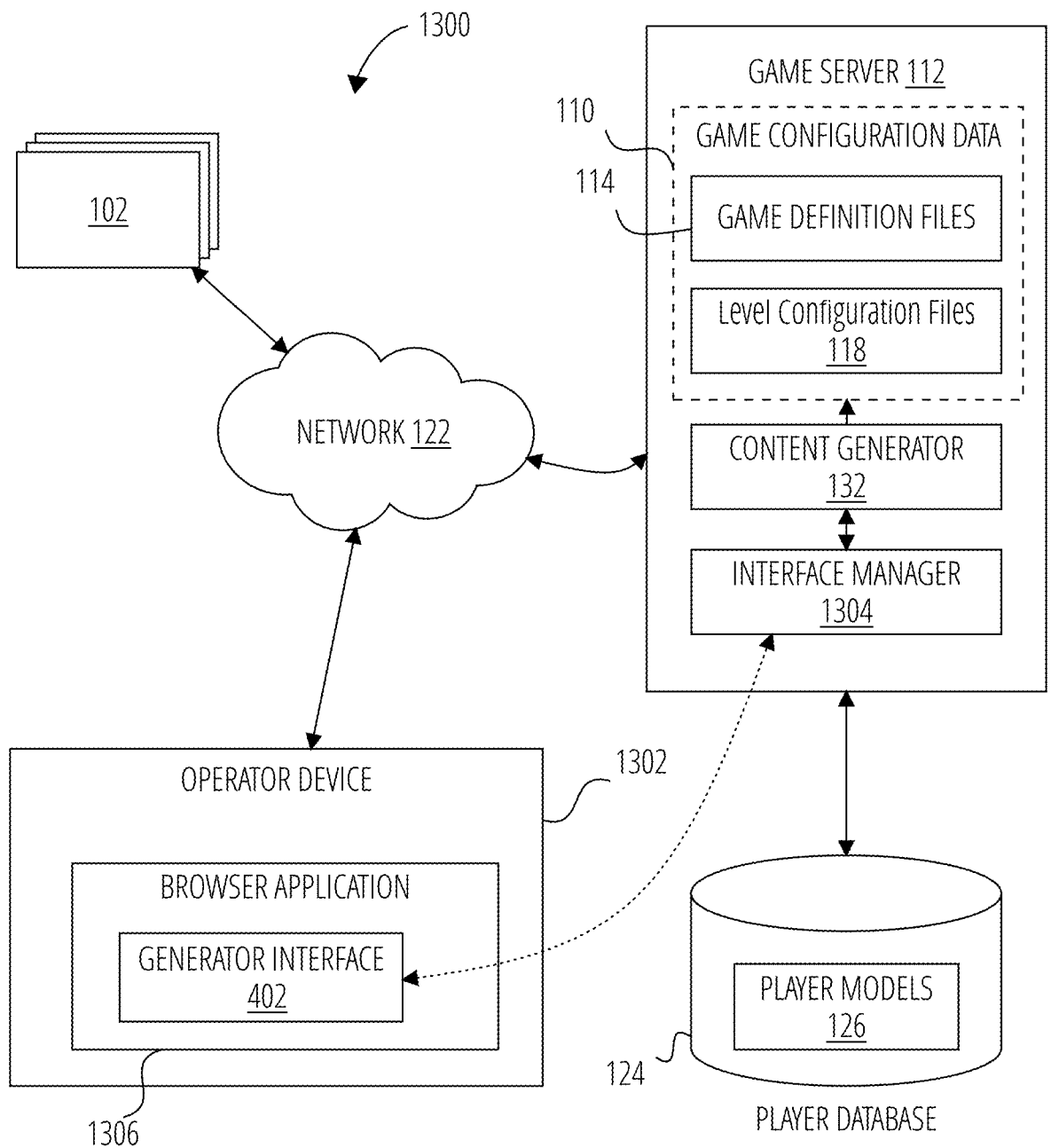
FIG. 13 is a schematic view of a system that provides a map-based generator interface for automated content generation for a computer-implemented game, according to one example.

Turning now to FIG. 11, therein is shown a data flow diagram 1100 schematically illustrating some aspects of data production and flow in the s 100 (FIG. 1, see also FIG. 6) according to an example method 1200 represented schematically in the flow diagram of FIG. 12. At operation 1202 (FIG. 12), the player modeling engine 120 accesses historical gameplay data 602 for a superset of players consisting of all of the players with respective user accounts 128 (FIG. 1).

In this example, the gameplay data 602 is on an ongoing basis generated and maintained by the player modeling engine 120 based on gameplay of the multiple players via their respective client devices 102. The gameplay data 602 in this example is generated by analyzing gameplay inputs and calculating respective parametric values for each of a predefined structured parameter set. Each parametric value is a numerical value that represents player behavior for a corresponding one of the gameplay parameters. In this example, each parametric value is a real number, meaning that it is a floating-point number allowing for decimal values. In this regard, note that in examples where original raw parametric values are retained in the player model without statistical manipulation (such as by normalization), the parametric values for some of the gameplay parameters (e.g., a maximum word length) can for individual player models 126 necessarily be limited to natural numbers, but that the parametric values for such parameters in representative or composite player models (which are constructed based on the gameplay data 602 for multiple players) can nevertheless have a value located on a number line between adjacent natural numbers (i.e., having decimals).

All possible combination of values for the parameter set can be visualized as a conceptual multidimensional parameter space in which the principal dimensional axes of an n-dimensional Cartesian coordinate system are defined by the parameter set. Thus, in the example player model structure described below with reference to Table 1, the parameter set defines a 64-dimensional space whose dimensions are defined by the listed game parameters. For this reason, the gameplay parameters of the parameter set are occasionally also referred to herein as dimensions of the player model. Because each gameplay parameter in the parameter set essentially has a continuous range of possible values, the multidimensional parameter space is in effect a continuous space.

Any particular player model 126 (i.e., a single set of parametric values mapping one-to-one to the parameters of the parameter set) therefore be interpreted as providing coordinates indicating a particular discrete datapoint in the multidimensional space, analogously to the identification of any point in physical space by three dimensional values for its x-y-z coordinates. A straight line in the parameter space between such a datapoint and the origin of the coordinate axes thus describes a vector in the multidimensional space. For this reason, a single set of parametric values for the parameter set is variously referred to herein synonymously as a player model, a datapoint in the parameter space, or a gameplay vector.

In the example previously described with reference to FIG. 1-FIG. 3, the parameter set for the game of FIG. 2A-FIG. 2C is defined as listed in Table 1 below.

| ORDINAL SLOT | CATEGORY | GAMEPLAY PARAMETER | DEFINITION |
|---|---|---|---|
| 1 | vocabulary | in-game vocabulary per level | Total number of distinct words spelled |
| 2 | vocabulary | In-game vocabulary per level | [Total number of distinct words spelled]/[total levels played] |
| 3 | vocabulary | total words spelled | Total number of words spelled |
| 4 | vocabulary | word frequency | [total words spelled]/[in-game vocabulary] |
| 5 | vocabulary | avg word length | Average length of words spelled |
| 6 | vocabulary | max word length | The maximum length of words spelled |
| 7 | vocabulary | stdev word length | Standard deviation for length of words spelled |
| 8 | vocabulary | avg word spelled speed | Average time interval between each word spelled |
| 9 | vocabulary | avg word score without multiplier | Average word score without including multipliers |
| 10 | vocabulary | avg word score | Average score of each word spelled |
| 11 | vocabulary | stdev word scores without multiplier | Standard deviation for which scores without including multipliers |
| 12 | powerup | cnt_powerup_usage-hint | Count of times hints were used |
| 13 | powerup | cnt_powerup_usage-bomb | Count of times bombs were used |
| 14 | powerup | cnt_powerup-usage-score multiplier | Count of times score multipliers were used |
| 15 | powerup | cnt_powerup_usage big bomb | Count of times big bombs were used |
| 16 | powerup | cnt_powerup_usage-letter bag | Count of times letter bags were used |
| 17 | powerup | tota_scores-hints | Total scores earned by using hints |
| 18 | power | total_score-bombs | Total score earned by using bombs |
| 19 | powerup | total_scores-score multiplier | Total score earned by using score multipliers |
| 20 | powerup | total_scores-big bombs | Total score earned by using big bombs |
| 21 | powerup | avg_time_remaining-first powerup used | Average time remaining in the level when the pair used the first powerup |
| 22 | powerup | avg_time_remaining-first hints used | Average time remaining in the level when the player used the first hints |
| 23 | powerup | avg_time_remaining-first bombsused | Average time remaining in the level when the player used the first bombs |
| 24 | powerup | avg_time_remaining-first score multiplier used | Average time remaining in the level when the player used the first multiplier |
| 25 | powerup | avg_time_remaining-first big bombs used | Average time remaining in the level when the player used the first big bombs |
| 26 | powerup | avg_time_remaining-first letter bags used | average time remaining in the level when the player used the first letter bags powerup |
| 27 | store | total spend on purchse-hints | Total amount spent on purchasing hints |
| 28 | store | total spend on purchse-bombs | Total amount spent on purchasing bones |
| 29 | store | total spend on purchse-score multiplier | Total amount spent on purchasing score multipliers |
| 30 | store | total spend on purchse-big bombs | Total amount spent on purchasing big bombs |
| 31 | store | total spend on purchse-letter bags | The amount spent on purchasing letter bags |
| 32 | store | total count of purchase-hints | Count of hints purchased |
| 33 | store | total count of purchase-bombs | Count of bombs purchased |
| 34 | store | total count of purchase-score multiplier | Count of score multipliers purchased |
| 35 | store | total count of purchase-big bombs | Count of big bombs purchased |
| 36 | store | total count of purchase-letter bags | Count of letter bags purchased |
| 37 | store | total amount purchsed-hints | Total amount of hints purchased |
| 38 | store | total amount purchsed-bombs | Total amount of bombs purchased |
| 39 | store | total amount purchsed-score multiplier | Total amount of score multipliers purchased |
| 40 | store | total amount purchsed-big bombs | Total amount of big bombs purchased |
| 41 | store | total amount purchsed-letter bags | Total amount of letter bags purchased |

-continued

| ORDINAL SLOT | CATE-GORY | GAMEPLAY PARAMETER | DEFINITION |
|---|---|---|---|
| 42 | store | # store refresh | Count of store refreshes |
| 43 | store | total spend on store refresh | Total amount spent on store refreshes |
| 44 | store | purchase on discounted items | Total spend on discounted items |
| 45 | performance | avg time remaining per level | Average time remaining at level completion |
| 46 | performance | vertical move per word spelled | Average number of rows moved down by player character for each word spelled |
| 47 | performance | daily total wins | Average total of wins per day |
| 48 | performance | daily total loss | Average total losses per day |
| 49 | performance | daily win/loss ratio | Average daily win-loss ratio |
| 50 | performance | daily total quits | Average number of times per day the player exits game level before it ends |
| 51 | performance | avg score per level | Average score per game level completed |
| 52 | performance | avg stars per level | Average number of rewards stars earned per game level |
| 53 | performance | avg leaderboard rank | Average rent for the player on game-wide leaderboard |
| 54 | performance | max level unlocked | Highest game level unlocked by game progress |
| 55 | engagement | avg replay | number of times the player replays the level that they've passed before (to achieve higher score or get more rewards) |
| 56 | engagement | daily time | Average time spent on playing the game per day |
| 57 | engagement | daily total levels played | Average number of levels played per day |
| 58 | engagement | daily level-up speed | Average daily level-up speed |
| 59 | engagement | avg experience gained per day | Average increase per day in XP |
| 61 | wealth | daily min wallet-coins | Average daily minimum coin balance |
| 62 | engagement | daily max wallet-coins | Average daily maximum coin balance |
| 63 | engagement | daily spend-coins | Average daily coins spent |
| 64 | engagement | daily session | Average number of gameplay sessions per day |

In this example, the parametric values for these parameters are normalized, e.g., being normalized to unity and having a value ranging between zero and one indicative of a prevalence of the underlying raw value. Thus, a daily total wins value of 0.5 indicates that the relevant player (or set of players) display average performance for this parameter, while lower values indicate worse performance and higher values indicate better performance. It will be appreciated that different mathematical or statistical normalization or equalization mechanisms can be employed in different examples to provide a common value range for the entire parameter set.

At operation 1204 (FIG. 12), the player modeling engine 120 on an ongoing basis automatically populates respective individual player models 126 for each of the multiple players in the global player set. In the present example, having the parameter set of Table 1, the player modeling engine 120 thus analyzes the gameplay data 602 for each player and populates a respective parametric value for each of the 64 gameplay parameters. Each player model 126 is in this example stored as a structured series of 64 separated parametric values, with the ordinal position of each value indicating its mapping to a corresponding one of the gameplay parameters as per the ordinal slot indicated in Table 1. These sets of values are stored in the player database 124 as individual player model data 1102 (FIG. 11).

At operation 1206 (FIG. 12), the player modeling engine 120 performs a clustering operation that processes the individual player model data 1102 to identify one or more player cohorts or segments forming respective subsets of the global set of players by identifying clusters of vectors or datapoints in the multidimensional parameter space represented by the respective individual player models 126. Player cluster data 1104 (FIG. 11) thus produced is stored in the player database 124. The player cluster data 1104 in this example includes respective identifiers (e.g., numerical labels) for a plurality of identified clusters together with identification of the particular subset of players included in each cluster. This enables operator-selection of any one or more of the clusters for analysis or custom content generation (e.g., via a cluster selection mechanism 1524 provided in a web-based generator interface 402, as described with reference to FIG. 15C below). It will be appreciated that there are well-established techniques for such mathematical analysis of multidimensional geometry and calculating relationships and arrangements of points in multidimensional space. Different clustering techniques can be employed in different examples.

In this example, the player modeling engine 120 automatically calculates a distance (i.e., the length of the shortest rectilinear spacing in the multidimensional parameter space) between respective datapoints indicated by the individual player models 126 in the parameter space. Clusters are then identified based on proximity as indicated by the calculated interstitial distances. In this example, the clustering operation can be controlled or directed by an operator such that the granularity of clustering can be selectively varied. Thus, for example, the operator can select to segment the entire parameter space into 2 clusters, 10 clusters, 100 clusters, or any desired number of clusters. In a particular example, cluster identification is performed hierarchically, by identifying a number of primary clusters (e.g., 10 clusters) from the original global player set, identifying a number of secondary clusters (e.g., 10 clusters) within each primary cluster, and identifying a number of tertiary clusters (e.g., 10 clusters) within each secondary cluster.

It will thus be seen that the disclosed modeling clustering techniques allows wide flexibility in identifying different clusters of players for customization or analysis. Moreover, different selective clustering techniques can be employed in other examples. In this example, player clustering is performed in the full 64-dimensional parameter space, but in other examples a subset of the full parameter set can be selected for segregated clustering, so that clusters of datapoints are identified in a multidimensional subset parameter space defined by the selected subset of parameters.

At operation 1208, a representative player model 126 is compiled for one or more of the identified player clusters, producing representative player model data 1106 stored in the player database 124 for use during content generation and/or automated evaluation. Each representative player model 126 is generated based on the respective individual player models 126 of the players included in the relevant player cluster. In this example, the representative player model 126 is compiled by calculating a respective parametric value for each of the predefined set of gameplay parameters based on the respective corresponding parametric values of the constituent individual player models 126 of the cluster at issue. In this example, each parametric value is calculated as the average of the parametric values of the constituent player models 126. This technique is illustrated below by way of a highly simplified abbreviated example for a player cluster with three members:

Cluster 7:
Player A Player Model: [0.7; 0.4; . . . ; 0.1; 0.8]
Player B Player Model: [0.8; 0.9; . . . ; 0.5; 0.1]
Player C Player Model: [0.2; 0.6; . . . ; 0.8; 0.4]
Representative player model for Cluster 7: [0.56; 0.63; . . . ; 0.47; 0.43]

Note that different techniques for calculating a statistical average for a statistically representative parametric value for each of the parameters can be used in other examples. Note also that some examples (e.g., in which player cluster identification is otherwise than by computing clusters in multidimensional space, e.g., by operator selection of a pre-defined cluster or by prior player segmentation on criteria other than the multidimensional parameter space) can provide for calculation of a representative data model for an identified or selected player cluster or cohort directly from the gameplay data 602, without compiling respective individual player models 126. Different techniques for providing a representative player model 126 for a player cluster can be used in other examples. In one such alternative example, a most representative one of the individual player models 126 in the cluster (e.g., a centroid vector in the parameter space) is identified and selected as representative player model 126 for use in auto-configuration of custom game content for the player cluster.

When game content is to be customized for one or more player clusters, the representative player model 126 for each player cluster is accessed and consumed by the content generator 132 and the evaluator 406 (FIG. 11, as well as previous discussions with respect to FIG. 1-FIG. 6), using the representative player model 126 as target player model 1108 (FIG. 11) for at least partly automated customization. Note that the operations that follow is described as being performed with respect to a single player cluster, but can in some examples be repeated automatically (e.g., in a batch processed triggered by an operator) for each one of a plurality of target clusters for which different game content is to be customized or custom generated.

Thus, at operation 1210, the content generator 132 performs automated generation of configuration data for a unit of gameplay (in this example, generating a level configuration file 118 as described at greater length with reference to FIG. 16-FIG. 18H) based at least in part on the applicable target player model 1108, thus having a configuration targeted or customized with respect to gameplay behavior of the target cluster as represented by the target player model 1108. Thus, different variants of identical game levels or game events will have different configurations resulting directly from differences in their respective target player models 1108.

Figure 20:
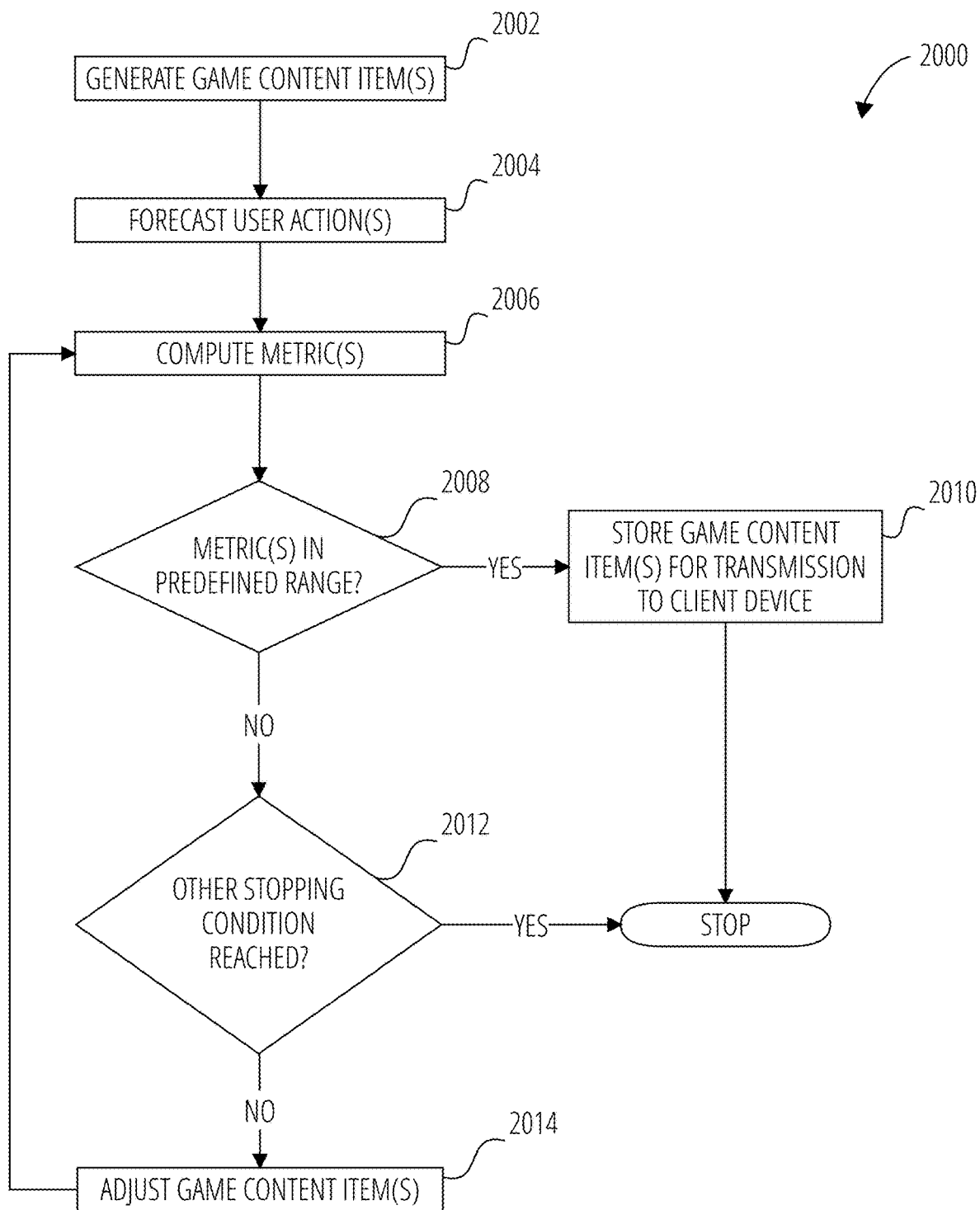
FIG. 20 is a flow chart of a method 2000 for automated dynamic custom game content generation, in accordance with some examples. The method 2000 may be implemented at a game server.

At operation 1212, candidate level configuration files 1718 thus auto-generated by the content generator 132 are evaluated, at operation 1212, in an automated operation by the evaluator 406. As described at greater length with reference to FIG. 20, such auto-evaluation includes simulating, at operation 1216, gameplay of each level configuration file 118 based on the applicable target player model 1108. In the present example, simulation of gameplay at operation 1216 comprises forecasting a sequence of gameplay actions consistent with the parametric values of the target player model 1108, so that the automated gameplay forecast would typically have different outcomes for an identical level configuration file 118 forecast according to different target player models 1108. At operation 1218, one or more performance metrics for the outcomes of the simulated gameplay are compared to respective corresponding target metrics predefined for the respective level configuration files 118. In one example, the target metrics define a difficulty level (e.g., quantified as a win-loss probability) for each level configuration file 118. In the example described below with reference to FIG. 13-FIG. 15C, respective target difficulty values are set consistent with operator input via the web-based generator interface 402.

If, at operation 1218, the evaluator 406 determines that a particular candidate level configuration file 1718 fails to satisfy predefined inclusion criteria with respect to the target metric(s) (e.g., falling within a predefined range of the specified target difficulty value), the candidate level configuration file 1718 is adjusted, and is reevaluated by simulated play. This adjustment and evaluation cycle is performed iteratively until the candidate level configuration file 1718 satisfies the inclusion criteria, or is discarded. If, at operation 1218, the evaluator 406 determines that the level configuration file 118 satisfies the predefined inclusion criteria, the level configuration file 118 is accepted, included in the relevant game event, and stored for provisioning, at operation 1214, exclusively to players who are members of the relevant target player cluster.

In summary, it will be seen from FIG. 11 that the individual player model data 1102 is used in identifying player clusters and constructing representative player model data 1106 for the identified clusters. A target player model 1108 representative of a cluster of players is in turn used by the content generator 132 in the auto-configuration of game content specifically for the target cluster, and is used by the evaluator 406 for targeted forecasting of gameplay and gaming outcomes specifically according to gameplay behavior modeled by the target player model 1108.

Benefits of the disclosed player modeling methods and systems include in that it enables automated identification of groups of players based on similar behavior, and can do so at widely varying levels of granularity at minimal cost in terms of operator time and effort. Moreover, the parametric player model circumvents existing biases or conventional notions of player grouping, so that different playing styles or personas are an emergent property of the player modeling and clustering. In this manner, deeper insights with respect to player behavior can be gleaned than previously possible.

Furthermore, the player model provides a mathematical representation of respective playing styles or behaviors, facilitating ingestion of the player model information by a content generator to inform automated content generation, as disclosed in some examples herein.

Generator Interface

Another aspect of the disclosure relates to the provision of a generator interface that enables an operator to trigger automated generation by a content generator of a game event based on operator selection via the generator interface of respective values for a target metric (e.g., a difficulty level) for each of a plurality of game levels that are together to form the game event. In addition, the generator interface in some examples enables the operator to selectively vary the particular number of game levels that are together to form the game event, via an event sizing mechanism provided by the generator interface. Instead, or in addition, the generator interface in some examples provides a cluster selection mechanism enabling operator-selection of a particular one of a plurality of predefined subset of players (such player segments or cohorts in some examples being identified based on clustering in a multidimensional parameter space, and thus referred to for the purposes of this description as player clusters), with the game event being custom-generated for the selected player cluster based on a representative multidimensional parametric player model specific to the selected player cluster.

Various features and functionalities according to this aspect of the disclosure are described below by way of example with reference to FIG. 13-FIG. 15C. As can be seen with reference to FIG. 13, the example that follow is for clarity of description and ease of reference described as being implemented by a system 1300 analogous in architecture to s 100 described previously with reference to FIG. 1. Similar system components are referenced by similar reference numbers in the examples of FIG. 1 and FIG. 13, while some system components from FIG. 1 and from descriptions of other example systems and system components herein are omitted for brevity in the following description pertaining to functionalities of the generator interface, but these system components are to be read as tacitly included in the system 1300 of FIG. 13, unless otherwise indicated or unless the context clearly indicates otherwise. The system 1300 thus includes a game server 112 configured to manage the provision and support of a computer-implemented game playable via respective client devices 102 at least intermittently connected to the game server 112 over a distributed computer network 122 (in this example the Internet). As described previously with reference to FIG. 2A-FIG. 2C, the game server 112 in this example maintains game configuration data 110 in a data structure in which multiple game events each has a plurality of respective game levels, with the configuration of each game level being defined by a respective level configuration file 118. Note that different examples can employ different structured arrangements for game configuration data, without departing from the scope of this disclosure. Moreover, consistent with targeted customization of game content as described elsewhere herein, the game configuration data 110 in this example comprises, for at least some game levels, a number of different variants of each level configuration file 118, with different variants having different configurations customized for different respective subsets of players (referred to below as player clusters).

As described elsewhere herein, at least some of the level configuration files 118 is in this example auto-generated and/or auto-curated based on player model data that models player gameplay behavior as multidimensional vectors or datapoints in a high-dimensional parameter space in which each one of multiple predefined gameplay parameters provide respective dimensions of the parameter space. In this example, a player database 124 includes respective player models 126 compiled for each player of the game based on historical gameplay behavior. Stored player model data in this example further includes a respective representative player model 126 for each of a plurality or multiplicity of predefined or pre-identified clusters. In this example, at least some player clusters are defined or identified based on proximity or clustering of their respective player model datapoints in the multidimensional parameter space.

A representative player model 126 is in this example generated for a corresponding player cluster by calculating a statistically representative value (e.g., an average value, a median value, a centroid value, or the like) for each parametric dimension of the player model based on the corresponding dimensional values of the constituent members of the player cluster. In another example, one of the constituent player models (i.e., the player-specific multidimensional parametric datapoint) that is most representative of the relevant player cluster (e.g., a cluster centroid vector) is selected as a representative player model 126. Such representative player models 126 is in this example calculated upon definition or identification of the respective player clusters, which representative player models 126 are retrievable for subsequent use in game customization or content generation. In other examples, a representative player model 126 can be calculated on the fly during game customization or content generation for the respective player cluster.

The game server 112 further includes a content generator 132 configured for performing automated configuration of game content, in this example being configured for automated generation and curation of a plurality of level configuration files 118 for a game event such that the corresponding plurality of game levels are customized for gameplay according to the dimensional values of a particular player model 126 for which targeted customization is specified by an operator. To this end, the game server 112 includes an interface manager 1304 configured to provide and manage control of the content generator 132 by an operator via a remote operator device 1302 in communication with the game server 112 via the network 122. As will be seen in the description that follows, the generator interface 402 allows the input of operator commands and control parameters for flexibly variable generation of game events customized to selectable player clusters, with communication between the generator interface and the content generator 132 being facilitated by the interface manager 1304.

The generator interface 402 in this example a web-based interface generated in communication with the interface manager 1304 within a browser application 1306 executing on the operator device 1302. In this example, the browser application 1306 provides an HTML interface, but it will be appreciated that other browsing standards can be employed in other examples.

Various functionalities and input mechanisms of the generator interface 402 according to one example will now be described with reference to example methods 1400 (represented schematically in a high-level example flow diagram in FIG. 14A, and in a more detailed example low-level flow diagram in FIG. 14B) at the hand of the example screenshots shown in FIG. 15A-FIG. 15C.

At operation 1402, method 1400 causes display on the operator device 1302 of the generator interface 402 with respect the content generator 132, which is configured for at least partly automated generation of game configuration data 110 for a game event in the computer-implemented game, the game event comprising a plurality of game levels. FIG. 15A shows a home screen 1502, in which the operator can select an event generation option 1504 that causes display of an event generator screen 1506 (FIG. 15C) that provides a number of input mechanisms for triggering automated generation of custom game content by the content generator 132.

The method 1400 further comprises, at operation 1404, receiving via an event sizing mechanism 1508 provided by the generator interface 402, operator input of an event size value that quantifies the plurality of game levels which are together to form the game event and for which respective level configuration files 118 are to be generated. In this example, the event sizing mechanism 1508 comprises a text input box showing a current value for the number of game levels that are to be generated for the new event. This event size value can be changed either by typing into the text box, or by stepwise incrementation or decrementation using respectively a plus button or a minus button forming part of the event sizing mechanism 1508. In the example shown in FIG. 15C, the new event is to be generated with 10 game levels.

At operation 1406, operator input is received via a target input mechanism 1510 that defines, for each of the game levels, a respective value for a target metric with respect to gameplay performance in that game level. The target metric is in this example a difficulty level of the respective game levels, which are individually variable via the target input mechanism 1510. As shown in the screenshot of FIG. 15C, the target input mechanism 1510 in this example defines a target curve 1512 that visually represents the respective selected difficulty values for respective game levels. The value for each game level is represented by a node 1514, which in this example is separately manipulable by the operator using a click-and-drag input (or alternatively a mousewheel or keyboard arrow input).

At operation 1408, operator input is received that causes automated generation by the content generator 132 of game configuration data 110 for the game event such that the game event has the specified number of game levels, each of which is auto-evaluated to have a difficulty level corresponding to the respective target value received via the target input mechanism 1510. In this example, such automated content generation is triggered by operator-selection of a generator trigger 1516 provided by a soft button labeled "Generate a New Event", causing the generator interface 402 to communicate to the content generator 132 the relevant input parameters or seed constraints for automated generation of the game event.

Figure 14A:
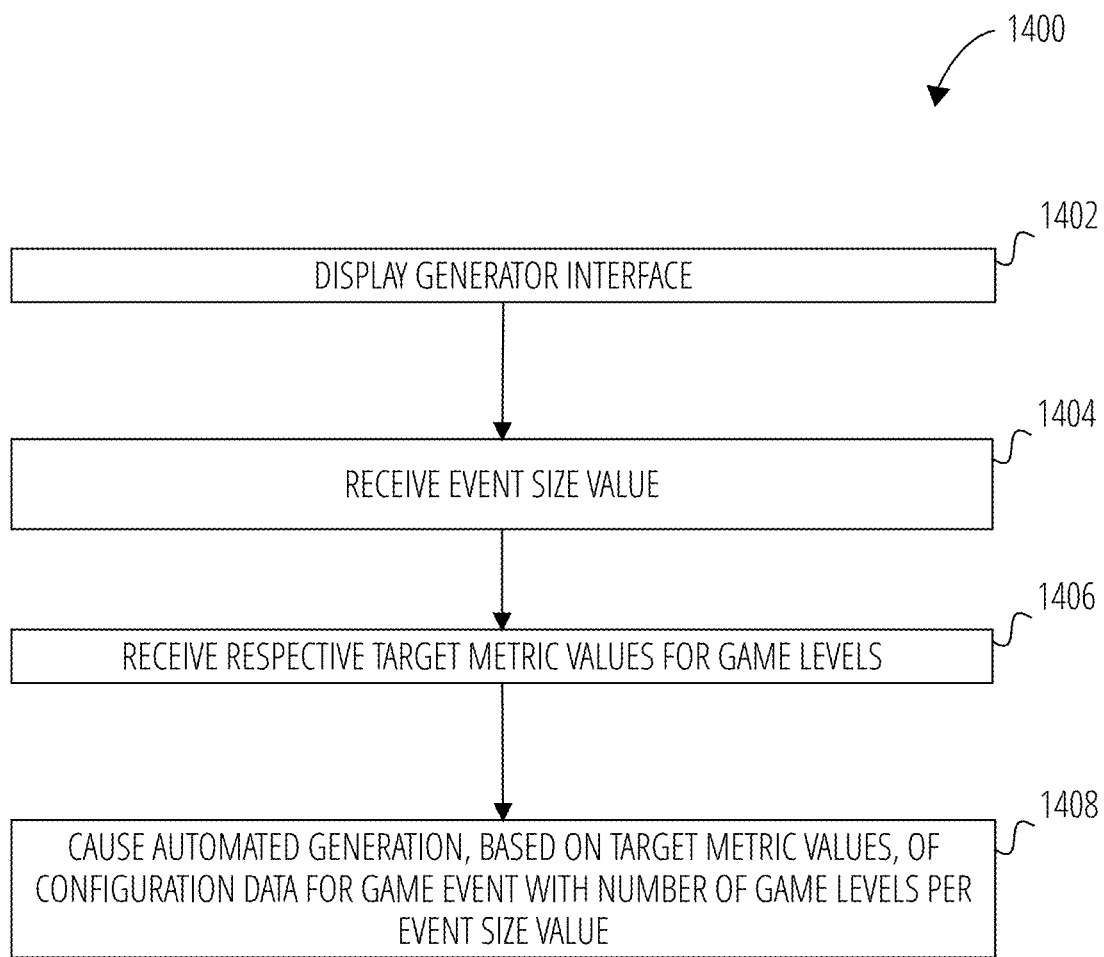
FIG. 14A is a high-level flowchart illustrating a method to provide operator control of automated game content generation via a generator interface, according to one example
Figure 14B:
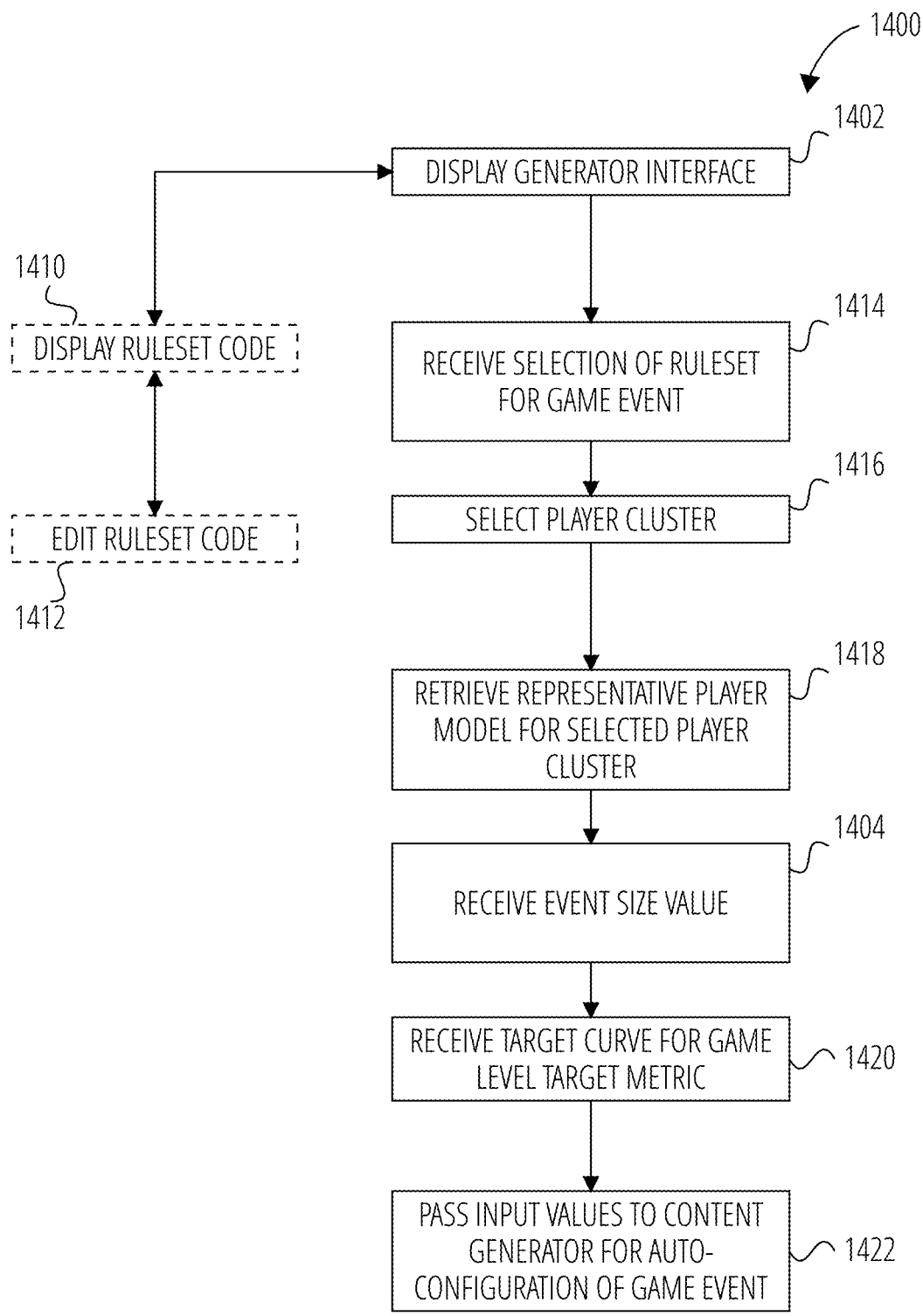
FIG. 14B is a flowchart illustrating a more detailed view of a method to provide operator control of automated game content generation via a generator interface, according to one example.
Figure 15A:
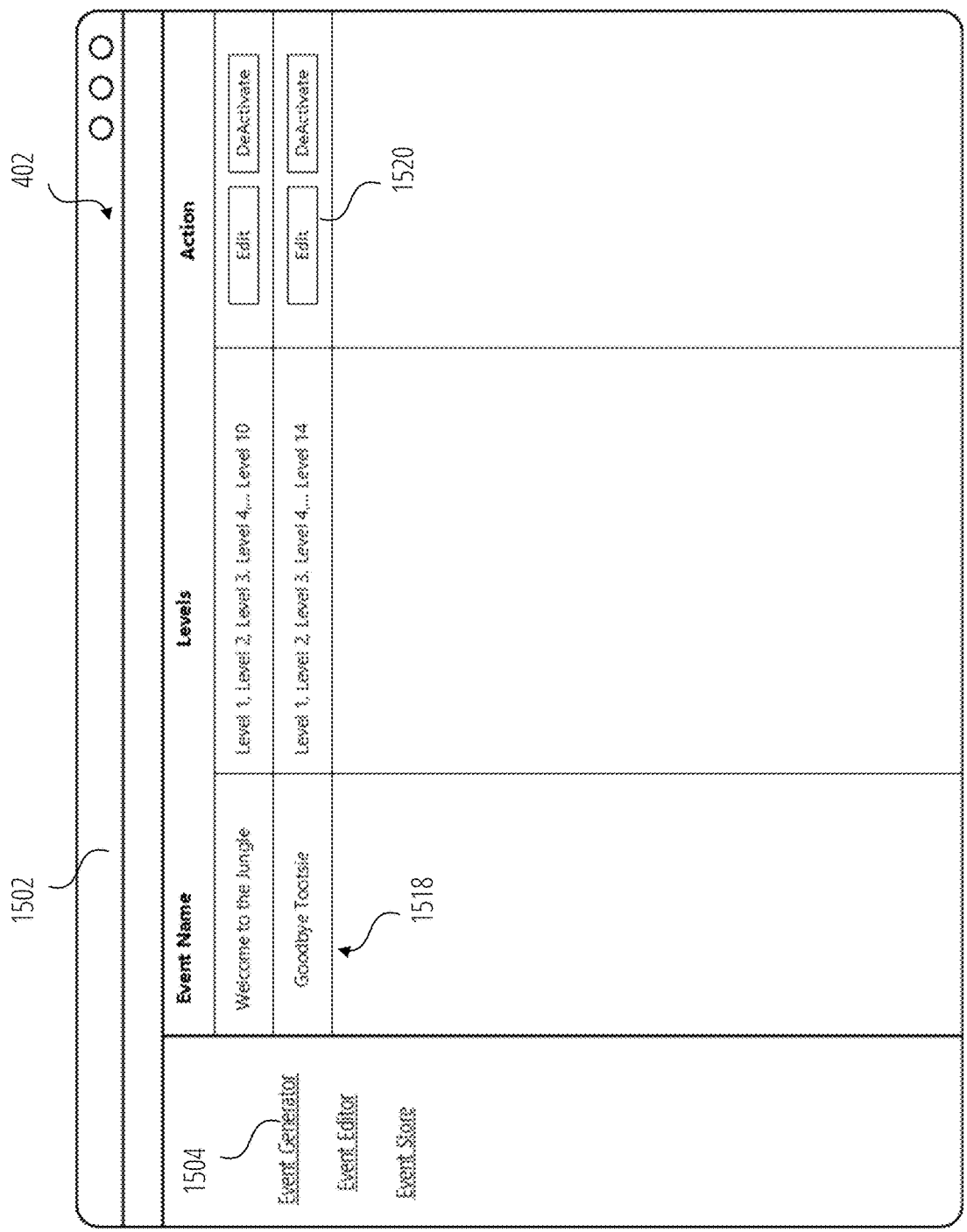
FIG. 15A-FIG. 15C are a series of screenshots of a web-based generator interface for a generating custom game content, according to one example.
Figure 15B:
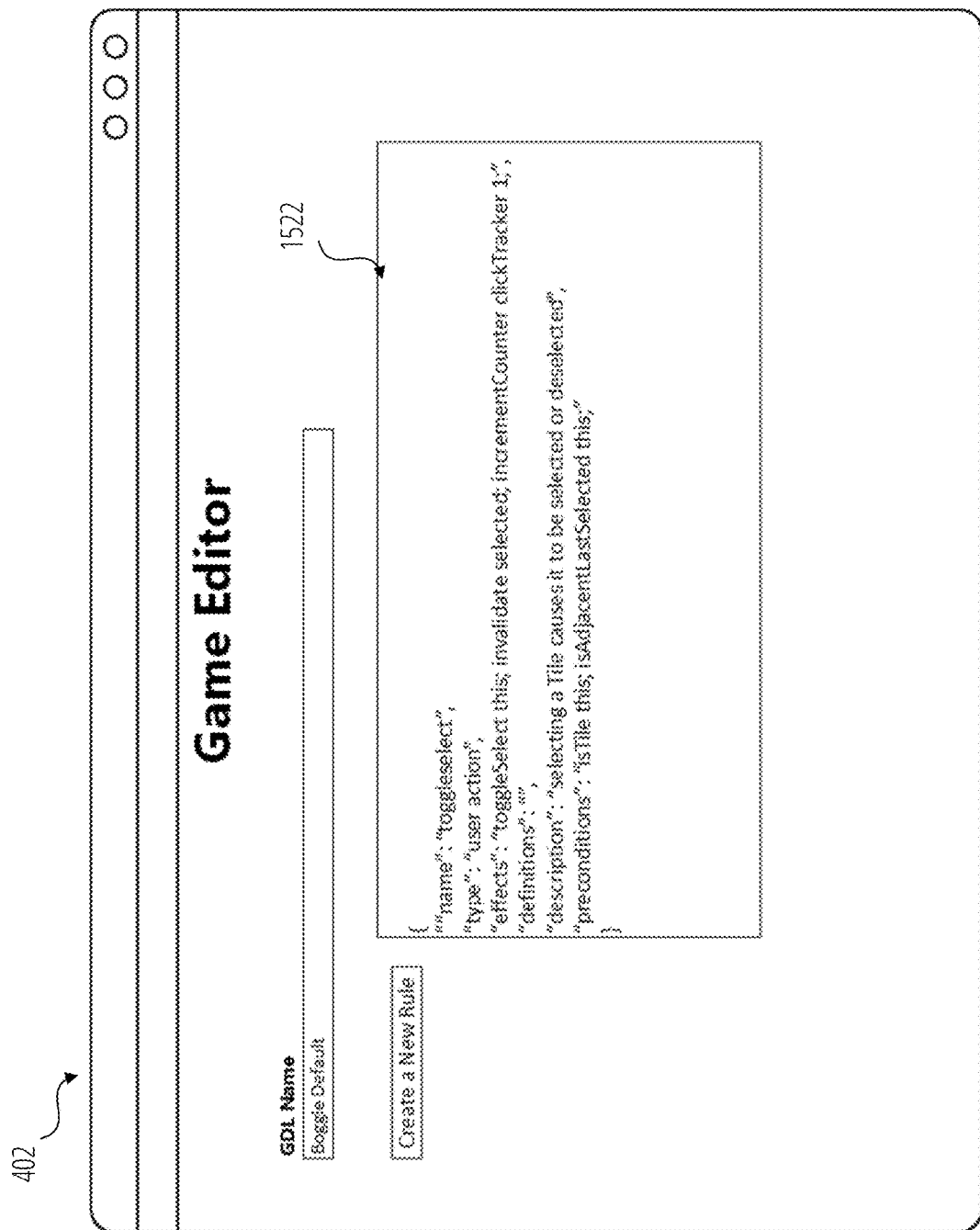
Figure 15C:
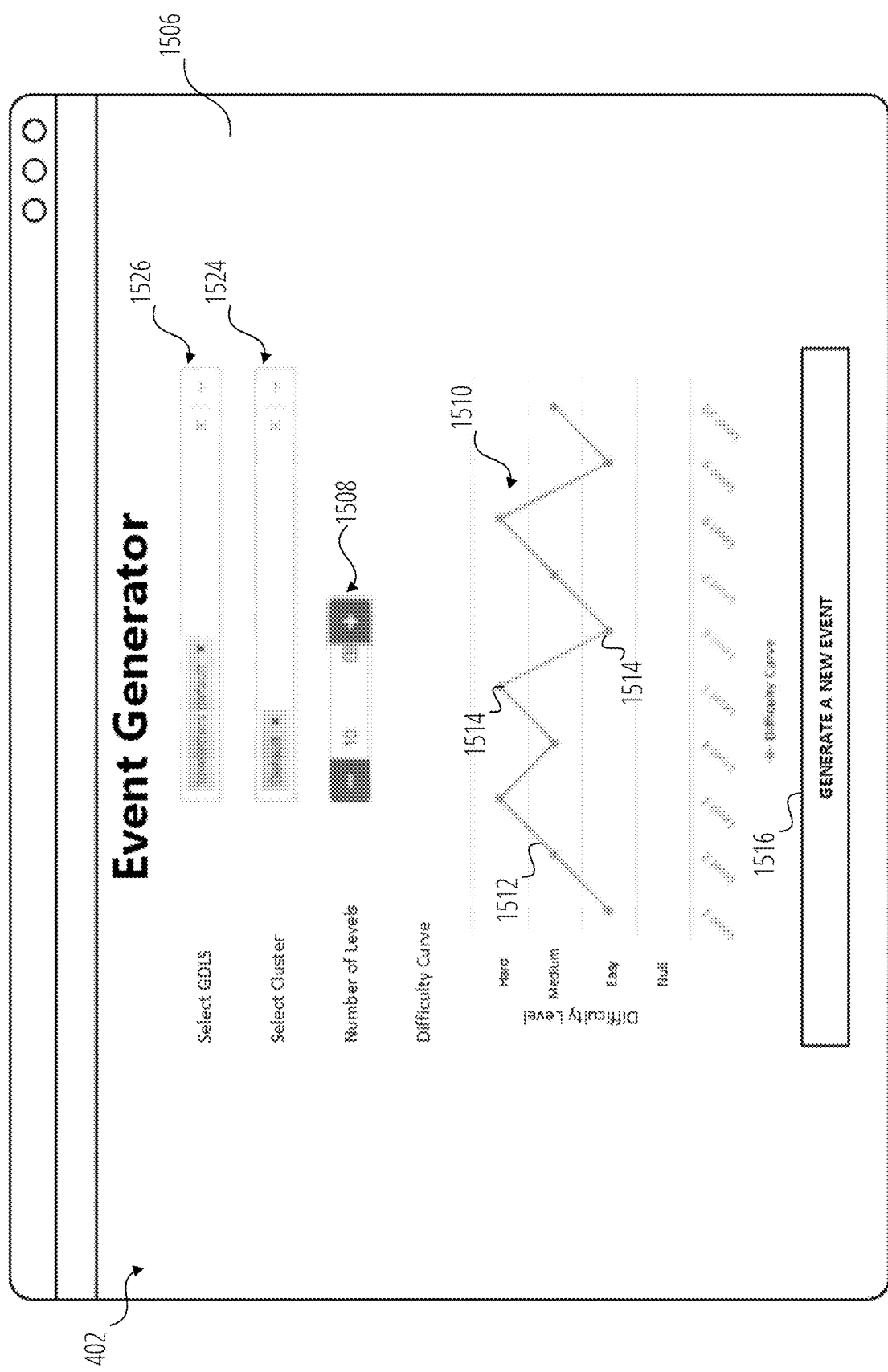

In the example of FIG. 14A, the method 1400 describes a high-level example in which a new game event is generated for a global set of players (i.e., not for a particular subset of the players) and is generated for gameplay according to game rules applicable universally throughout the game. FIG. 14B, however, schematically illustrates a more detailed example in which control functionalities of the generator interface 402 is employed to cause the generation of game content that is customized for a particular subset or cluster of players based on their gameplay behavior or style, and in which the game rules applicable to the newly generated game event (e.g., the applicable game definition file 114 as per the example of FIG. 1) is selectively variable by the operator.

Thus, when the generator interface 402 is displayed, at operation 1402, the operator is presented with an event list 1518 that indicates a list of existing predefined game events that can be selected for triggering generation of one or more customized variants thereof. Each entry in the event list 1518 includes metadata of the game event, including identification of a particular predefined ruleset that defines a respective set of game rules or game mechanics (see, e.g., elementary ruleset 202 in FIG. 2A) that can be selected for governing gameplay in a new game event or a new variant of a game event that is to be generated. If the user selects a code editing option 1520 on the home screen 1502 (e.g., to create a new ruleset for selection in the generation of new game event), the generator interface 402 displays, at operation 1410 (FIG. 14B), a code editing mechanism 1522 (FIG. 15B) that displays the selected ruleset as editable code in an editing window within the generator interface 402. The editing window enables the operator to edit, at operation 1412, the code of the selected ruleset, which the operator can then save such that the edited ruleset is available for selection so as to be applicable to current or future game events to be generated via the generator interface 402.

When the event generator screen 1506 is displayed responsive to user-selection of the event generation option 1504, the operator selects, at operation 1414, from the list of predefined rulesets (in this example, a list of predefined rules definition files 114) a particular ruleset that is to apply to the game event to be customized or generated. This is done via a rules selection mechanism 1526 (FIG. 15C) provided by the generator interface 402 in this example in the form of a drop-down UI element.

At operation 1416, the operator selects, via a cluster selection mechanism 1524, a particular one of a predefined list of player cohorts or player clusters for which the game event is to be customized. As will be understood from the description elsewhere herein, such customization provides that the game event (and therefore of the individual game levels) are configured based specifically on modeled gameplay behavior representative of historical gameplay behavior of the players in the selected cluster. Thus, in this example, the game event will be configured based on a representative multidimensional parametric player model 126 specific to the selected player cluster. Thus, the generator interface 402 in this example retrieves the pre-compiled player model 126 for the selected player cluster, at operation 1418, for inclusion thereof in input values or seed constraints eventually passed to the content generator 132. It will be appreciated that this data retrieval operation can in other examples be performed at a different stage subsequent to player cluster selection, and can in other examples be performed by components other than the generator interface 402, e.g., by the interface manager 1304.

At operation 1404, the event size value is received via the event sizing mechanism 1508, as described previously. At operation 1420 (which corresponds to operation 1406 in the flowchart of FIG. 14A), the respective target metric values for the selected number of game levels are defined by operator-controlled configuration of the target curve 1512 via the target input mechanism 1510.

At operation 1422, (responsive to operator selection of the generator trigger 1516) input values or seed constraints based on the operator inputs are passed to the content generator 132 for auto-configuration of the novel game event. In this example, the input values communicated to the content generator 132 includes: the selected ruleset or game definition file 114; the representative player model 126 for the selected player cluster; the selected number of game levels constituting the game event; and the target metric values for the respective game levels. Note that the user-selected values for the target metric (here, difficulty level) is in this example label values, but that the corresponding target metric values communicated to the content generator 132 are respective numerical values derived from the selected labels according to a pre-defined schema or conversion algorithm.

Following completion of the method 1400, a game event having the specified number of level configuration files 118 for respective game levels is generated by the content generator 132 such that an estimated difficulty of the game levels for gameplay consistent with the gameplay behavior of the representative player model 126 conforms to the operator-selected target curve 1512 with respect to level difficulty. These, mechanisms are described at length elsewhere herein.

Automated Content Generation

As introduced previously, one aspect of the disclosure relates to methods, systems, and techniques for automated generation of game content based on a plurality of parametric values that model gameplay behavior of one or more players for whom the game content is to be customized. The disclosure provides for generating such custom game content, performance of a content generation procedure that comprises a predefined sequence of progressive configuration stages in which configuration data for a unit of gameplay (e.g., a game level) is progressively populated with custom values determined at each configuration stage for respective configurable features based parametric values for one or more associated parameters from a parametric player model for a targeted player or set of players.

Various features and functionalities according to this aspect of the disclosure are described below by way of examples with reference to FIG. 16-FIG. 18H, which is for clarity and ease of reference described as being implemented by example s 100 described previously with reference to FIG. 1-FIG. 6. Similar system components are referenced by similar reference numbers in the examples of FIG. 16-FIG. 18H, on the one hand, and the remainder of the figures, on the other hand. Note that, although various aspects relating to the custom game content generation are illustrated in the description that follows by way of example as being incorporated in a common example system that employs, in combination, the various other aspects of this disclosure, the disclosed game content generation techniques can in other examples be employed separately from at least some of the other aspects of the disclosure. Thus, for example, the custom content generation procedures can in some examples be employed without provisioning the resultant customized game in an architecture comprising an on-device compiled game engine consuming non-compiled game configuration data. In other examples, the content generator can consume as inputs for customization gameplay parameters derived directly from parsing gameplay data, without formal compilation and consumption of a player model that stores multiple parametric values in a predefined structured series. Similarly, the operation of a content generator for automatically generating custom content can in some examples be triggered and/or directed by a control mechanism that does not provide the beneficial functionalities of the web-based operator interface as disclosed. Note that the above-exemplified alternative incorporation of the automated content generation in broader game management architectures and methods is not exhaustive.

This aspect of the disclosure provides a content generator configured to generate new content (or in some examples to re-configure content, which is also included within the meaning of content generation, the generation of configuration data, or the like as used herein) using a procedural content generation technique. This technique can best be understood and will be discussed with reference to the elementary example game of FIG. 2A-FIG. 2C, in which each game level has a unique letter tile gameboard 208 with normally impassable brick tiles obstructing some vertical paths for a player character 212 to reach a last row in the gameboard 208 and thus complete the game level. Such game levels have a number of configurable features that can be varied from one game level to another to change game experience or difficulty level, while operating according to the same basic game mechanics or rule set. Configurable features in this example includes (but is not limited to) the height of the gameboard 208 (i.e., the number of rows making up the gameboard); game over conditions (whether the game is time-limited or move-limited, for example); the composition of the gameboard 208 (i.e., the spatial arrangement of different types of tiles, determined by setting the tile type for each slot in the gameboard); the starting position of the player character 212: the letters that are included in the gameboard 208 on respective letter tile; requirements for earning awards and coins; and a definition of other content items that appear in the game level.

Figure 17:
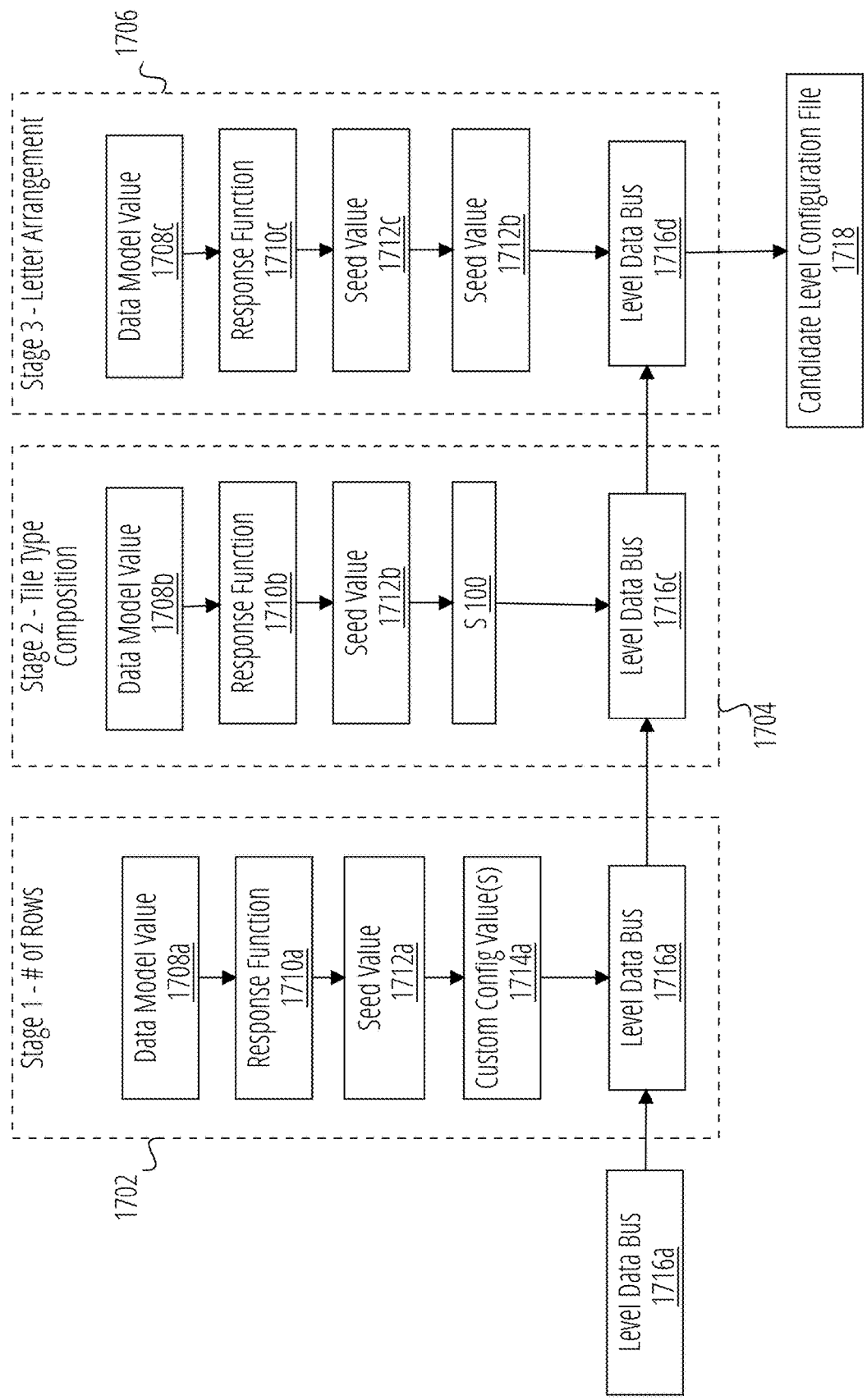
FIG. 17 schematic data flow diagram illustrating automated procedural generation of custom game content based on player model data, according to one example.
Figure 18A:
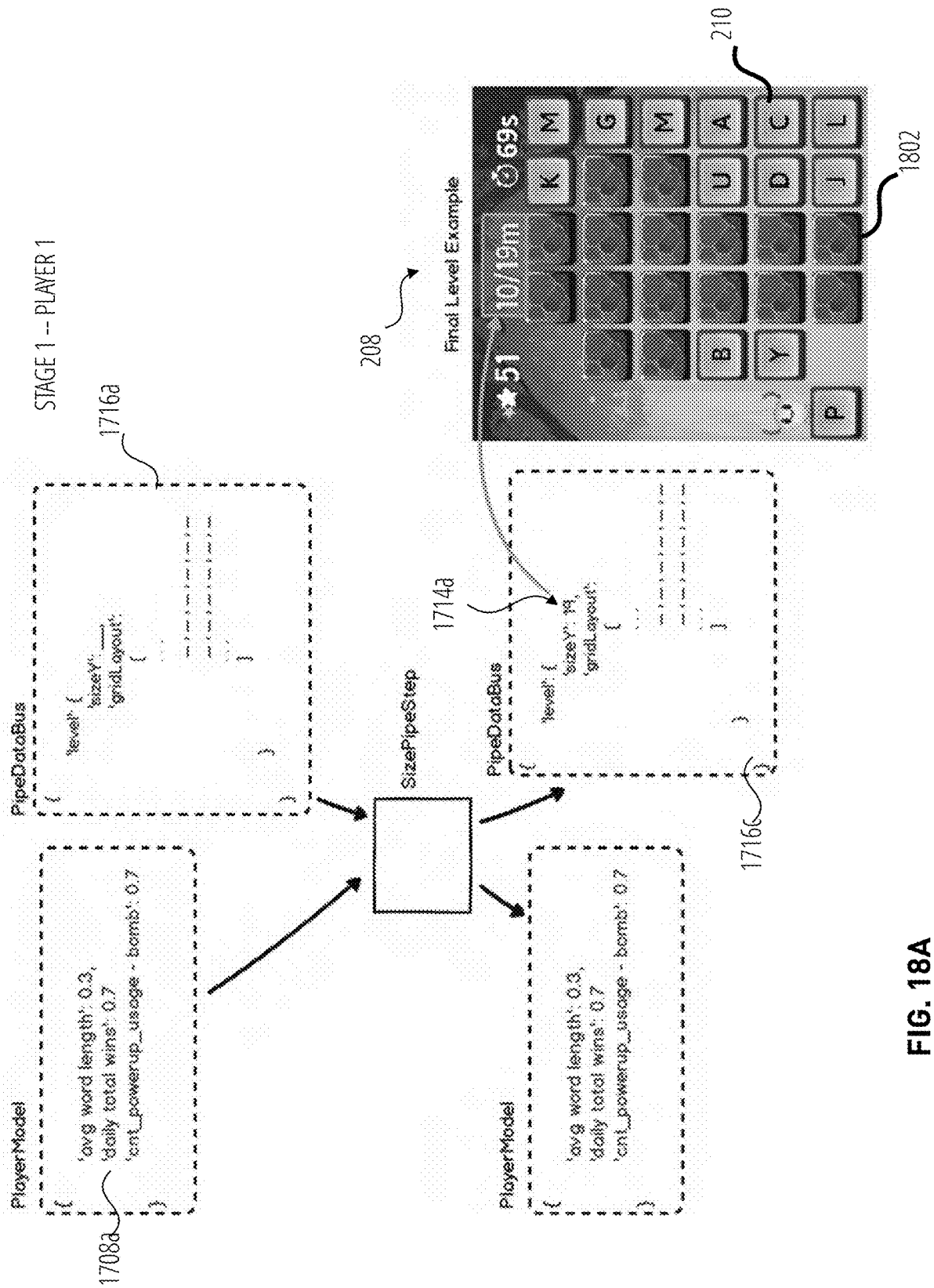
FIG. 18A-FIG. 18H are respective data flow diagrams for three respective progressive configuration stages of a level file configuration for two example player models with different parametric values, according to one example.
Figure 18B:
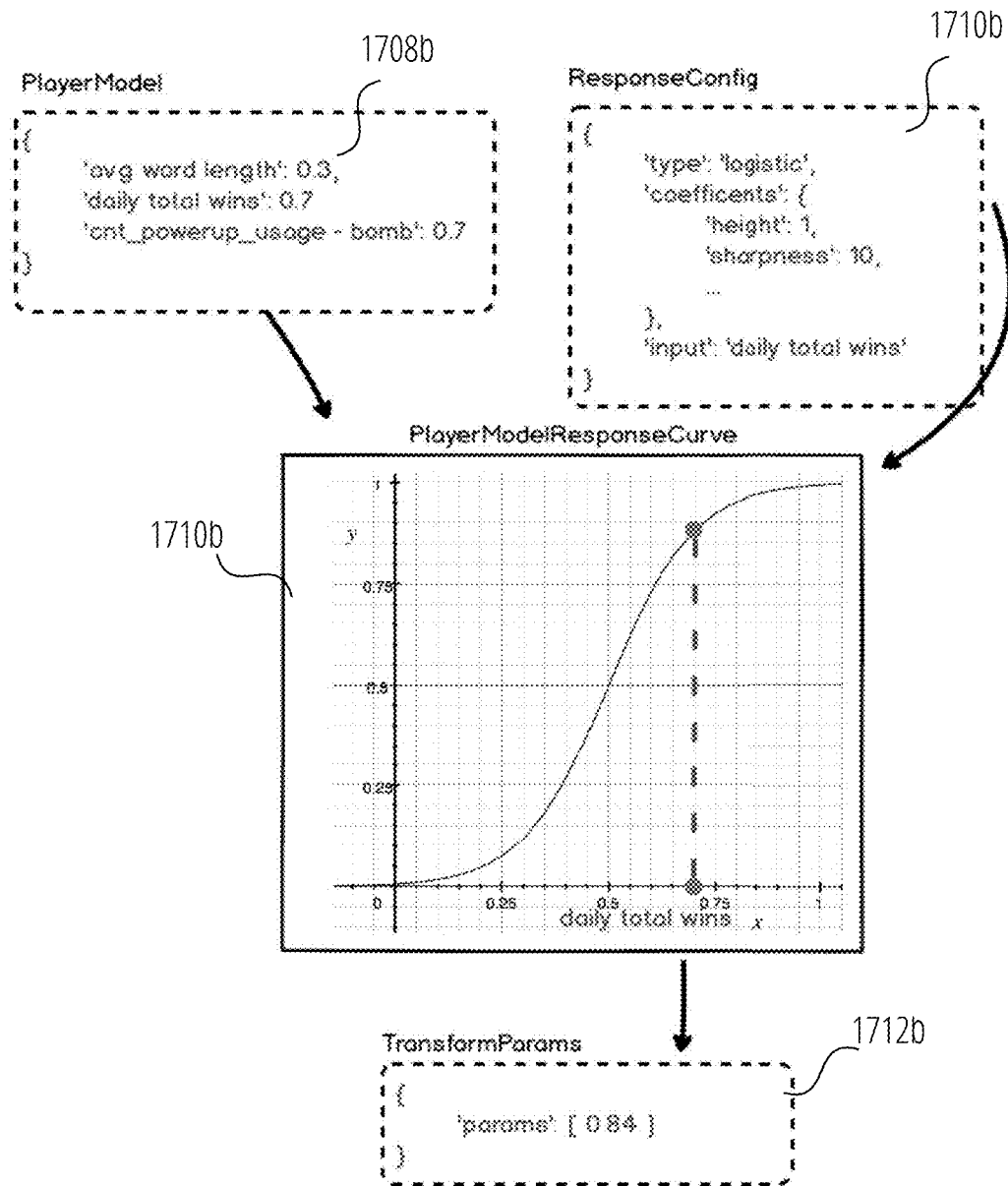
Figure 18C:
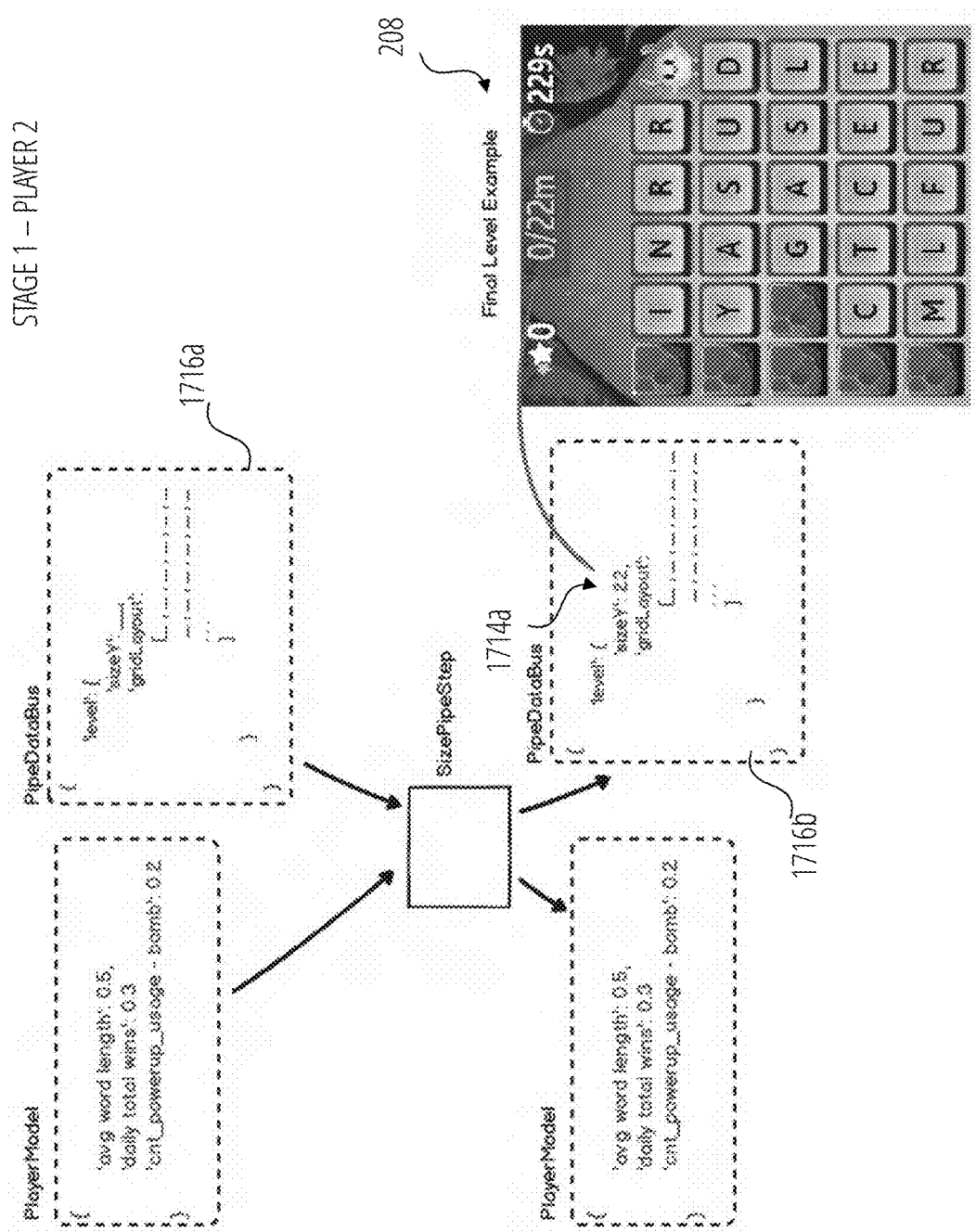
Figure 18D:
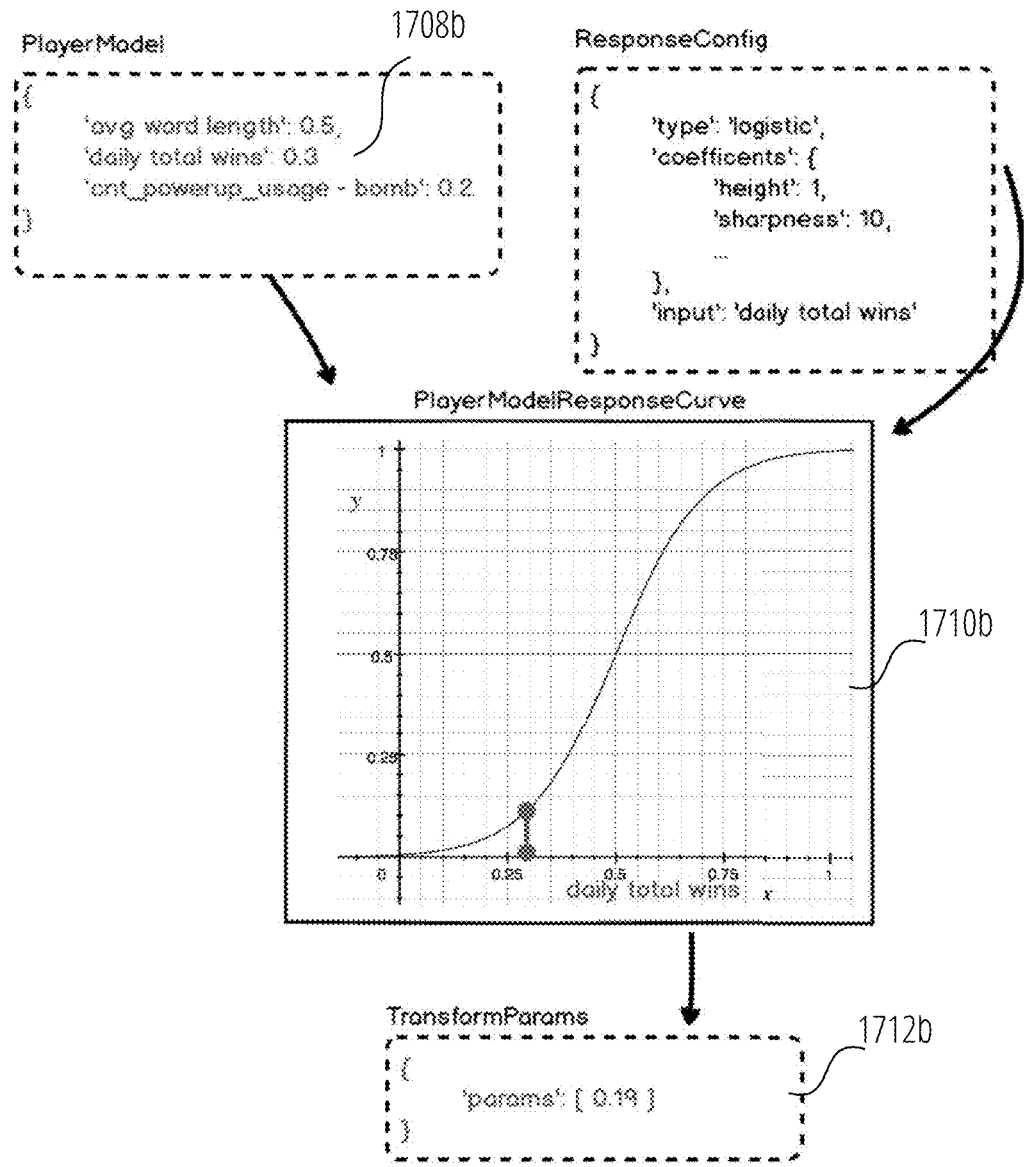
Figure 18E:
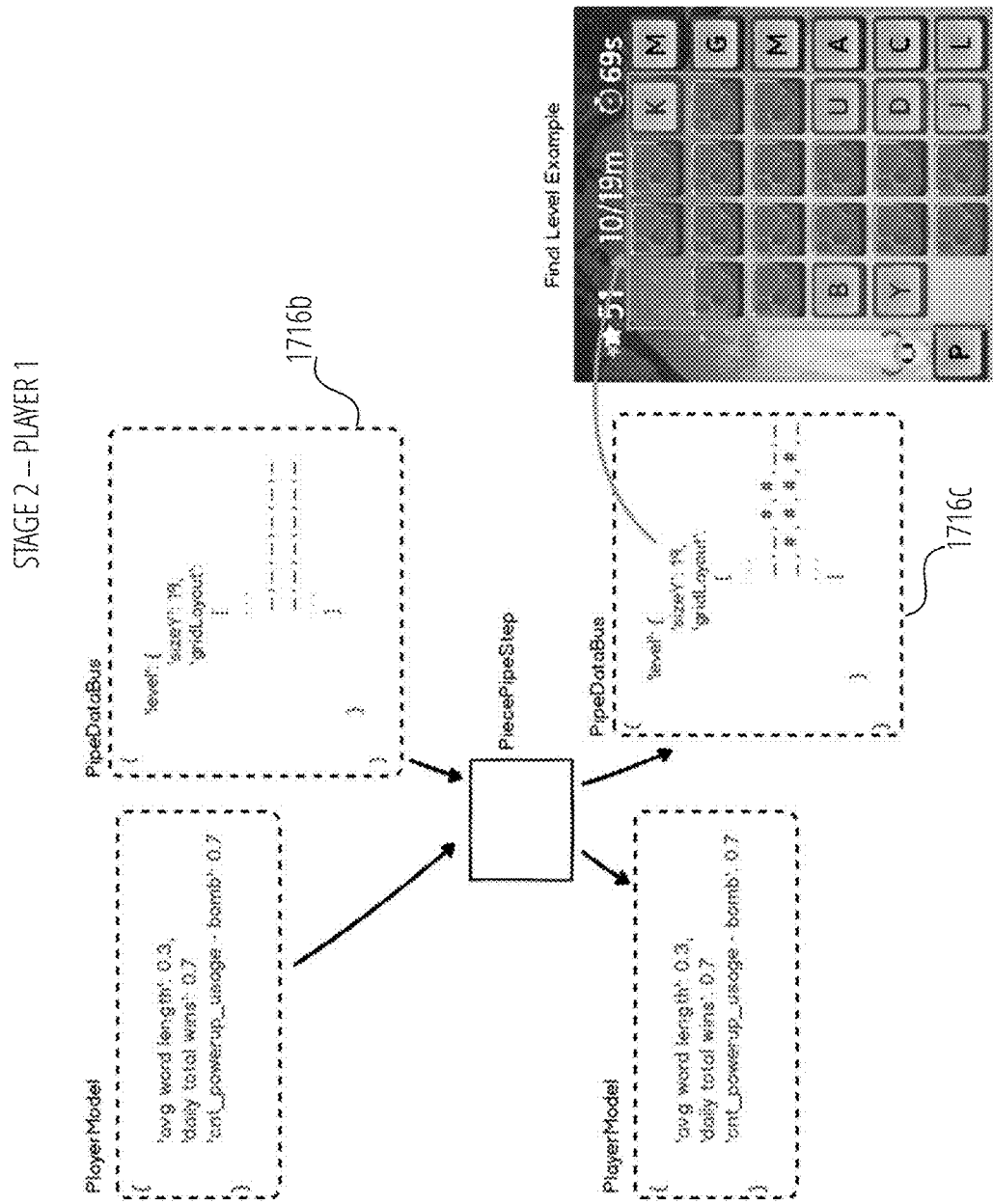
Figure 18F:
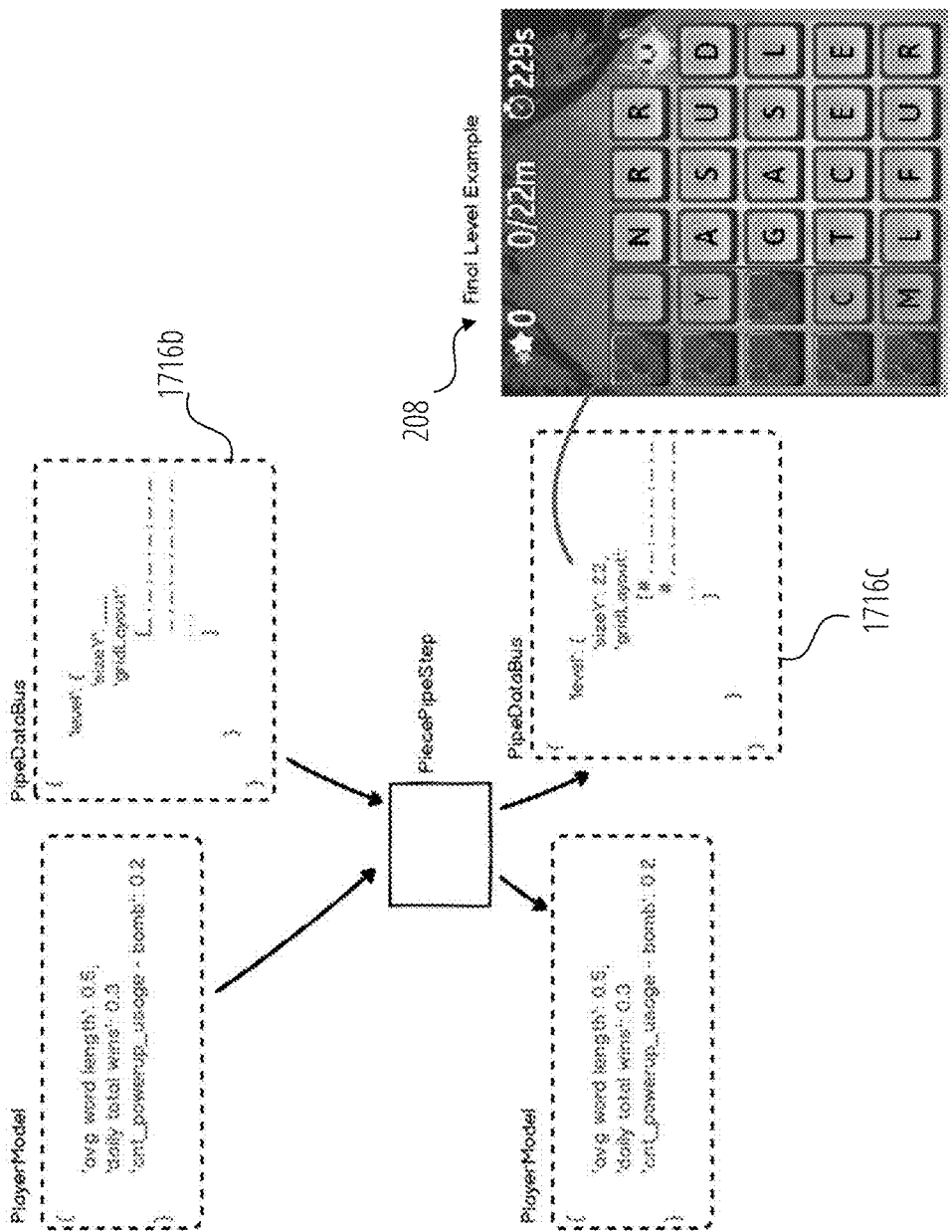
Figure 18G:
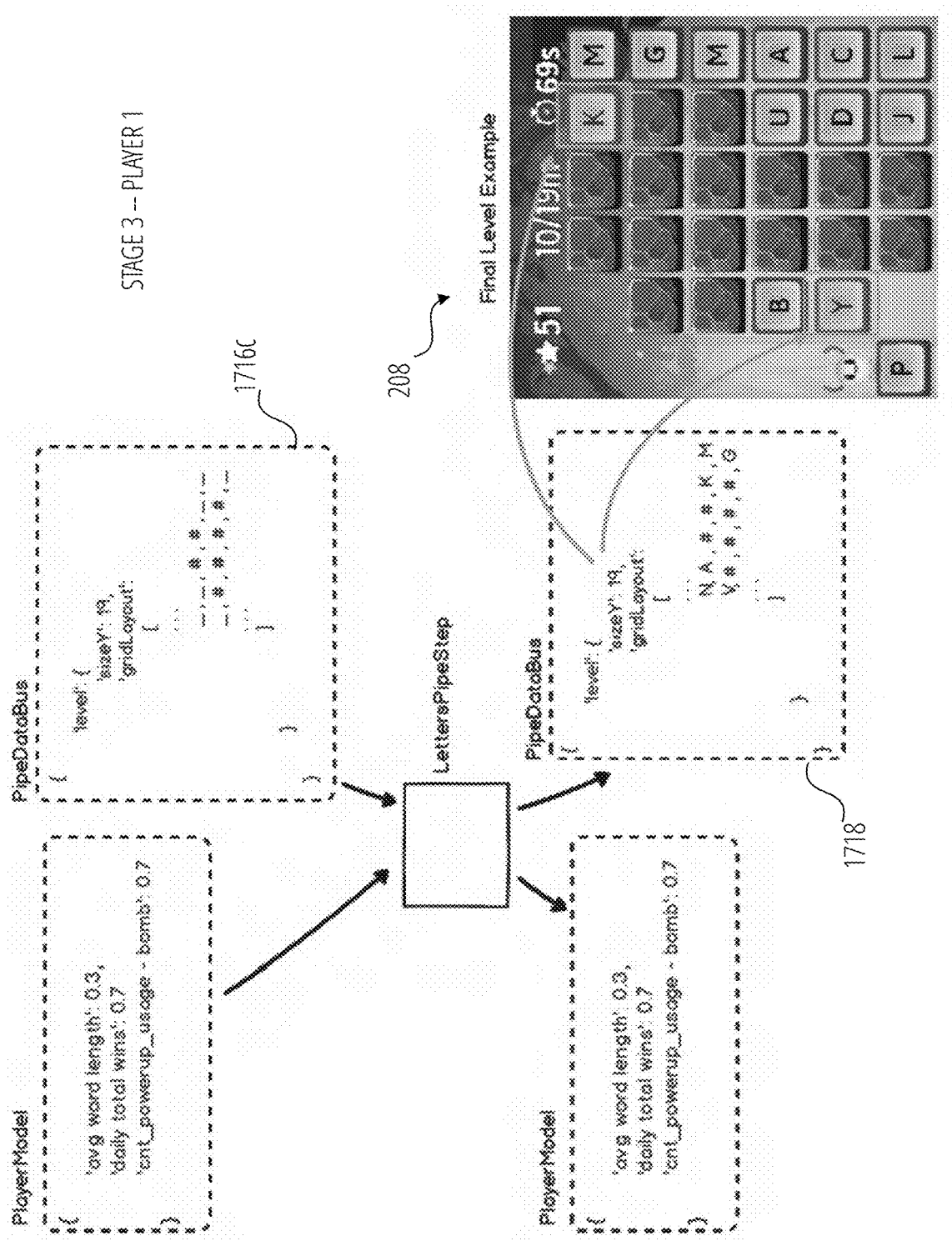
Figure 18H:
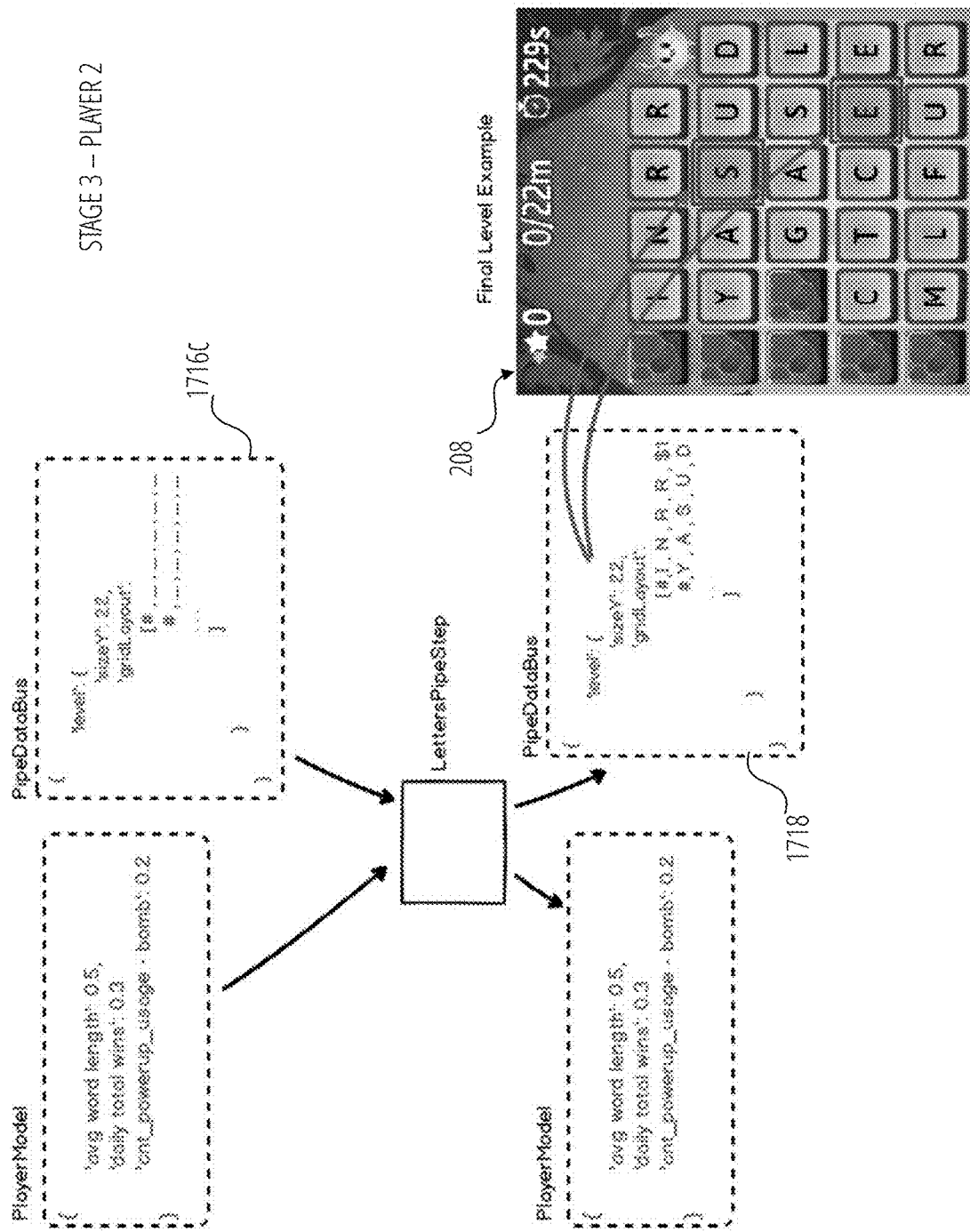

To avoid repetition, the example content generation procedure described below at the hand of FIG. 17-FIG. 18H provides for generating a custom level definition file for a specific target player model by setting custom values for three configurable features, namely gameboard height, gameboard composition, and letter arrangement and distribution. Note that the term "value" as it relates to configurable features is not limited to a single numerical or alpha-numerical value. Instead, a set of parameters or populated data fields together defining configuration of a configurable feature is understood as a single custom value. Thus, a set of identifiers specifying the type or specifying the letter tile identity of each tile in the gameboard is considered a custom value for the respective configurable feature.

Some existing techniques for computer-assisted content generation generates values for the respective configurable features randomly, with the resultant auto-generated candidate game levels thereafter being curated for suitability. The disclosed procedure, however, is informed by parametric player model information such that content is automatically generated specifically for the type of gameplay indicated by the model (and by extension for the type of player or cluster of players whose gameplay behavior is represented by player model information).

For example, in the case of a player that tends to act quickly in short staccato bursts, content generation based on the player model information that parametrizes this tendency can automatically provide relatively shorter game levels, relatively shorter time allotment completion, or the like. In this manner, the disclosed techniques enables a player model—representing either a single player or the blended average (e.g., cluster centroid) of a group of players as described above—to influence configuration of the content that is generated. Such content generation is described as being customized, in that its configuration is tailored to a specified gameplay style or type, as represented by the player model. Worded differently, generation of game levels for the same game event but based on divergent player models automatically results in correspondingly divergent game level configurations for the respective player models.

In this example, the automated customization of the game level (e.g., automated generation of a level configuration file 118 having a custom configuration) is at least partly randomized, in that at least some of the configurable values are informed by the player model is determined not by a deterministic relationship between player model value(s) and custom configuration value(s), but by biasing or constraining a randomized selection of the respective custom value(s). Thus, for example, a particular parametric value of the player model can in such examples result in randomized determination of a corresponding configuration value being biased towards a variable seed value determined based on the particular parametric value. Instead, or in addition, the configuration value can in some examples be constrained to a value range that is variable based on player model values.

The disclosed automated content generation procedure moreover provides for the determination of custom values for a plurality of configurable features in a predefined sequence of stages building one upon the other, with the configuration data for the game level being progressively populated with additional custom values at each sequential stage. Moreover, the custom values of at least some of the stages serve as constraints or input values upon which the determination of custom values in subsequent stages are based. For this reason, the particular sequence of stages are predefined so as to leverage the progressive layering of a predefined data structure (e.g., a level configuration file or databus with initial default values or null values for the configurable features to produce a customized level configuration file 118). Such a sequence of configuration stages can be visualized as a pipe with each configuration stage providing a step in a series of steps along the pipe. Each step (configuration stage) in this example modulates or customizes the value of one respective configurable feature or aspect of a predefined data structure (indicated in some of the drawings as a data bus labeled PipeDataBus) until the final data structure (e.g., a level configuration file 118 or custom values for the predefined configurable features enabling finalization of a candidate level configuration file 118 by incorporation of the custom values therein). Each pipe step thus receives a current version of the data bus, incorporates a new custom value for a respective one of the configurable features, and thus produces an updated current version of the data bus consumed by the immediately subsequent pipe step. In some examples, one or more of the configuration stages synchronously customizes more than one configurable feature.

Figure 16:
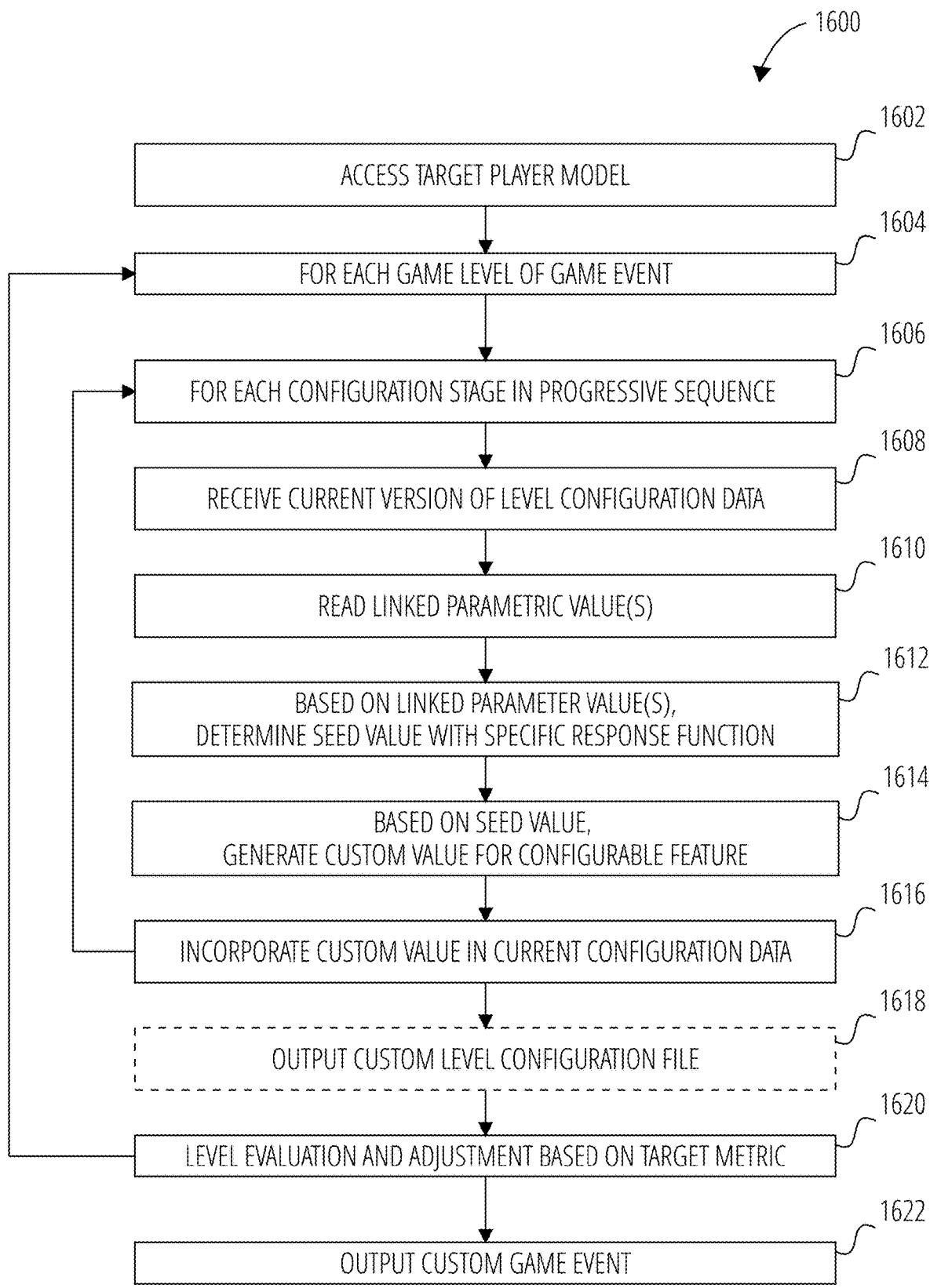
FIG. 16 is a schematic flowchart illustrating a method for automated procedural generation of custom game content based on player model data, according to one example.

FIG. 16 shows a flow diagram for a method 1600 for automated configuration of a game event having a plurality of game levels for the example game of FIG. 2A-FIG. 2C. The method 1600 is described as being performed by the content generator 132 of s 100 introduced in FIG. 1 based on a parametric player model 126 having the respective dimensional parameters of Table 1 above. FIG. 17 shows an overview data flow diagram for generating custom configuration values for a single game level according to the method 1600, while FIG. 18A-FIG. 18H show respective flow diagrams for the constituent stages of a three-step content generation procedure performed consistent with FIG. 16 and FIG. 17 for two players with different respective player models 126, indicated in FIG. 18A and FIG. 18H as Player 1 and Player 2 respectively (e.g., being representative player models 126 for respective player clusters). Thus, the player models 126 of Player 1 and Player 2 is used as target player models for the respective clusters.

At operation 1602, the content generator 132 accesses the applicable target player model 126. As described above, each target player model comprises a full set of parametric values for a predefined parameter space associated with the relevant game. The content generator 132 in this example retrieves or receives the respective parametric values for a predefined subset of the dimensional parameters, particularly those parameters that are consumed in any of the configuration stages.

At operation 1604, the content generator 132 commences the content generation procedure for a particular one of the game levels, with the subsequent operations being repeated for each of the specified number of game levels that are together to form the game event. In other examples, the generation procedure can be performed separately for each game level. In this simplified example, the configuration pipe has tree sequential configuration stages, each stage populating a level data bus 1716 (FIG. 17) with a custom value for a respective configurable feature, so that a current version of the level data bus 1716 is progressively layered with one custom value upon the other. In particular:

Stage 1 (indicated by reference numeral 1702 in FIG. 17) determines the number of rows that is to constitute the gameboard, as illustrated schematically in FIG. 18A;

Stage 2 (reference numeral 1704, FIG. 17) determines the layout of a gameboard 208 having the number of rows determined in Stage 1 (see FIG. 18E); and Stage 3 (reference numeral 1706, FIG. 17) determines respective letter values for each of the letter tiles for a gameboard having the custom row value from Stage 1 and the custom layout from Stage 2 (See FIG. 18H).

Thus, at operation 1606 (FIG. 16) is first configuration stage is commenced, with the immediately following series of operations being repeated for each of the predefined number of stages in the particular pipe. At operation 1608, a current version of the level configuration data structure is received. See in this regard the respective compositions the example level data bus 1716 in the respective flow diagrams of FIG. 18A-FIG. 18H, labeled in these diagrams as Pipe-DataBus. As can be seen in FIG. 17, Stage 1 thus receives the original default or null level data bus 1716a and updates it with a custom row height value (see operation 1616, FIG. 16) creating an updated version of the level data bus 1716b, which is in turn received by Stage 2.

At operation 1610, the parametric value of the data model for a predefined one of the model's parameter associated with that configuration stage is retrieved. This associated or mapped parameter is referred to herein as the linked parameter for the relevant configuration stage. The parametric value for the linked parameter is indicated in FIG. 17 as a data model value 1708. Note that the different stages in this example have different linked parameters that inform their determination of the respective custom value.

At operation 1612, the content generator derives a seed value 1712 or transform parameter (labeled in FIG. 18A-FIG. 18H as TransformParams) is derived based on the value of the linked parameter of the target data model based using a predefined respective response function 1710. Note that in some examples, such a transform operation may be omitted, with the value of the relevant parameter being used directly as a seed value for biasing randomized value determination or input value for deterministic calculation of the relevant custom value. In this example, a respective single variable response function 1710 for each stage expresses the seed value as a function of the linked parameter. Specifics of two contrasting examples illustrating differences in custom configuration for the different example player models are discussed below with reference to FIG. 18B and FIG. 18D.

At operation 1614, the content generator 132 determines the custom value for the respective configurable feature based on the seed value. Thus, here Stage 1 determines a row value for the height of the gameboard based on a seed value that is derived by a respective response function. As mentioned, the seed value in this example indicates a bias value for biased random generation of the row value. In the present example, the seed value indicates a value between 0 and 1 around which randomly generated values in multiple iterations are probabilistically to be centered. It will be appreciated that such biasing of random value generation is well-established and that any suitable mathematical or statistical mechanism for biased or constrained minimization can be employed.

At operation 1616, the newly generated custom value of the relevant configurable feature is incorporated in the level data bus 1716 databus, progressively layering the databus to finally output a candidate level configuration file 1718, at operation 1618. Thereafter, the candidate level configuration file 1718 is in this example auto-evaluated, adjusted, and reevaluated (at operation 1620) until it is either discarded or accepted. Finally, a custom game event with respective custom-configured level configuration files is output, at operation 1622.

This example of FIG. 18A-FIG. 18H illustrate the effect of the respective configuration stages to create differentiated content for two different players using the same generator workflow. At each stage, the respective flow diagram shows how the game level is progressively constructed, indicating the respective configurable value customized at each stage. Progressive population of the level data structure (PipeDataBus) is shown in these respective data flow diagrams.

In this example, the content generation procedure ingests three linked parameters with normalized parametric values for the respective configuration stages. Practical implementations will typically have a greater number of linked parameters. The linked parameters here comprise:

- avg word length: tracks the average word length this person uses relative to the whole audience. Player 1 has a value of 0.3, so typically uses shorter words. Player 2 has a value of 0.5, so is about average.
- Daily total wins: Number of typical wins for each player per day, again normalized relative to the audience. Player 1 typically looks for more wins in a single day than Player 2, which informs how the level is constructed to provide such an experience.
- Count powerup usage—bomb: This metric tracks the usage of a bomb powerup. The bomb destroys tiles, making the level easier to complete, so that indication by the respective parametric value that Player 1 tends to use this powerup and Player 2 does not automatically cause the content generator to tailor the level to suit their divergent playstyles.

FIG. 18B and FIG. 18D illustrates usage of a response function mechanism, as discussed above. The response curve system serves to take relevant parameters from the player model and transform them into suitable inputs for determining the configuration of the game level. In this way, utility theory techniques are employed to decouple the particular parametric values of any one instance of the player model, and implement a more dynamic approach.

For simplicity, a single gameplay dimension (daily total wins) is used in the example of FIG. 18B to determine the seed value, but, as mentioned, other examples include response functions that defines the seed value as a function of a plurality of gameplay dimensions. The response parameter here uses a data description of a mathematical function and the relevant linked parameter to derive the seed value (TransformParams) used by the content generator 132 to determine the relevant custom configuration value.

In the example of FIG. 18B, the illustrated response function pertains to Stage 2, in which the daily total win metric informs selection of a predefined difficulty-labeled set pieces that, when selected, together compose the gameboard layout. Player 1 has a relatively high daily total win metric. Player 1's value of 0.7 becomes a seed value (TransformParam) of 0.84 which, is the used to bias randomized selection from the predefined set pieces. The seed value of 0.84 is reasonably high, so the inclusion of relatively more complex set pieces (as per their pre-assigned difficulty values).

As shown in FIG. 18D, Player 2 by contrast has a relatively low value of 0.3 for their daily total wins parameter. The same response function as in FIG. 18B now generates a final value of 0.19 for the seed value passed to the Stage 2 customization. This results in biasing towards easier set pieces. In the example of FIG. 18H, this leads to the selection of a set piece that reduces the width of the level by adding impassable stone tiles on the left of the screen, making vertical passage of the player character much easier than is the case for the layout generated for Player 1.

In similar manner, it will be noted that in Stage 1 (in which the average word length informs gameboard height customization), Player 2's a higher value for the average word length (0.5 vs 0.3) results in a taller gameboard (22 rows vs 19 rows), correlating with greater difficulty.

Likewise, note that in Stage 3 (in which the powerup bomb usage informs letter population), Player 1's higher parametric value (0.7 versus 0.2, indicating more regular bomb usage) results in the inclusion in the gameboard for Player 1 of less frequently occurring letters, such as the letters K and Y.

From the above examples it will be evident that a benefit the procedural content generation procedure using parametric player model inputs to generate customized content for target players or groups of player is that it greatly facilitates the provision of satisfactory gaming experiences across a wide variety of player styles. Significantly, this is achieved with greater flexibility and greater sensitivity to gameplay variations than existing techniques, yet does so while enabling significantly greater automization and consequent lower cost than existing systems.

Automated Game Assessment

Figure 19:
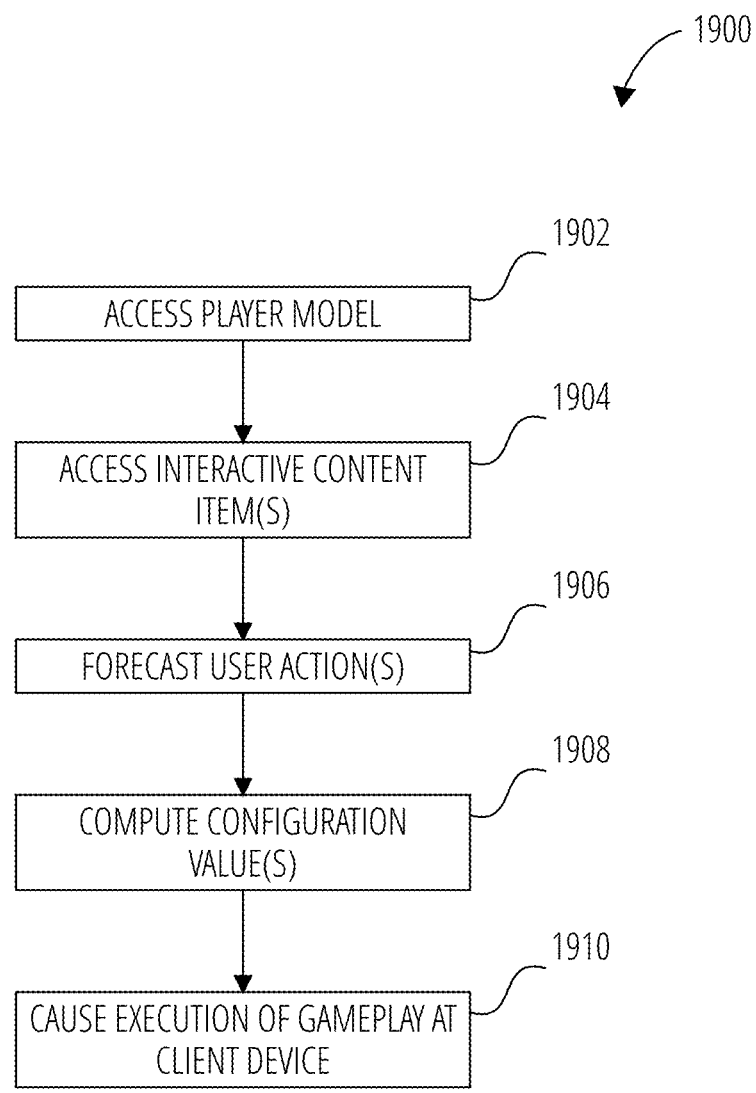
FIG. 19 is a flow chart of a method for automated game assessment, in accordance with some examples.

FIG. 19 is a flow chart of a method 1900 for automated game assessment, in accordance with some examples. The method 1900 may be implemented at a game server.

At operation 1902, the game server accesses a player model representing a subset of players. The player model is generated based on previous in-game behavior of the subset of players while playing a computer-implemented game. According to some examples, each player of the subset of players represented by the player model corresponds to a data point in a multiple dimensional space. The player model corresponds to a data point at a centroid of the subset of players in the multiple dimensional space. The dimensions of the multiple dimensional space may correspond to information that is determined based on observing the gameplay of the players.

At operation 1904, the game server accesses a set of interactive content items associated with the game.

At operation 1906, the game server forecasts, using the player model, a sequence of user actions of the subset of players during gameplay of the game. The sequence of user actions represents a prediction of user interaction with the set of interactive content items. According to some examples, to implement the forecasting, the game server presents, to the player model, set of the content in an order in which the set of interactive content items is presented during gameplay of the game. This is akin to the game server "playing the game" as a player represented by the player model. In some examples, the set of interactive content items prompts the sequence of user actions in the game.

According to some examples, the forecasting leverages a statistical engine. The statistical engine may use any statistical modeling or artificial neural network-based modeling. For example, the statistical engine may include a utility response curve or at least one artificial neural network.

At operation 1908, the game server computes, based on the forecasted sequence of user actions and software-defined outcomes of the forecasted sequence of user actions in the game, configuration values for the set of interactive content items. Computing the configuration values may include optimizing the configuration values based on metric(s). The metric(s) may include one or more of: a target win rate, a repeat gameplay metric, a gameplay duration, a game engagement metric, and a revenue metric. Alternatively, any other metric(s) may be used. In one example, the metric(s) include the target win rate being 60% or between 50% and 70%, as this win rate causes high user interest and engagement with the computer-implemented game. (In some examples, a lower win rate may be considered too challenging and non-rewarding, and a higher win rate may be considered not challenging enough.)

At operation 1910, the game server causes execution of gameplay at a client device associated with the player model. The gameplay is according to the computed configuration values for the set of interactive content items.

Automated Dynamic Custom Game Content Generation

At operation 2002, the game server generates a set of game content items for a designated game. The set of game content items is customized for one or more user accounts based on numerical values from a player model representing the one or more user accounts. The player model is generated based on previous in-game behavior of the one or more user accounts while playing the designated game. The set of game content items may include interactive content items prompting the user action during gameplay of the designated game. The set of game content items may be generated based on at least the player model and previously existing game content items of the designated game. For example, if users associated with the player model interact more with game pieces having Type A than with game pieces having Type B, the set of game content items may include additional game pieces of Type A or additional game pieces similar to Type A. The set of game content items may be associated with a new level of the designated game.

At operation 2004, the game server forecasts, using the player model, a sequence of (one or more) user actions of the one or more user accounts during gameplay of the designated game with the generated set of game content items. The sequence of user actions represents a prediction of in-game user interaction with the set of game content items.

At operation 2006, the game server computes, based on the forecasted sequence of user actions and software-defined outcomes of the forecasted sequence of user actions in the designated game, a set of metrics associated with gameplay of the one or more user accounts represented by the player model in the designated game. The game server provides an output based on the set of metrics, as described below. Alternatively, any other type of output (e.g., printing or transmitting the set of metrics or another value derived based on the set of metrics) may be used. The set of metrics may include at least one of: a user engagement metric, a gameplay metric, and a revenue metric. The gameplay metric may include a minimum win rate (e.g., 45%) or a maximum win rate (e.g., 75%). The user engagement metric may include a repeat gameplay metric (e.g., a number or a proportion of user accounts represented by the player model who play the game at least once every three days) or a gameplay duration (e.g., between 45 minutes and 2 hours).

At operation 2008, the game server determines whether the set of metrics corresponds to a predefined range. If the set of metrics corresponds to the predefined range, the method 2000 continues to operation 2010. If the set of metrics does not correspond to the predefined range, the method 2000 continues to operation 2012.

At operation 2010, upon determining that the set of metrics corresponds to the predefined range, the game server stores the set of game content items for transmission to a client device associated with the player model. For example, the game server may store the set of game content items in a data repository. The data repository is accessible, via a network, by the client device. The client device may read the set of game content items from the data repository when the client device has access to the network or when the client device has access to a low-cost or high-speed (e.g., WiFi, rather than cellular) network. After operation 2010, the method 2000 ends.

At operation 2012, upon determining that the set of metrics does not correspond to the predefined range, the game server determines whether another stopping condition is reached. The other stopping condition may include one or more of: (i) at least n adjustments have occurred where the set of metrics has not gotten closer to the predefined range, where n is a positive integer greater than or equal to two, and (ii) the adjusting (operation 2014), the forecasting (operation 2004), and/or the computing (operation 2006) operations have been repeated at least a predefined number of times (e.g., at least 1000 times) or over a predefined time period (e.g., the method 2000 has been implemented for over three hours). If the other stopping condition is reached, the method 2000 ends. If the other stopping condition is not reached, the method 2000 continues to operation 2014.

At operation 2014, upon determining that the other stopping condition is not reached and that the set of metrics does not correspond to the predefined range, the game server adjusts the set of game content items. To adjust the set of game content items, the game server may leverage a hyperparameter search based on the predefined range and the set of game content items. After operation 2014, the method 2000 returns to operation 2004 to re-forecast the sequence of user actions with the adjusted content items, and, at operation 2006, to re-compute the set of metrics based on the re-forecasted sequence of user actions.

Traversal Graph Analysis and Automated Psychology Prediction

As introduced above with reference to the example of FIG. 1-FIG. 6 (and expanded on briefly in FIG. 3, FIG. 6, FIG. 11, and FIG. 12), one aspect of the disclosure relates to methods, systems, and techniques for analyzing player traversal behavior (as opposed to exclusively gameplay behavior) and to provide automated estimation or inference about psychological aspect of player behavior, such as motivation for game engagement and/or emotional states at different stages of interaction. The results of such analysis are in some examples included in a parametric player model as previously discussed, and thus automatically uses player motivations or emotional state to inform player clustering and/or customization of game content.

Various features and functionalities according to this aspect of the disclosure are described below by way of example with reference to FIG. 21-FIG. 24B, which is for clarity and ease of reference described as being implemented by system 100 described previously with reference to FIG. 1. Note that, although various aspects relating to traversal behavior analysis are described in the examples that follow as being incorporated in a system that employs, in combination, the various other aspects of this disclosure, these techniques can in other examples be employed separately from at least some of the other techniques discussed herein. Moreover, the disclosed use of behavior data to infer user psychology is not limited to game applications. These techniques are in other example employed to significant benefit for various types of online facilities and services, e.g., in content surfacing or suggestion on media content streaming services, social media platforms, online shopping, and the like.

These techniques are described below with reference to an example method illustrated by diagram 2100 in FIG. 21. Aspects of player clustering and customization previously described (see, in particular, description with reference to FIG. 11 and FIG. 12) mainly discussed grouping players based on their gameplay behavior, which mostly describes how players interact with the game at a micro level during gameplay to complete a level or event—e.g., how they play the game in terms of (in the common example game FIG. 2C) making words, using power-ups, etc. At a meta-level of behavior is the selection and sequencing of optional interactions or parts of the game applications that are performed or visited. Such game interaction and sequential accessing of different parts or functionalities provided by the game application is further referenced as game traversal behavior or a player's journeys within the game (each journey reference, e.g., to the sequence of actions in a single session). At a higher level of abstraction, are psychological features of player interaction with the game, such as the player's subjective motivation for accessing the application or performing certain actions. This aspect of the disclosure provides techniques for inferring such player motivations and/or emotional states based on analysis of their respective game traversal behavior.

Figure 21:
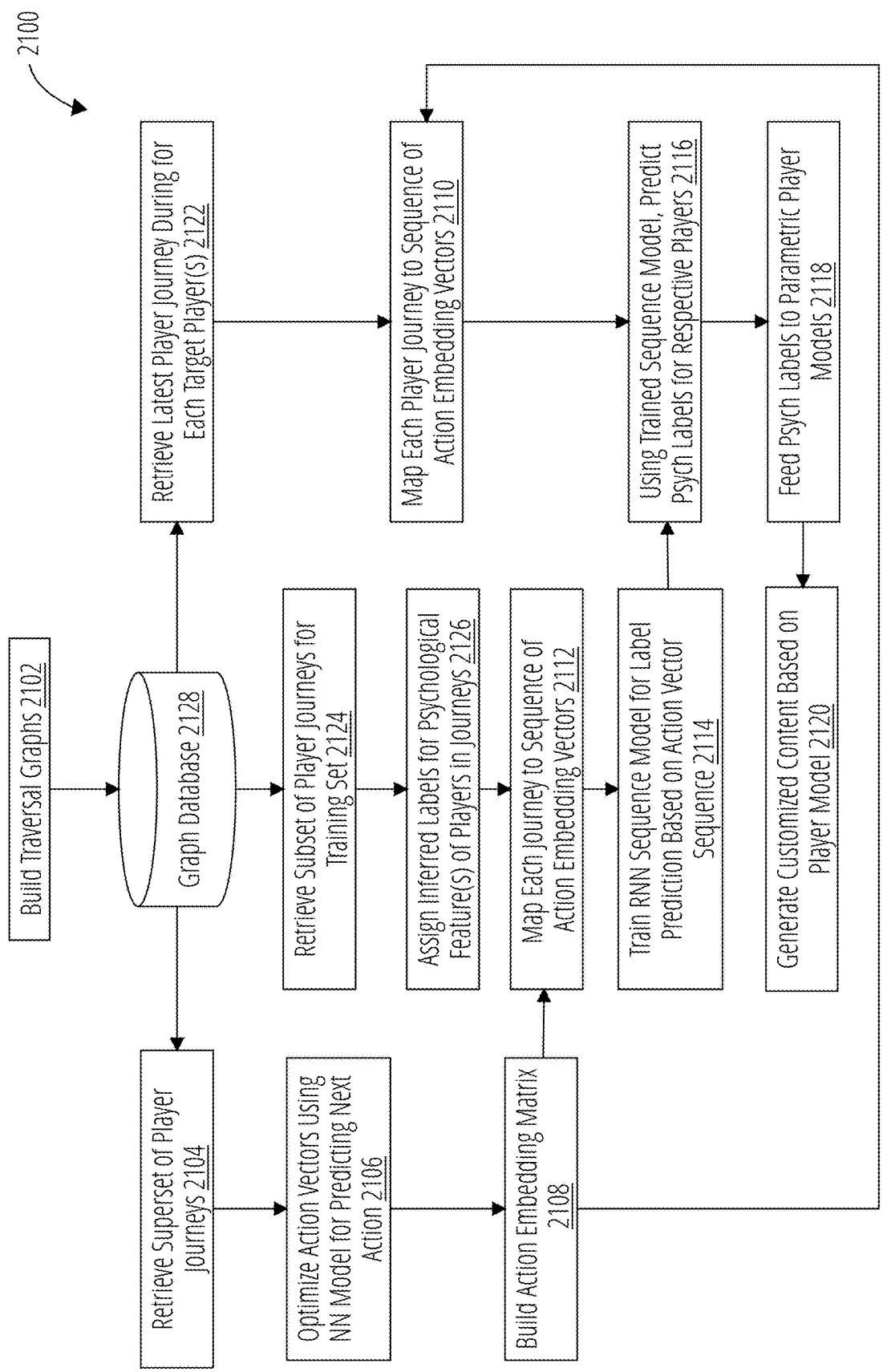
FIG. 21 is a flowchart illustrating a method of estimating psychological aspects of player behavior, according to one example.
Figure 22:
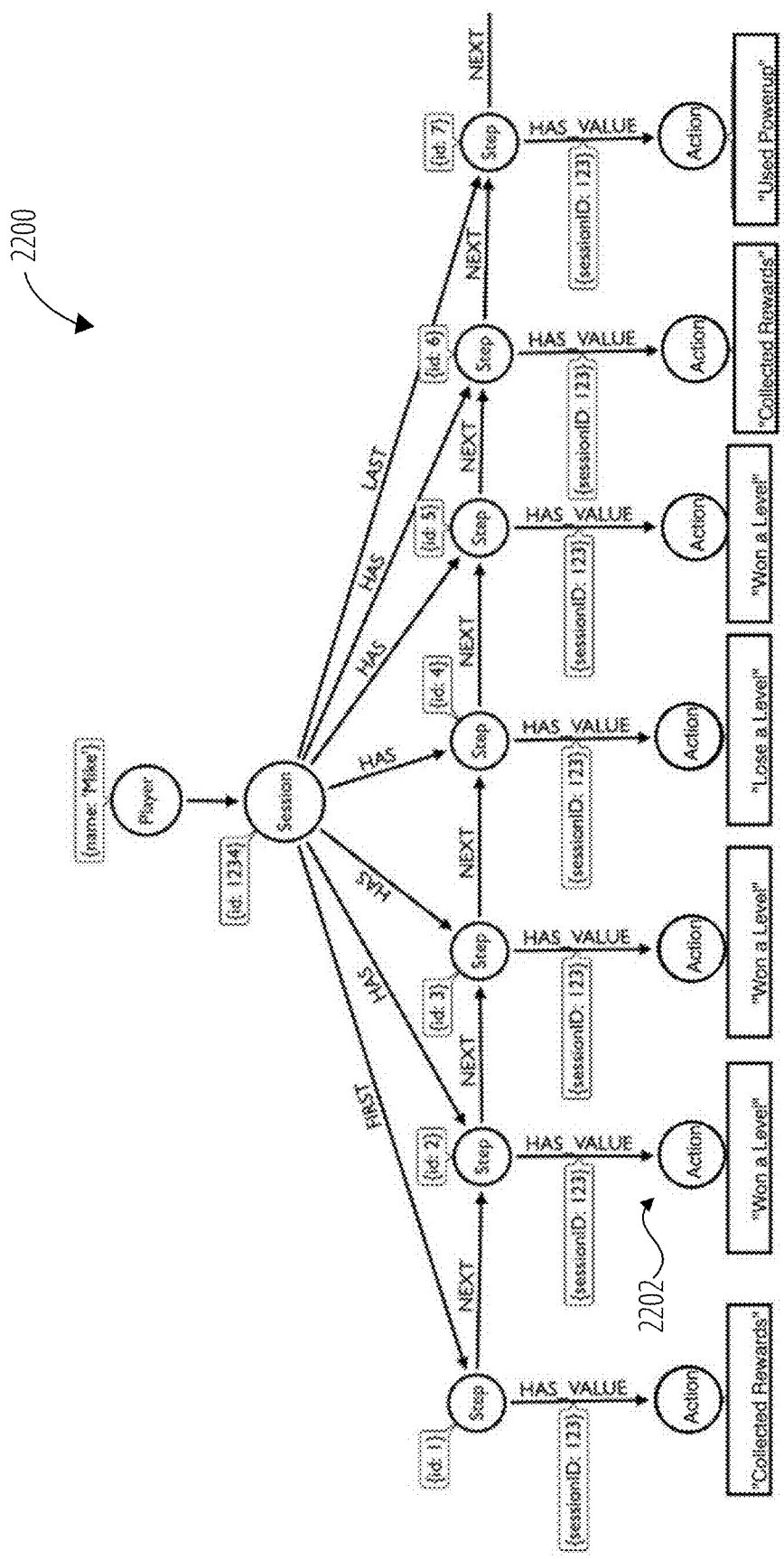
FIG. 22 is a schematic diagram of a traversal graph for a single player session, according to example.

Turning now to FIG. 21, therein is shown a flow diagram 2100 that schematically illustrates an example method for modeling traversal behavior and generating custom content based on analysis of the modeled behavior. First, the way a user moves around the app and the order that they visit different aspects (i.e., their game traversal behavior) is modeled as a directed graph (i.e., a data structure comprising nodes connected by directional edges), thus building a graph database 2128 (FIG. 21). In this example, each session is modeled by building, at operation 2102, a respective traversal graph. In FIG. 22, example traversal graph 2200 schematically illustrates the graph structure employed in this example for representing a single respective game interaction session, or journey. Note that the graph structure in this example for the session traversal graph 2200 includes a player node connected by a respective edge to a session node, which is in turn connected by respective edges to a successive series of step nodes. Each step node in turn connects to a single respective action node 2202 selected from a predefined set of traversal or journey actions that are selected for tracking and/or inferring one or more psychological features or states of users.

Additionally, each of the screens that the user passes through (e.g., each action node 2202) is in some examples also annotated with an operator's inference of a user's motivation or action. For example, collecting daily login rewards is inferred to be part of a "habit" based motivation, seeing a "win" screen is part of a challenge motivation, and so forth. As will be seen in what follows, a Neural Net approach can then be used to group players together based at least in part on the way that they flow through the game (i.e., their game traversal behavior), as captured by telemetry and subsequently sideloaded into the graph database 2128. A benefit of using the graph database 2128 is that the action data and the relationship between the action data are both of significance. The graph database 2128, in this example employing the graph structure of traversal graph 2200, enables the player modeling engine 120 to traverse the player's journeys or any sub-journeys more efficiently than in a traditional relational database like SQL databases.

Figure 23A:
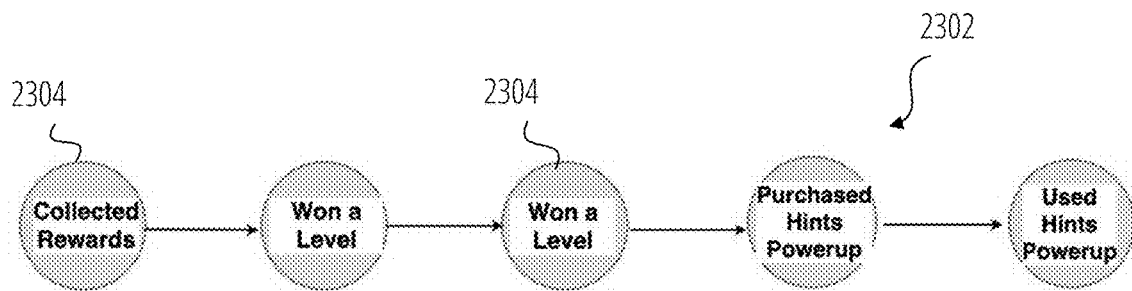
FIG. 23A is a schematic diagram illustrating a player journey derived from a traversal graph, according to one example.
Figure 23B:
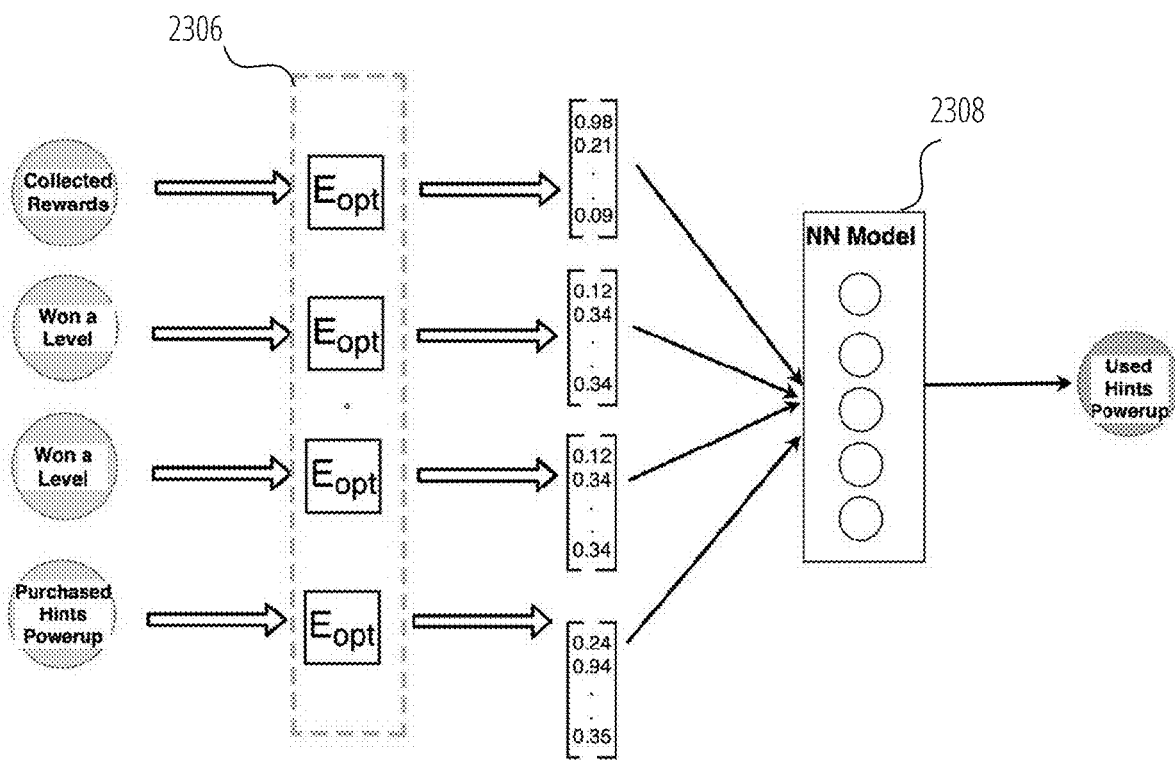
FIG. 23B is a data flow diagram of a method for building an action embedding matrix, according to one example.
Figure 23C:
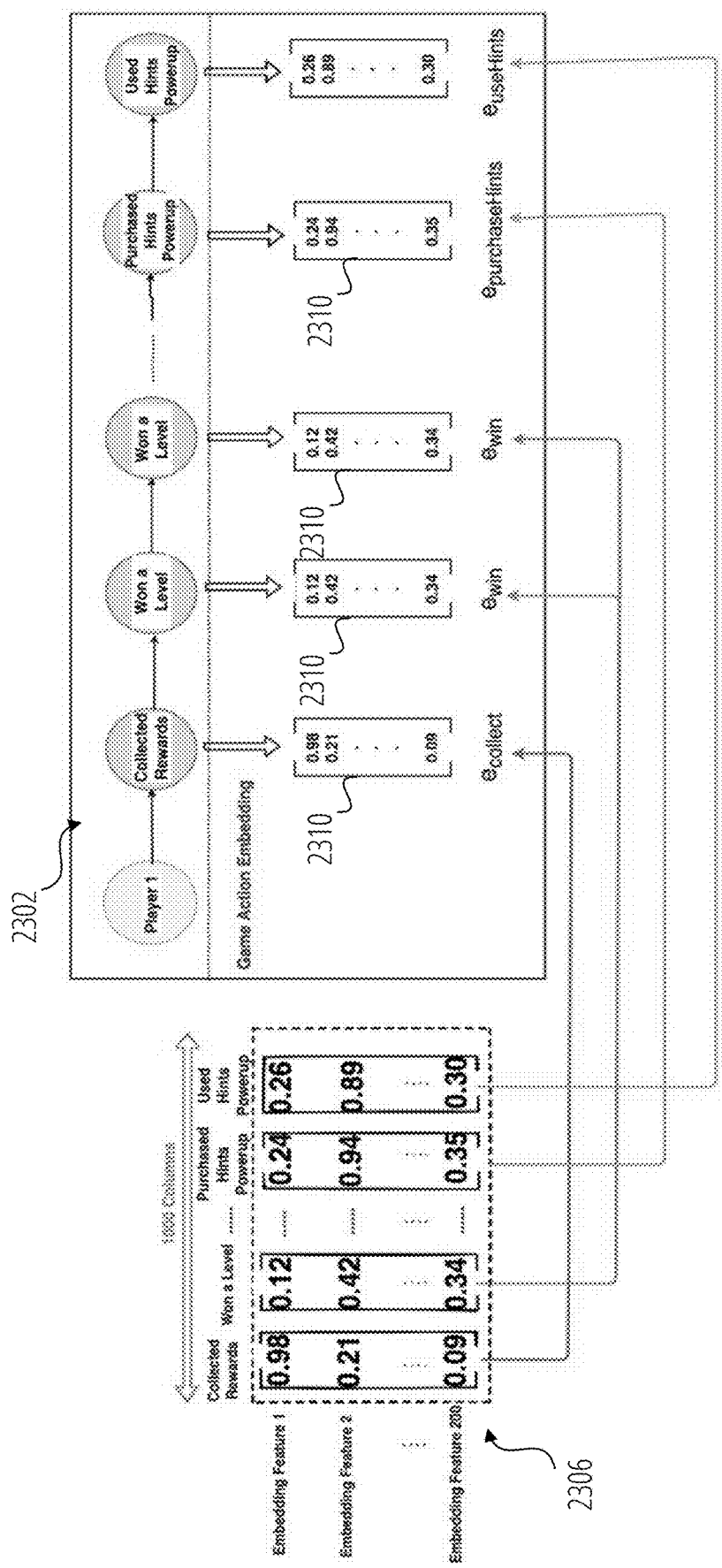
FIG. 23C is a data flow diagram illustrating the mapping of player actions to action embedding vectors by use of an action embedding matrix, according to one example.

With the player traversal data being stored as directed graphs in the graph database 2128, the player player modeling engine 120 is able to draw a player journey for any given player. The term "player journey" is in this example understood to mean a temporal sequence of player actions during a session, with each of the player actions selected from a predefined set of interactions with the game application, the set of interactions including at least some non-gameplay actions. An example of a player journey 2302 associated with example Player 1 is shown in FIG. 23A. Note that the player journey 2302 is here represented as a linear graph limited to a sequence of respective actions 2304 with respective directional edges connecting immediately adjacent actions 2304 in the sequence. The data extracted from the graph database 2128 and fed further downstream to other components in the method of FIG. 22, can represent respective player journeys 2302 in non-graph data structures. For example, each player journey 2302 is in some examples represented by a data structure comprising a series of separated action identifiers (e.g., a label or a numerical identifier), with the position of each action 2304 in the respective player journey 2302 being indicated by the position of the corresponding identifier in the data structure.

To enable automated analysis of game traversal actions using a machine learning model, the action labels are to be converted to numerical values. Simple natural number representation is avoided for implying ordinal relationship in the actions. An existing method method to convert categorical data (e.g., labels) to numerical data is "One-Hot Encoding", where each label is converted to a vector containing a list of binary values 0 and 1, each vector having a predefined number of values, with one of the values being 1 and the remainder of the values being 0. The ordinal position of each value is mapped to a respective predefined attribute or parameter, in this instance being mapped to a respective predefined game action.

Suppose, for example a predefined set of 1000 distinct game actions, a 1000×1000 diagonal matrix can be constructed to represent the whole action feature space, where each game action is represented by a vector (column) of length 1000 with values 0 and 1. Each vector will have exactly one 1 and the rest of the values to be 0. The 1000×1000 matrix in referred to as the "One-Hot Embedding Matrix", which is used to provide a mapping for converting a game action to its corresponding representation vector. For example, by the use of the One-Hot Embedding Matrix, a [Collected Rewards] action (e.g., FIG. 23A) can be converted to be represented as [1,0,0,0,0, . . . 0], and [Won a Level] as [0,1,0,0,0,0, . . . 0].

This disclosure provides for a technique to generate a significantly denser and low-dimensional vector representation for each of the game actions, e.g., by the use of a Neural Network. This technique is referred to herein as action embedding. For action embedding in this example, the 1000×1000 embedding matrix in the previous example is converted to a much denser 1000×200 action embedding matrix with values ranging from 0 to 1. Each action will be represented by a vector of length 200 instead of 1000, thus providing a new 200×1000 action embedding matrix. In the example of action embedding matrix 2306 in FIG. 23C below, the action vectors are arranged as respective columns of the matrix 2306, with the rows defining respective embedding features.

This approach greatly reduces the computational complexity compared to using the one-hot embedding. In addition, the action embedding matrix is machine-learned by using relationships among the actions drawn from the historical player journey data, including which sets of actions tended to occur together, and in what order. This has the useful result that actions performed in analogous sequential relationships in a player journeys are represented by analogous action embedding vectors. For example, in the example action embedding matrix 2306 of FIG. 23C, it will be seen that the [Purchased Hints Powerup] action and [Used Hints Powerup] action have more similar representation vectors (represented by respective columns of matrix 2306) compared to the other two actions' vectors shown. Conventional one-hot encoding is agnostic of and silent to such relational similarities.

An example technique for deriving such an action embedding matrix using player journey data is briefly described below with reference to example action embedding matrix 2306 using example player journey 2302, before returning to describing use of this technique in the example method of FIG. 21.

Step 1: First, player journey data is accessed. In this example, player journey 2302 of FIG. 23A is taken as example data.

Step 2: Discard the terminal action 2304 (that is, the last action), to use the pre-terminal actions 2304 (i.e., the actions immediately to predict the omitted action 2304. Thus, in this example, remove the action [Used Hints Powerup] from the journey, then employed for training a machine-learning model to use the rest of the actions in the journey prior to [Used Hints Powerup] to predict that the next action is [Used Hints Powerup], as per the following steps.

Step 3: Define a candidate embedding matrix for each action 2304. In this prediction model, each action 2304 is first converted to a real-numbered vector by using a respective mapping function E, and use this new set of vectors to predict what the next action in the journey is [Used Hints Powerup]. The values for the candidate matrix and vectors can be chosen arbitrarily.

Step 4: The candidate action embedding vectors for respective preceding actions 2304 of the player journey 2302, derived from the candidate embedding matrix E for the identified actions 2304, are then fed as training input to a Neural Net Model (see example NN Model 2308 in FIG. 23B) The mapping matrix E is the parameter that that is thus being fit to the NN Model 2308 to maximize the probability of predicting the correct the next action to be [Used Hints Powerup]. Differently viewed, the NN Model 2308 is trained providing a set of inputs (candidate action vectors) and a labeled output (the actual next action in the player journey 2302).

Step 5: As shown schematically in FIG. 23B, iterating through this process for many player journeys 2302 (in this example, through every action in every available player journey extracted from the graph database 2128) provides an optimized mapping matrix 2306 (indicated as $E_{opt}$ in FIG. 23B) that serves to predict each action in a given player journey with high accuracy. This optimal mapping matrix 2306 is then used as Action Embedding Matrix that for mapping each action to a dense representation vector. Note, for example, the composition of example action embedding matrix 2306 in FIG. 23C, whose columns provide respective optimized action embedding vectors for the predefined set of game actions to be used for estimating associated player emotional states and/or motivations.

Returning now to FIG. 21, it will be seen that the method further comprises, at operation 2104, retrieving a superset of player journeys for use as training data. In this example, the superset includes every action in every available player journey in the graph database 2128. At operation 2106, the action embedding vectors are optimized using the NN Model 2308, as per the scheme of FIG. 23B. At operation 2108, the action embedding matrix is compiled from the optimized action embedding vectors (see, e.g., example embedding matrix 2306 of FIG. 23C).

Having the Action Embedding Matrix to map each in-game action to a dense and low-dimensional vector, a recurrent neural network (RNN) is then constructed based on player journey data, and this player journey RNN is thereafter used to predict, from one or more player journeys 2302 of a player, a label of interest associated with the player. In this example, the label of interest indicates one or more values for a psychological feature of the player suggested by the respective player journey, e.g., a particular emotional state or a particular motivation.

To this end, the example method of FIG. 21 further comprises, operation 2124, retrieving a subset of player journeys from the graph database 2128 for use as a training set for an example and, at operation 2126, assigning respective labels with respect to the relevant psychological feature to respective items in the player journeys. In instances where such psychological features are to be estimated for input journeys (e.g., to estimate a player motivations for a journey, as in the example of FIG. 24B) labels are mapped to journeys. The Many-to-One player journey described below with reference to FIG. 24B is most useful when attempting to generate a single score/label to summarize a given journey. Such a many-to-one model serves to analyze the player's motivation to play the game. In this scenario, the label being produced in this model (and assigned to each player journey 2302 in the training set, at operation 2126) is in this example one the following four motivating factors, which respectively inform custom configuration of game levels as discussed previously with respect to automated content generation based on a parametric player model:

Improvement: building skill; overcoming challenges; feeling mastery over a system.

Overcoming: Feeling smart: figuring out a puzzle; figuring out the best strategies for a puzzle type. To sustain this puzzle-solving pleasure, game designers would ideally vary the way levels are structured, so players can feel smart more often, from figuring out the best way to play for that particular level/game configuration.

Habit: Following routine, grind—To sustain this pleasure, players should be rewarded for engagement; they should feel like they are making progress if they show up everyday. E.g., tricky match 3 levels tend to eventually let you through by virtue of the RNG if you play enough times.

Novelty: Experiencing novelty; desire to experience new levels, challenges, or features.

Figure 24A:
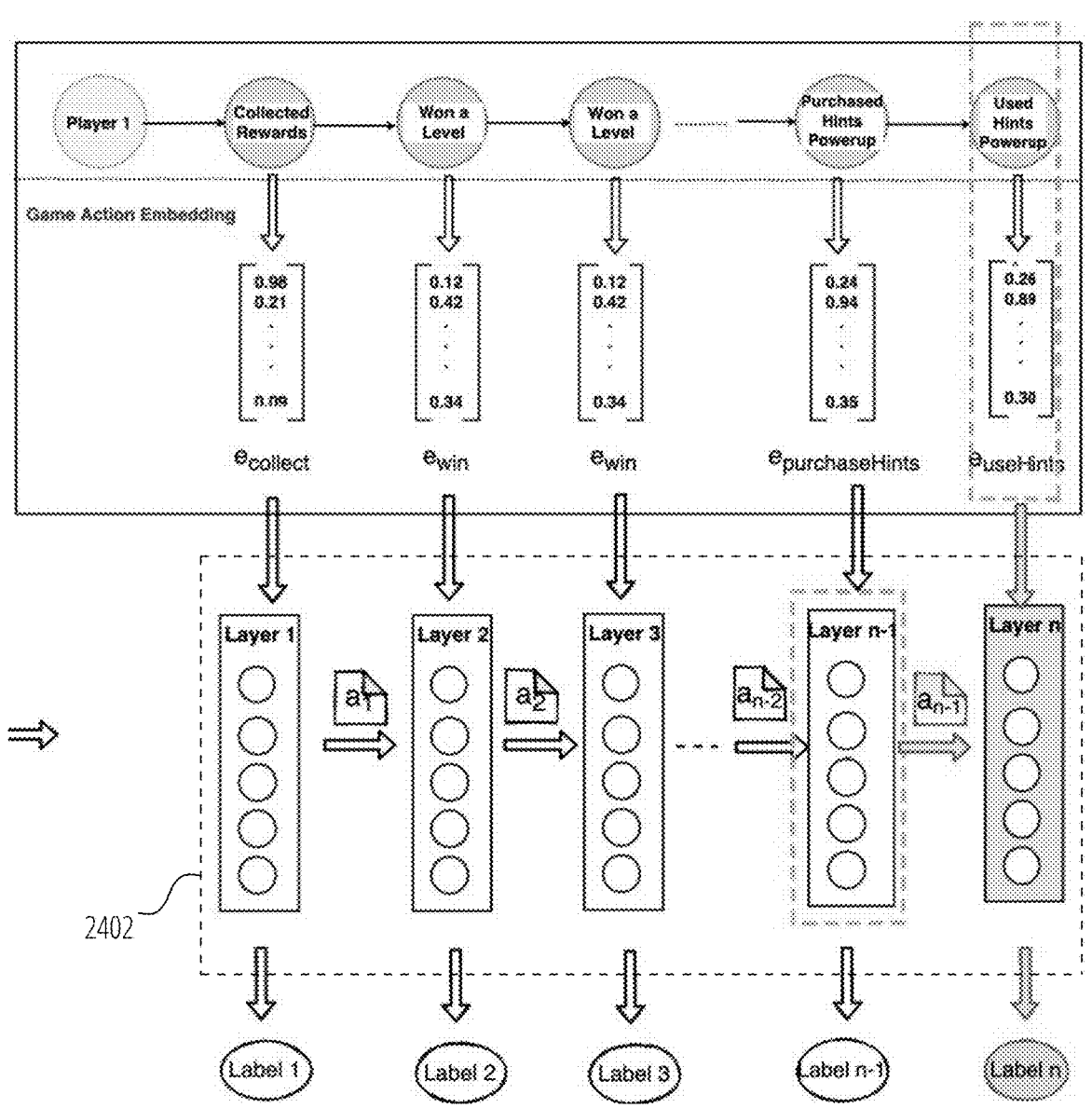
FIG. 24A is a data flow diagram for a recurrent neural network predicting psychological labels in a many-to-many structure, according to one example.
Figure 24B:
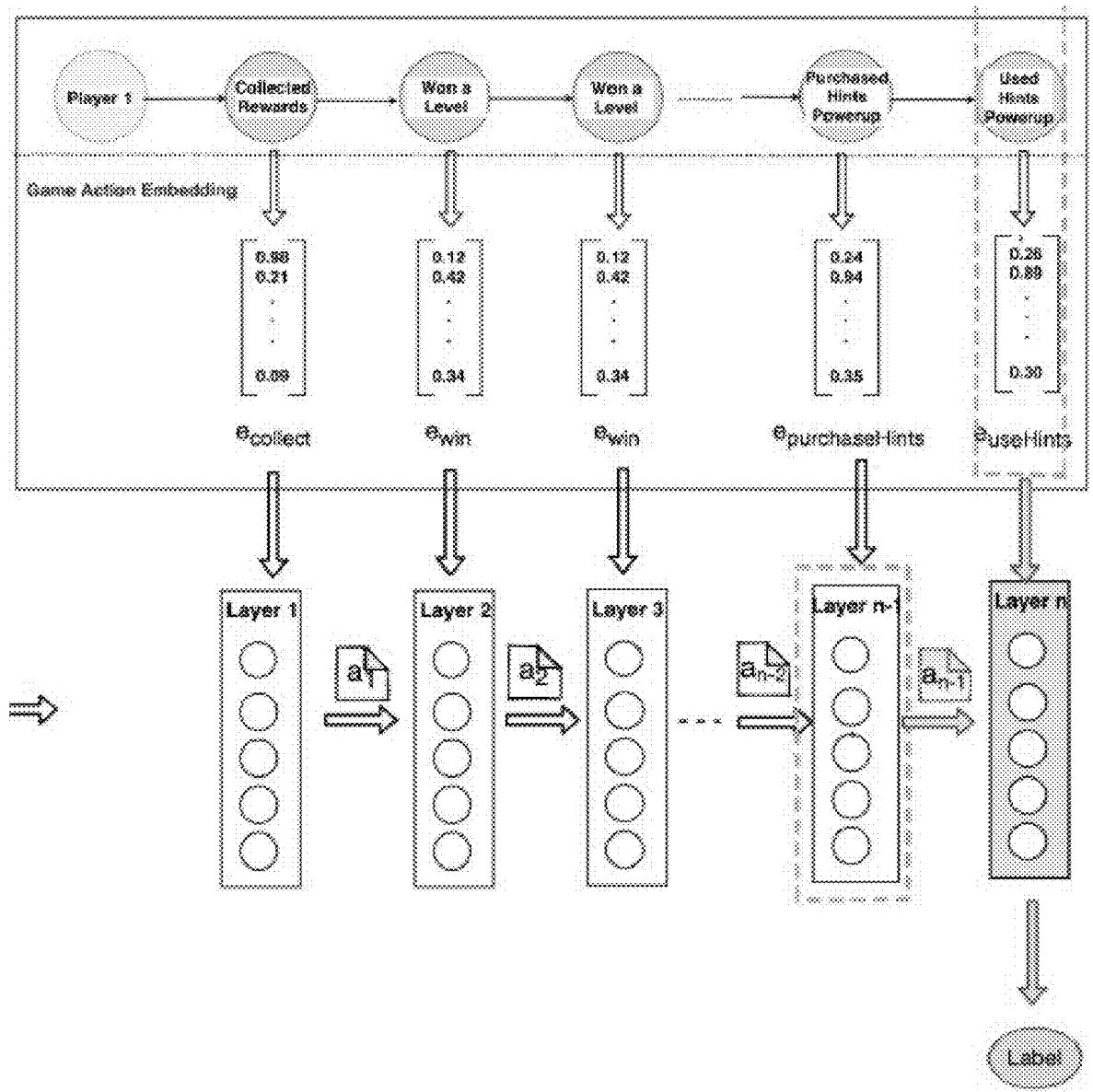
FIG. 24B is a data flow diagram for a recurrent neural network predicting psychological labels in a many-to-one structure, according to one example.

In instances where psychological features are to be estimated for respective actions (e.g., to estimate a player emotional state for respective actions, as in the example of FIG. 24A) labels are mapped to actions. In such case, a Many-to-Many player journey model such as that described below with reference to FIG. 24A can be used to translate a sequence of actions into a sequence of labels. One use case of this model is to simulate the player's emotional changes throughout the given journey, where the sequence of predicted labels here is a sequence of emotional states, ranging from 'happy', 'frustrated', 'shocked', 'annoyed', 'regret' etc. This will give insightful information for the generator to do emotion engineering in the game and tweak the game design to induce desirable emotions.

At operation 2110, each player journey in the training set is mapped, using the previously constructed action embedding matrix, to a corresponding sequence of action embedding vectors These aspects of the method are again illustrated using the example player journey 2302 and the example action embedding matrix 2306. As shown schematically in FIG. 23C, each of the actions 2304 in player journey 2302 is, via action embedding matrix 2306, converted to a respective representation vector or action embedding vector 2310. For example, action [Collected Rewards] will be mapped to the vector $e_{collect}$ with value $[0.98, 0.21, \ldots, 0.09]^T$, and action [Won a Level] will be mapped to the vector $e_{win}$ with value $[0.12, 0.42, \ldots, 0.34]^T$, etc.

At operation 2112 (FIG. 21), the action embedding vectors are used to train a recurrent neural network model (in this example, RNN 2402 in FIG. 24A and FIG. 24B) by feeding the action embedding vectors 2310 sequentially based on their original temporal order in the player journey 2302, the RNN 2402 being trained to conform such inputs to the corresponding assigned motivation/emotional state label (also referred to for short as a psych label). This RNN model allow the production of a single player label of interest or a temporal sequence of labels associated with that player throughout the given journey, depending on the choice of a many-to-many structure (FIG. 24A) or a many-to-one structure (FIG. 24B).

By the use of a many-to-many player journey RNN model as shown in FIG. 24A, the system 100 implementing these techniques in the example is enabled to use the temporal sequence of player journey data to provide insights on the characteristics of a player, including psychological insights or profiles. A player journey is translated into a sequence of labels that summarizes the player's characteristics or psychological behavior profile. For example, in an example in which the predicted label at each layer of the RNN model (e.g., at each action 2304) represents an emotional state, the method enables simulation or inference of the player's emotional change overtime throughout the given journey if the predicted label at each layer represents an emotional state.

The RNN model training (at operation 2112) in the many-to-many structure of FIG. 24A in this example proceeds as follow:

Step 1: Take the first action in the player journey [Collected Rewards] and feed its embedding vector to construct the first hidden layer of RNN 2402. Output a predicted label (Label 1) using the information in Layer 1. The first output from RNN 2402 for each layer is a predicted probability distribution, e.g., [0.1, 0.6; 0.3], where each number represent the probability of an emotional state (e.g., [Happy, Sad, Frustrated], and the sum of these three numbers is 1 (equal to 100% probability). A single label 'Sad' is then assigned as the motivation of this journey because that is the psych parameter with the largest probability value, 0.6.

Step 2: Use the action embedding vector 2310 for the second action 2304 [Won a Level] together with compacted information [$a_1$] passed from Layer 1 to construct a second hidden layer in the neural network. Output a predicted label from Layer 2. Unlike Layer 1, Layer 2 is constructed using inputs from two sources: compacted information from Layer 1; and action vector 2310 from the player journey 2302.

Step 3: Repeat Step 2 for each but the last action, continuing the same procedure to construct a new hidden neural network layer at each action.

Last Step: Use the embedding vector 2310 for the last action 2304 [Used Hints Powerup] together with the information passed from the previous layers to construct the last hidden layer in the neural network, thus producing a predicted label from the last layer.

The output from this example RNN 2402 is thus a sequence of labels [$Label_1$, $Label_2$, . . . , $Label_n$], in this example, e.g., [Sad, Frustrated, . . . , Sad].

Instead of (or in addition to) generating a temporal sequence of labels like the emotional change for a given player journey, the system is in some examples configured to output a single prediction label at the very last step, thus providing a many-to-one construction, as illustrated schematically by way of example in FIG. 24B. This is employed when a single score/label is desired to summarize the entire journey. For example, if the primary motivation that brings players back to the game is to be identified, the following RNN structure of FIG. 24B can be employed by skipping outputting predicted labels in the intermediate hidden layers. Instead, compacted information is passed sequentially from layer to layer until the last or terminal layer, at which the predicted label is output.

Analogously to the initial outputs of the intermediate layers in FIG. 24A, the initial output of RNN 2402 in the many-to-one model of FIG. 24B is, for each player, a predicted probability distribution, e.g., [0.1, 0.6; 0.2; 0.1], where each number represent the probability of a motivation type [motiv1, motiv2, motiv3, motiv4], and the sum of these four numbers is 1 (equal to 100% probability). Then a single label 'motiv2' is assigned as the motivation of the journey under consideration, because the 'motiv2' label has the largest probability value of 0.6.

Returning now to FIG. 10, it will be seen that after the recurring NN has been trained, as described, a respective latest player journey is retrieved, at operation 2122, from the graph database 2128 for each player that is to be assessed. At operation 2114, each player journey is mapped to the action embedding matrix to extract a sequence of action embedding vectors, as described previously with reference to FIG. 23C. The respective sequence of action embedding vectors for each player journey is then fed to the trained RNN 2402, which assigns a single psych label for each journey (FIG. 24B) or a sequence of psych labels for each player journey (FIG. 24A).

The result of this automated estimation or inference of the relevant aspects of player psychology can be used beneficially in a variety of mechanisms. In some instances, the outputs are used for grouping or clustering players, or for assessment of game reception by a player population or sub-population. In this example, the results of the automated evaluation is incorporated in respective parametric player models, as discussed at length previously with reference to FIG. 11 and FIG. 12.

Thus, at operation 2118, the estimated label output is ingested by the player modeling engine (see, e.g., FIG. 21, FIG. 11, and FIG. 12) and are folded into the parametric player models for the respective players. In the example of FIG. 24B, where respective journeys are mapped to labels for the four motivation types of this example, the player model incorporates the initial probability distribution values for the respective motion motivation types as respective parametric values for a corresponding four motivational parameters or dimensions of the player model. It will be appreciated that different schemes for parametrising the label output and incorporating it in a player model can be employed. These parametric values are then in some examples predefined as linked parameters that inform automated selection of a corresponding configurable features of a game level, in a manner closely analogous to that described with reference to FIG. 16-FIG. 18H above.

In the example of FIG. 24A, where each journey produces a sequence of labels, the system in this example does an analysis that assigns a unique 0.0-1.0 number to each journey (like a lookup index). That index goes into the player model and is used by downstream systems to derive the sequence, while encoding the sequence as a single number in the model. In a particular example, such encoding comprises the following sequence of operations:

1. Flip the sequence to read right to left (rather than left to right). So [emo1, emo2, emo3]→[emo3, emo2, emo1];
2. Swap the emo-label for a numeral→[3,2,1]
3. Concatenate to a base-5 number→321
4. Transcode to base-10 number→86
5. Normalize based on the biggest base-5 number possible for length 6 (444444→15624), 86/15624= 0.00550425227854583
6. This is now an encoding that uniquely address the sequence [emo3, emo2, emo1] and that is be merged into the player model data as a new dimension.

It will be seen that benefits of this aspects of the disclosures provides for automated identification of otherwise indistinguishable player motivations and emotional responses to interaction with the game. The results of this powerful analysis is moreover parametrized and seamlessly incorporated into parametric player model systems, thus allowing for inferred psychological aspects of player behavior to inform automated player clustering and/or automated generation of custom content. All of these benefits are achieved with minimal labor cost.

Recapitulation of Some Disclosed Examples

From the preceding description it will be seen that a number of example embodiments and combinations of example embodiments are disclosed. Some numbered examples (Example 1, 2, 3, etc.) are provided below. These are provided as examples only and do not limit the technology disclosed herein.

Example 1 is a method comprising: causing display on an operator device of a generator interface for a content generator configured for at least partly automated generation of configuration data for a game event in a computer-implemented game, the game event comprising a plurality of game levels; via an event sizing mechanism provided by the generator interface, receiving operator input of an event size value that quantifies the plurality of game levels which are together to form the game event and for which respective configuration data is to be generated; via a target input mechanism provided by the generator interface, receiving operator input defining, for each of the plurality of game levels, a respective value for a target metric with respect to gameplay performance in the game level; and causing automated generation by the content generator of configuration data for the game event such the plurality of game levels together forming the game event conform in number to the event size value, respective configuration data for each game level being generated based at least in part on the respectively corresponding target metric value.

In Example 2, the subject matter of Example 1 includes, wherein the target input mechanism is a graph mechanism defining a target curve that visually represents the respective target metric values for the plurality of game levels, the respective target metric values being separately manipulable via operator interaction with the graph mechanism to change the target curve.

In Example 3, the subject matter of Examples 1-2 includes, wherein the generator interface further provides a cluster selection mechanism configured to receive operator input selecting one of a plurality of a predefined player clusters defining respective subsets of a global set of players of the game, the method including communicating to the content generator player model data with respect to the selected player cluster to cause the generation of the configuration data based at least in part on the player model data in combination with the target metric values, the configuration data thus being customized for the selected player cluster.

In Example 4, the subject matter of Example 3 includes, maintaining a respective player model for each player of the game, each player model comprising a multi-dimensional vector having a respective numerical dimension value for each of a predefined set of dimensions indicating different respective aspects of player behavior; combining the respective player models of those players together forming the selected player cluster, thereby to generate a representative player model for the selected cluster; communicating the representative player model for the selected player cluster to the content generator for generation of the configuration data based at least in part on the representative player model.

In Example 5, the subject matter of Examples 1-4 includes, wherein the target metric is a difficulty level of the respective game level.

In Example 6, the subject matter of Examples 1-5 includes, wherein the generator interface is provided by a game server system in communication with the operator device via a distributed computer network, wherein the generator interface is a web-based user interface.

In Example 7, the subject matter of Examples 1-6 includes, via a rules selection mechanism provided by the generator interface, receiving operator input selecting one of a plurality of different predefined rulesets, each ruleset defining a set of computer-implementable game rules; and communicating the selected ruleset from the generator interface to the content generator, thus causing configuration by the content generator of the game event for gameplay according to the selected ruleset.

In Example 8, the subject matter of Example 7 includes, displaying in the generator interface a code editing mechanism configured to: display the selected ruleset as editable code; and enable operator editing of the selected ruleset to produce an edited ruleset, so that the content generator generates the configuration data of the game event for gameplay according to the edited ruleset.

Example 9 is a system comprising: one or more computer processor devices; and memory storing instructions to configure the system, when the instructions are executed by the one or more computer processor devices, to perform operations comprising: causing display on an operator device of a generator interface for a content generator configured for at least partly automated generation of configuration data for a game event in a computer-implemented game, the game event comprising a plurality of game levels; via an event sizing mechanism provided by the generator interface, receiving operator input of an event size value that quantifies the plurality of game levels which are together to form the game event and for which respective configuration data is to be generated; via a target input mechanism provided by the generator interface, receiving operator input defining, for each of the plurality of game levels, a respective value for a target metric with respect to gameplay performance in the game level; and causing automated generation by the content generator of configuration data for the game event such the plurality of game levels together forming the game event conform in number to the event size value, respective configuration data for each game level being generated based at least in part on the respectively corresponding target metric value.

In Example 10, the subject matter of Example 9 includes, wherein the target input mechanism is a graph mechanism defining a target curve that visually represents the respective target metric values for the plurality of game levels, the respective target metric values being separately manipulable via operator interaction with the graph mechanism to change the target curve.

In Example 11, the subject matter of Examples 9-10 includes, wherein the instructions further configure the system such that the generator interface further provides a cluster selection mechanism configured to receive operator input selecting one of a plurality of a predefined player clusters defining respective subsets of a global set of players of the game, the system being configured to communicate to the content generator player model data with respect to the selected player cluster to cause the generation of the configuration data based at least in part on the player model data in combination with the target metric values, the configuration data thus being customized for the selected player cluster.

In Example 12, the subject matter of Example 11 includes, wherein the instructions further configure the system to perform operations comprising: maintaining a respective player model for each player of the game, each player model comprising a multi-dimensional vector having a respective numerical dimension value for each of a predefined set of dimensions indicating different respective aspects of player behavior; combining the respective player models of those players together forming the selected player cluster, thereby to generate a representative player model for the selected cluster; communicating the representative player model for the selected player cluster to the content generator for generation of the configuration data based at least in part on the representative player model.

In Example 13, the subject matter of Examples 9-12 includes, wherein the target metric is a difficulty level of the respective game level.

In Example 14, the subject matter of Examples 9-13 includes, wherein the generator interface is provided by a game server system in communication with the operator device via a distributed computer network, wherein the generator interface is a web-based user interface.

In Example 15, the subject matter of Examples 9-14 includes, wherein the instructions further configure the system to perform operations comprising: via a rules selection mechanism provided by the generator interface, receiving operator input selecting one of a plurality of different predefined rulesets, each ruleset defining a set of computer-implementable game rules; and communicating the selected ruleset from the generator interface to the content generator, thus causing configuration by the content generator of the game event for gameplay according to the selected ruleset.

In Example 16, the subject matter of Example 15 includes, wherein the instructions further configure the system to display in the generator interface a code editing mechanism configured to: display the selected ruleset as editable code; and enable operator editing of the selected ruleset to produce an edited ruleset, so that the content generator generates the configuration data of the game event for gameplay according to the edited ruleset.

Example 17 is a non-transitory computer-readable storage medium having stored thereon instructions that, when executed by one or more computer processor devices, cause the one or more computer processor devices to perform operations comprising: causing display on an operator device of a generator interface for a content generator configured for at least partly automated generation of configuration data for a game event in a computer-implemented game, the game event comprising a plurality of game levels; via an event sizing mechanism provided by the generator interface, receiving operator input of an event size value that quantifies the plurality of game levels which are together to form the game event and for which respective configuration data is to be generated; via a target input mechanism provided by the generator interface, receiving operator input defining, for each of the plurality of game levels, a respective value for a target metric with respect to gameplay performance in the game level; and causing automated generation by the content generator of configuration data for the game event such the plurality of game levels together forming the game event conform in number to the event size value, respective configuration data for each game level being generated based at least in part on the respectively corresponding target metric value.

In Example 18, the subject matter of Example 17 includes, wherein the target input mechanism is a graph mechanism defining a target curve that visually represents the respective target metric values for the plurality of game levels, the respective target metric values being separately manipulable via operator interaction with the graph mechanism to change the target curve.

In Example 19, the subject matter of Examples 17-18 includes, wherein the generator interface further provides a cluster selection mechanism configured to receive operator input selecting one of a plurality of a predefined player clusters defining respective subsets of a global set of players of the game, the method including communicating to the content generator player model data with respect to the selected player cluster to cause the generation of the configuration data based at least in part on the player model data in combination with the target metric values, the configuration data thus being customized for the selected player cluster.

In Example 20, the subject matter of Example 19 includes, wherein the instructions further configure the computer to: maintaining a respective player model for each player of the game, each player model comprising a multi-dimensional vector having a respective numerical dimension value for each of a predefined set of dimensions indicating different respective aspects of player behavior; combining the respective player models of those players together forming the selected player cluster, thereby to generate a representative player model for the selected cluster; communicating the representative player model for the selected player cluster to the content generator for generation of the configuration data based at least in part on the representative player model.

Example 21 is a method comprising: populating a multi-dimensional player model representing gameplay behavior in a computer-implemented game, the player model comprising a multi-value set of parametric values corresponding to a predefined parameter set defined by multiple gameplay parameters, each parametric value being a numerical value representing player behavior for a respectively corresponding gameplay parameter in the parameter set; and in an at least partly automated procedure using the player model, customizing game content of the game for gameplay consistent with the player model.

In Example 22, the subject matter of Example 21 includes, accessing historical gameplay data for multiple players of the game; and based on the historical gameplay data, compiling a respective player model for each of the multiple players, wherein the customizing of the game content is based at least in part on the player models of the multiple players.

In Example 23, the subject matter of Example 22 includes, wherein each parametric value is a real number, so that the set of parametric values for each player model represent a datapoint in a continuous parameter space defined by the multiple gameplay parameters as respective dimensions.

In Example 24, the subject matter of Examples 22-23 includes, accessing player model data comprising respective player models for a first set of players; in an automated procedure that is performed using one or more computer processor devices and that is based on the player model data, identifying a plurality of player clusters that form respective subsets of the first set of players; and configuring customized game content for at least a particular one of the plurality of player clusters.

In Example 25, the subject matter of Example 24 includes, wherein the identifying of the plurality of player clusters comprises: calculating distances, in a multidimensional parameter space whose dimensions are defined by the predefined parameter set, between datapoints in the parameter space represented by the respective player models of the first set of players; and identifying respective player clusters based on proximity clustering of the datapoints based on the calculated distances.

In Example 26, the subject matter of Examples 24-25 includes, based on the respective player models of the particular player cluster, compiling a representative player model for the particular player cluster, the representative player model defined by a respective set of parametric values for the predefined parameter set.

In Example 27, the subject matter of Example 26 includes, wherein the representative player model for the particular player cluster is compiled by calculating a respective parametric value for each of the gameplay parameters based on respective parametric values of the corresponding gameplay parameters in the player models of the cluster.

In Example 28, the subject matter of Examples 26-27 includes, wherein the customizing of game content comprises, in an at least partly automated procedure, generating configuration data for a unit of gameplay based at least in part on the representative player model, such that different configuration data is generated in different instances of customization based on different respective representative player models.

In Example 29, the subject matter of Examples 26-28 includes, wherein the customizing of game content comprises, based at least in part on the representative player model, performing automated evaluation of configuration data for a unit of gameplay.

In Example 30, the subject matter of Example 29 includes, wherein the automated evaluation comprises: simulating gameplay of the unit of gameplay by according to the representative player model; and comparing a performance metric for the simulated gameplay to a predefined target metric.

Example 31 is a system comprising: one or more computer processor devices; and memory storing instructions to configure the system, when the instructions are executed by the one or more computer processor devices, to perform operations comprising: populating a multidimensional player model representing gameplay behavior in a computer-implemented game, the player model comprising a multi-value set of parametric values corresponding to a predefined parameter set defined by multiple gameplay parameters, each parametric value being a numerical value representing player behavior for a respectively corresponding gameplay parameter in the parameter set; and in an at least partly automated procedure using the player model, customizing game content of the game for gameplay consistent with the player model.

In Example 32, the subject matter of Example 31 includes, wherein the instructions further configure the system to: access historical gameplay data for multiple players of the game; and based on the historical gameplay data, compile a respective player model for each of the multiple players, wherein the customizing of the game content is based at least in part on the player models of the multiple players.

In Example 33, the subject matter of Example 32 includes, wherein each parametric value is a real number, so that the set of parametric values for each player model represent a datapoint in a continuous parameter space defined by the multiple gameplay parameters as respective dimensions.

In Example 34, the subject matter of Examples 32-33 includes, wherein the instructions further configure the system to: access player model data comprising respective player models for a first set of players; identify a plurality of player clusters that form respective subsets of the first set of players; and configure customized game content for at least a particular one of the plurality of player clusters.

In Example 35, the subject matter of Example 34 includes, wherein the instructions further configure the system to: calculate distances, in a multidimensional parameter space whose dimensions are defined by the predefined parameter set, between datapoints in the parameter space represented by the respective player models of the first set of players; and identify respective player clusters based on proximity clustering of the datapoints based on the calculated distances.

In Example 36, the subject matter of Examples 34-35 includes, wherein the instructions further configure the system to: based on the respective player models of the particular player cluster, compile a representative player model for the particular player cluster, the representative player model defined by a respective set of parametric values for the predefined parameter set.

In Example 37, the subject matter of Example 36 includes, wherein the instructions further configure the system to compile the representative player model for the particular player cluster by calculating a respective parametric value for each of the gameplay parameters based on respective parametric values of the corresponding gameplay parameters in the player models of the cluster.

In Example 38, the subject matter of Examples 36-37 includes, wherein the instructions further configure the system to perform customize game content by, in an at least partly automated procedure, generating configuration data for a unit of gameplay based at least in part on the representative player model, such that different configuration data is generated in different instances of customization based on different respective representative player models.

In Example 39, the subject matter of Examples 36-38 includes, wherein the instructions further configure the system to perform, based at least in part on the representative player model, automated evaluation of configuration data for a unit of gameplay.

Example 40 is a non-transitory computer-readable storage medium having stored thereon instructions that, when executed by one or more computer processor devices, cause the one or more computer processor devices to perform operations comprising: accessing gameplay information for gameplay behavior of a target set of players for which custom game content is to be generated, the gameplay information comprising a plurality of parametric values respectively corresponding to a predefined plurality of parameters for gameplay in a computer-implemented game; and based at least in part on the gameplay information, performing an automated content generation procedure that produces configuration data defining respective custom values for a plurality of configurable features of a unit of gameplay, wherein the content generation procedure comprises a sequence of configuration stages in which the configuration data is progressively populated with custom values for respective configurable features of the unit of gameplay.

Example 41 is a method comprising: accessing gameplay information for gameplay behavior of a target set of players for which custom game content is to be generated, the gameplay information comprising a plurality of parametric values respectively corresponding to a predefined plurality of parameters for gameplay in a computer-implemented game; and in an automated process that is performed using one or more computer processors configured therefor and that is based at least in part on the gameplay information, performing an automated content generation procedure that produces configuration data defining respective custom values for a plurality of configurable features of a unit of gameplay, wherein the content generation procedure comprises a sequence of configuration stages in which the configuration data is progressively populated with custom values for respective configurable features of the unit of gameplay.

In Example 42, the subject matter of Example 41 includes, wherein each of the configuration stages comprises: receiving a current version of a predefined data structure for the configuration data; based at least on the respective parametric value in the gameplay information for a predefined linked parameter, determining a custom value for a particular one of the plurality of configurable features of the unit of gameplay; and incorporating the custom value for the particular configurable feature in the data structure, thereby updating the current version of the data structure such that it includes the custom value for the particular configurable feature.

In Example 43, the subject matter of Example 42 includes, wherein, in one or more of the configuration stages, determination of the custom value for the respective configurable feature is based at least in part on the respective custom values incorporated in the current version of the data structure in one or more preceding configuration stages.

In Example 44, the subject matter of Examples 42-43 includes, wherein, in at least one of the configuration stages, determination of the custom value for the respective configurable feature is a randomized procedure biased or constrained by a seed value derived from at least one linked parametric value from the gameplay information.

In Example 45, the subject matter of Examples 42-44 includes, wherein the determining of the respective custom value for one or more of the configuration stages comprises: using a non-linear response function defining a seed value for the respective configuration stage as a function of the respective linked parametric value, determining a seed value specific to the configuration stage; and determining the custom value for the respective configurable feature based on the seed value.

In Example 46, the subject matter of Example 45 includes, wherein the response function for at least one of the configuration stages defines the respective seed value as a function of two or more respective linked parametric values selected from the plurality of parameters of the gameplay information.

In Example 47, the subject matter of Examples 41-46 includes, wherein the gameplay information comprises a player model that defines a vector in a multidimensional parameter space defined by multiple gameplay parameters as coordinate dimensions, the vector being represented by a corresponding set of parametric values generated based on historical gameplay by the target set of players for the respective gameplay parameters.

In Example 48, the subject matter of Examples 41-47 includes, wherein the unit of gameplay is a game level, the configuration data defining a level generation file consumable by a game engine to implement the game level on a client device.

In Example 49, the subject matter of Examples 41-48 includes, wherein the plurality of parametric values of the gameplay information are normalized to a common value range.

Example 50 is a system comprising: one or more computer processor devices; and memory storing instructions to configure the system, when the instructions are executed by the one or more computer processor devices, to perform operations comprising: accessing gameplay information for gameplay behavior of a target set of players for which custom game content is to be generated, the gameplay information comprising a plurality of parametric values respectively corresponding to a predefined plurality of parameters for gameplay in a computer-implemented game; and based at least in part on the gameplay information, performing an automated content generation procedure that produces configuration data define respective custom values for a plurality of configurable features of a unit of gameplay, wherein the content generation procedure comprises a sequence of configuration stages in which the configuration data is progressively populated with custom values for respective configurable features of the unit of gameplay.

In Example 51, the subject matter of Example 50 includes, wherein the instructions further configure the system to perform the content generation procedure such that each of the configuration stages comprises: receiving a current version of a predefined data structure for the configuration data; based at least on the respective parametric value in the gameplay information for a predefined linked parameter, determining a custom value for a particular one of the plurality of configurable features of the unit of gameplay; and incorporating the custom value for the particular configurable feature in the data structure, thereby updating the current version of the data structure such that it includes the custom value for the particular configurable feature.

In Example 52, the subject matter of Example 51 includes, wherein the instructions further configure the system to determine, in one or more of the configuration stages, the custom value for the respective configurable feature based at least in part on the respective custom values incorporated in the current version of the data structure in one or more precede configuration stages.

In Example 53, the subject matter of Examples 51-52 includes, wherein the instructions further configure the system to, wherein, in at least one of the configuration stages, determination of the custom value for the respective configurable feature is a randomized procedure biased or constrained by a seed value derived from at least one linked parametric value from the gameplay information.

In Example 54, the subject matter of Examples 51-53 includes, wherein the instructions further configure the system to, wherein the determining of the respective custom value for one or more of the configuration stages comprises: using a non-linear response function defining a seed value for the respective configuration stage as a function of the respective linked parametric value, determine a seed value specific to the configuration stage; and determine the custom value for the respective configurable feature based on the seed value.

In Example 55, the subject matter of Example 54 includes, wherein the response function for at least one of the configuration stages defines the respective seed value as a function of two or more respective linked parametric values selected from the plurality of parameters of the gameplay information.

In Example 56, the subject matter of Examples 50-55 includes, wherein the gameplay information comprises a player model that defines a vector in a multidimensional parameter space defined by multiple gameplay parameters as coordinate dimensions, the vector being represented by a corresponding set of parametric values generated based on historical gameplay by the target set of players for the respective gameplay parameters.

In Example 57, the subject matter of Examples 50-56 includes, wherein the unit of gameplay is a game level, the configuration data defining a level generation file consumable by a game engine to implement the game level on a client device.

In Example 58, the subject matter of Examples 50-57 includes, wherein the instructions further configure the system to normalize the plurality of parametric values of the gameplay information to a common value range.

Example 59 is a non-transitory computer-readable storage medium having stored thereon instructions that, when executed by one or more computer processor devices, cause the one or more computer processor devices to perform operations comprising: accessing gameplay information for gameplay behavior of a target set of players for which custom game content is to be generated, the gameplay information comprising a plurality of parametric values respectively corresponding to a predefined plurality of parameters for gameplay in a computer-implemented game; and based at least in part on the gameplay information, performing an automated content generation procedure that produces configuration data defining respective custom values for a plurality of configurable features of a unit of gameplay, wherein the content generation procedure comprises a sequence of configuration stages in which the configuration data is progressively populated with custom values for respective configurable features of the unit of gameplay.

In Example 60, the subject matter of Example 59 includes, wherein each of the configuration stages comprises: receiving a current version of a predefined data structure for the configuration data; based at least on the respective parametric value in the gameplay information for a predefined linked parameter, determining a custom value for a particular one of the plurality of configurable features of the unit of gameplay; and incorporating the custom value for the particular configurable feature in the data structure, thereby updating the current version of the data structure such that it includes the custom value for the particular configurable feature.

Example 61 is a method comprising: receiving behavior data for multiple players of a computer-implemented game, the behavior data indicating interaction journeys by respective players within the game, each interaction journey comprising a sequence of actions selected from a predefined set of actions and including one or more non-gameplay actions; extracting, from the behavior data, training data that comprises a subset of the interaction journeys in the behavior data; assigning to each interaction journey in the training data a respective psychological label indicating one of a predefined set of label values pertaining to a psychological feature of player experience, thereby providing labeled training data; using the labeled training data, training a neural network model (NN model) for label prediction responsive to input of respective action sequences, thereby providing a trained NN model; and using the trained NN model, producing a psychological label prediction for a player based on a particular interaction journey by the player.

In Example 62, the subject matter of Example 61 includes, based on the behavior data, compiling graph data in which each interaction journey is represented as directed graph structure in which each action in the corresponding sequence of actions is represented as a respective action node; and storing the graph data in a graph database.

In Example 63, the subject matter of Example 62 includes, wherein each graph structure in the graph database models a single respective interaction session of an associated player with a game application.

In Example 64, the subject matter of Examples 61-63 includes, based on the behavior data, building an action embedding matrix that maps each respective action of the predefined set of actions to a corresponding action embedding vector; using the action embedding matrix, converting a plurality of actions in a given action sequence to corresponding action embedding vectors; and providing the resultant plurality of action embedding vectors as inputs to the NN model for the given action sequence in at least one of: the training of the NN model; or label estimation for the given action sequence.

In Example 65, the subject matter of Example 64 includes, wherein the building of the action embedding matrix comprises: extracting multiple action sequences from the behavior data; and using the multiple action sequences provided to an embedding NN model, optimizing a candidate embedding matrix to predict as output a terminal action of each action sequence responsive to input comprising a plurality of pre-terminal actions in the action sequence.

In Example 66, the subject matter of Examples 61-65 includes, wherein the NN model is configured to produce a single respective psychological label prediction for each respective sequence of actions.

In Example 67, the subject matter of Examples 61-66 includes, wherein the psychological feature to which the predefined set of label values pertain is player motivation for gameplay.

In Example 68, the subject matter of Examples 61-67 includes, wherein the NN model is configured to produce a sequence of psychological label predictions for each respective sequence of actions.

In Example 69, the subject matter of Examples 61-68 includes, wherein the psychological feature to which the predefined set of label values pertain is an emotional state of the player.

In Example 70, the subject matter of Examples 61-69 includes, incorporating the psychological label prediction into a parametric player model; and in an automated procedure, generating custom game content based at least in part on the psychological label prediction incorporated in the parametric player model.

Example 71 is a system comprising: one or more computer processor devices; and memory storing instructions to configure the system, when the instructions are executed by the one or more computer processor devices, to perform operations comprising: receiving behavior data for multiple players of a computer-implemented game, the behavior data indicating interaction journeys by respective players within the game, each interaction journey comprising a sequence of actions selected from a predefined set of actions and including one or more non-gameplay actions; extracting, from the behavior data, training data that comprises a subset of the interaction journeys in the behavior data; responsive to operator input, assigning to each interaction journey in the training data a respective psychological label indicating one of a predefined set of label values pertaining to a psychological feature of player experience, thereby providing labeled training data; using the labeled training data, training a neural network model (NN model) for label prediction responsive to input of respective action sequences, thereby providing a trained NN model; and using the trained NN model, producing a psychological label prediction for a player based on a particular interaction journey by the player.

In Example 72, the subject matter of Example 71 includes, wherein the instructions further configure the one or more computer processor devices to: based on the behavior data, compile graph data in which each interaction journey is represented as directed graph structure in which each action in the corresponding sequence of actions is represented as a respective action node; and store the graph data in a graph database.

In Example 73, the subject matter of Example 72 includes, wherein each graph structure in the graph database models a single respective interaction session of an associated player with a game application.

In Example 74, the subject matter of Examples 71-73 includes, wherein the instructions further configure the one or more computer processor devices to perform operations comprising: based on the behavior data, building an action embedding matrix that maps each respective action of the predefined set of actions to a corresponding action embedding vector; using the action embedding matrix, converting a plurality of actions in a given action sequence to corresponding action embedding vectors; and providing the resultant plurality of action embedding vectors as inputs to the NN model for the given action sequence in at least one of: the training of the NN model; or label estimation for the given action sequence.

In Example 75, the subject matter of Example 74 includes, wherein the building of the action embedding matrix comprises: extracting multiple action sequences from the behavior data; and using the multiple action sequences provided to an embedding NN model, optimizing a candidate embing matrix to predict as output a terminal action of each action sequence responsive to input comprising a plurality of pre-terminal actions in the action sequence.

In Example 76, the subject matter of Examples 71-75 includes, wherein the NN model is configured to produce a single respective psychological label prediction for each respective sequence of actions.

In Example 77, the subject matter of Examples 71-76 includes, wherein the psychological feature to which the predefined set of label values pertain is player motivation for gameplay.

In Example 78, the subject matter of Examples 71-77 includes, wherein the NN model is configured to produce a sequence of psychological label predictions for each respective sequence of actions.

In Example 79, the subject matter of Examples 71-78 includes, wherein the psychological feature to which the predefined set of label values pertain is an emotional state of the player.

Example 80 is a non-transitory computer-readable storage medium having stored thereon instructions that, when executed by one or more computer processor devices, cause the one or more computer processor devices to perform operations comprising: receiving behavior data for multiple players of a computer-implemented game, the behavior data indicating interaction journeys by respective players within the game, each interaction journey comprising a sequence of actions selected from a predefined set of actions and including one or more non-gameplay actions; extracting, from the behavior data, training data that comprises a subset of the interaction journeys in the behavior data; responsive to operator input, assigning to each interaction journey in the training data a respective psychological label indicating one of a predefined set of label values pertaining to a psychological feature of player experience, thereby providing labeled training data; using the labeled training data, training a neural network model (NN model) for label prediction responsive to input of respective action sequences, thereby providing a trained NN model; and using the trained NN model, producing a psychological label prediction for a player based on a particular interaction journey by the player.

Example 81 is a method implemented at a game server, the method comprising: receiving, at the game server, data associated with gameplay of one or more user accounts, the one or more user accounts being used for playing a designated game; computing, for the one or more user accounts, a player model representing previous in-game behavior of the one or more user accounts; identifying, based on the player model, configuration values for the designated game, wherein the configuration values represent data to specify operation of the designated game, wherein the configuration values represent at least one of a game mechanics configuration and a game parameter configuration; causing transmission of the configuration values to a client device, the configuration values causing the client device to adjust a game engine at the client device based on the previous in-game behavior of the one or more user accounts.

In Example 82, the subject matter of Example 81 includes, wherein the configuration values represent one or more of: a player configuration, an event configuration, a level configuration, and a scoring configuration.

In Example 83, the subject matter of Examples 81-82 includes, wherein the configuration values are transmitted to the client device in a standalone data payload over the air, the standalone data payload being transmitted directly from the game server to the client device, without passing through an application store server.

In Example 84, the subject matter of Examples 81-83 includes, wherein the client device stores the game engine, wherein the game engine is configurable using the configuration values, wherein the configuration values do not modify software of the game engine and are stored externally to the software of the game engine.

In Example 85, the subject matter of Examples 81-84 includes, wherein the player model comprises multiple dimensions, wherein identifying, based on the player model, the configuration values for the designated game comprises: clustering the player model into a group of player models using statistical methods, the group of player models corresponding to the configuration values.

In Example 86, the subject matter of Examples 81-85 includes, wherein the previous in-game behavior of the one or more user accounts comprises playing the designated game.

In Example 87, the subject matter of Examples 81-86 includes, wherein the game engine is for playing, at the client device, a plurality of games including the designated game.

Example 88 is a method implemented at a client device, the method comprising: storing, in a memory of the client device, a game engine for playing a designated game; receiving, over a network, configuration values for the designated game, wherein the configuration values represent data to specify operation of the designated game, wherein the configuration values represent at least one of a game mechanics configuration and a game parameter configuration; and adjusting operation of the game engine based on the received configuration values, without modifying software of the game engine.

In Example 89, the subject matter of Example 88 includes, wherein the configuration values represent one or more of: a player configuration, an event configuration, a level configuration, and a scoring configuration.

In Example 90, the subject matter of Examples 88-89 includes, wherein the configuration values are received, at the client device, in a standalone data payload over the air, the standalone data payload being transmitted directly from the game server to the client device, without passing through an application store server.

In Example 91, the subject matter of Example 90 includes, receiving the game engine from the application store server.

In Example 92, the subject matter of Examples 88-91 includes, storing, at the client device, the configuration values externally to the game engine.

In Example 93, the subject matter of Examples 88-92 includes, wherein the game engine for playing a plurality of games, including the designated game.

Example 94 is a non-transitory machine-readable medium storing instructions which, when executed by a game server, cause the game server to perform operations comprising: receiving, at the game server, data associated with gameplay of one or more user accounts, the one or more user accounts being used for playing a designated game; computing, for the one or more user accounts, a player model representing previous in-game behavior of the one or more user accounts; identifying, based on the player model, configuration values for the designated game, wherein the configuration values represent data to specify operation of the designated game, wherein the configuration values represent at least one of a game mechanics configuration and a game parameter configuration; causing transmission of the configuration values to a client device, the configuration values causing the client device to adjust a game engine at the client device based on the previous in-game behavior of the one or more user accounts.

In Example 95, the subject matter of Example 94 includes, wherein the configuration values represent one or more of: a player configuration, an event configuration, a level configuration, and a scoring configuration.

In Example 96, the subject matter of Examples 94-95 includes, wherein the configuration values are transmitted to the client device in a standalone data payload over the air, the standalone data payload being transmitted directly from the game server to the client device, without passing through an application store server.

In Example 97, the subject matter of Examples 94-96 includes, wherein the client device stores the game engine, wherein the game engine is configurable using the configuration values, wherein the configuration values do not modify software of the game engine and are stored externally to the software of the game engine.

In Example 98, the subject matter of Examples 94-97 includes, wherein the player model comprises multiple dimensions, wherein identifying, based on the player model, the configuration values for the designated game comprises: clustering the player model into a group of player models using statistical methods, the group of player models corresponding to the configuration values.

In Example 99, the subject matter of Examples 94-98 includes, wherein the previous in-game behavior of the one or more user accounts comprises playing the designated game.

In Example 100, the subject matter of Examples 94-99 includes, wherein the game engine is for playing, at the client device, a plurality of games including the designated game.

Example 101 is a method implemented at a game server, the method comprising: accessing a player model representing a subset of players, the player model being generated based on previous in-game behavior of the subset of players while playing a computer-implemented game; accessing a set of interactive content items associated with the game; forecasting, using the player model, a sequence of user actions of the subset of players during gameplay of the game, the sequence of user actions representing a prediction of user interaction with the set of interactive content items; computing, based on the forecasted sequence of user actions and software-defined outcomes of the forecasted sequence of user actions in the game, configuration values for the set of interactive content items; and causing execution of gameplay at a client device associated with the player model, the gameplay being according to the computed configuration values for the set of interactive content items.

In Example 102, the subject matter of Example 101 includes, wherein forecasting, using the player model, the user action leverages a statistical engine.

In Example 103, the subject matter of Example 102 includes, wherein the statistical engine comprises a utility response curve or at least one artificial neural network.

In Example 104, the subject matter of Examples 101-103 includes, wherein forecasting, using the player model, the user action comprises: presenting, to the player model, set of the content in an order in which the set of interactive content items is presented during gameplay of the game.

In Example 105, the subject matter of Examples 101-104 includes, optimizing the configuration values based on at least one metric.

In Example 106, the subject matter of Example 105 includes, wherein the at least one metric comprises one or more of: a target win rate, a repeat gameplay metric, a gameplay duration, a game engagement metric, and a revenue metric.

In Example 107, the subject matter of Examples 101-106 includes, wherein each player of the subset of players represented by the player model corresponds to a data point in a multiple dimensional space, and wherein the player model corresponds to a data point at a centroid of the subset of players in the multiple dimensional space.

In Example 108, the subject matter of Examples 1-107 includes, wherein the set of interactive content items prompts the sequence of user actions with the game.

Example 109 is a non-transitory machine-readable medium storing instructions which, when executed by a game server, cause the game server to perform operations comprising: accessing a player model representing a subset of players, the player model being generated based on previous in-game behavior of the subset of players while playing a computer-implemented game; accessing a set of interactive content items associated with the game; forecasting, using the player model, a sequence of user actions of the subset of players during gameplay of the game, the sequence of user actions representing a prediction of user interaction with the set of interactive content items; computing, based on the forecasted sequence of user actions and software-defined outcomes of the forecasted sequence of user actions in the game, configuration values for the set of interactive content items; and causing execution of gameplay at a client device associated with the player model, the gameplay being according to the computed configuration values for the set of interactive content items.

In Example 110, the subject matter of Example 109 includes, wherein forecasting, using the player model, the user action leverages a statistical engine.

In Example 111, the subject matter of Example 110 includes, wherein the statistical engine comprises a utility response curve or at least one artificial neural network.

In Example 112, the subject matter of Examples 109-111 includes, wherein forecasting, using the player model, the user action comprises: presenting, to the player model, set of the content in an order in which the set of interactive content items is presented during gameplay of the game.

In Example 113, the subject matter of Examples 109-112 includes, optimizing the configuration values based on at least one metric.

In Example 114, the subject matter of Example 113 includes, wherein the at least one metric comprises one or more of: a target win rate, a repeat gameplay metric, a gameplay duration, a game engagement metric, and a revenue metric.

In Example 115, the subject matter of Examples 109-114 includes, wherein each player of the subset of players represented by the player model corresponds to a data point in a multiple dimensional space, and wherein the player model corresponds to a data point at a centroid of the subset of players in the multiple dimensional space.

In Example 116, the subject matter of Examples 109-115 includes, wherein the set of interactive content items prompts the sequence of user actions with the game.

Example 117 is a game server comprising: processing circuitry; and a memory storing instructions which, when executed by the processing circuitry, cause the processing circuitry to perform operations comprising: accessing a player model representing a subset of players, the player model being generated based on previous in-game behavior of the subset of players while playing a computer-implemented game; accessing a set of interactive content items associated with the game; forecasting, using the player model, a sequence of user actions of the subset of players during gameplay of the game, the sequence of user actions representing a prediction of user interaction with the set of interactive content items; computing, based on the forecasted sequence of user actions and software-defined outcomes of the forecasted sequence of user actions in the game, configuration values for the set of interactive content items; and causing execution of gameplay at a client device associated with the player model, the gameplay being according to the computed configuration values for the set of interactive content items.

In Example 118, the subject matter of Example 117 includes, wherein forecasting, using the player model, the user action leverages a statistical engine.

In Example 119, the subject matter of Example 118 includes, wherein the statistical engine comprises a utility response curve or at least one artificial neural network.

In Example 120, the subject matter of Examples 117-119 includes, wherein forecasting, using the player model, the user action comprises: presenting, to the player model, set of the content in an order in which the set of interactive content items is presented during gameplay of the game.

Example 121 is a method implemented at a game server, the method comprising: generating a set of game content items for a designated game, the set of game content items being customized for one or more user accounts based on numerical values from a player model representing the one or more user accounts, the player model being generated based on previous in-game behavior of the one or more user accounts while playing the designated game; forecasting, using the player model, a sequence of user actions of the one or more user accounts during gameplay of the designated game with the generated set of game content items, the sequence of user actions representing a prediction of in-game user interaction with the set of game content items; computing, based on the forecasted sequence of user actions and software-defined outcomes of the forecasted sequence of user actions in the designated game, a set of metrics associated with gameplay of the one or more user accounts represented by the player model in the designated game; and providing an output based on the set of metrics.

In Example 122, the subject matter of Example 121 includes, wherein providing the output based on the set of metrics comprises: determining whether the set of metrics corresponds to a predefined range; and upon determining that the set of metrics corresponds to the predefined range: storing the set of game content items for transmission to a client device associated with the player model.

In Example 123, the subject matter of Example 122 includes, upon determining that the set of metrics does not correspond to the predefined range: adjusting the set of game content items; re-forecasting the sequence of user actions with the adjusted content items; and re-computing the set of metrics based on the re-forecasted sequence of user actions.

In Example 124, the subject matter of Example 123 includes, wherein adjusting the set of game content items leverages a hyperparameter search based on the predefined range and the set of game content items.

In Example 125, the subject matter of Examples 123-124 includes, repeating the adjusting, the re-forecasting, and the re-computing operations until at least one of: (i) the set of metrics corresponds to the predefined range, (ii) at least n adjustments have occurred where the set of metrics has not gotten closer to the predefined range, wherein n is a positive integer greater than or equal to two, and (iii) the adjusting, the re-forecasting, and the re-computing operations have been repeated at least a predefined number of times or over a predefined time period.

In Example 126, the subject matter of Examples 122-125 includes, wherein storing the set of game content items for transmission to the client device associated with the player model comprises: storing the set of game content items in a data repository, the data repository being accessible, via a network, by the client device.

In Example 127, the subject matter of Examples 121-126 includes, wherein the set of metrics comprises at least one of: a user engagement metric, a gameplay metric, and a revenue metric.

In Example 128, the subject matter of Example 127 includes, wherein the gameplay metric comprises a minimum win rate or a maximum win rate.

In Example 129, the subject matter of Examples 127-128 includes, wherein the user engagement metric comprises a repeat gameplay metric or a gameplay duration.

In Example 130, the subject matter of Examples 121-129 includes, wherein the set of game content items comprises interactive content items prompting the user action during gameplay of the designated game.

In Example 131, the subject matter of Examples 121-130 includes, wherein the set of game content items is generated based on at least the player model and previously existing game content items of the designated game.

In Example 132, the subject matter of Examples 121-131 includes, wherein the set of game content items is associated with a new level of the designated game.

Example 133 is a non-transitory machine-readable medium storing instructions which, when executed at a game server, cause the game server to perform operations comprising: generating a set of game content items for a designated game, the set of game content items being customized for one or more user accounts based on numerical values from a player model representing the one or more user accounts, the player model being generated based on previous in-game behavior of the one or more user accounts while playing the designated game; forecasting, using the player model, a sequence of user actions of the one or more user accounts during gameplay of the designated game with the generated set of game content items, the sequence of user actions representing a prediction of in-game user interaction with the set of game content items; computing, based on the forecasted sequence of user actions and software-defined outcomes of the forecasted sequence of user actions in the designated game, a set of metrics associated with gameplay of the one or more user accounts represented by the player model in the designated game; and providing an output based on the set of metrics.

In Example 134, the subject matter of Example 133 includes, wherein providing the output based on the set of metrics comprises: determining whether the set of metrics corresponds to a predefined range; and upon determining that the set of metrics corresponds to the predefined range: storing the set of game content items for transmission to a client device associated with the player model.

In Example 135, the subject matter of Example 134 includes, the operations further comprising: upon determining that the set of metrics does not correspond to the predefined range: adjusting the set of game content items; re-forecasting the sequence of user actions with the adjusted content items; and re-computing the set of metrics based on the re-forecasted sequence of user actions.

In Example 136, the subject matter of Example 135 includes, wherein adjusting the set of game content items leverages a hyperparameter search based on the predefined range and the set of game content items.

In Example 137, the subject matter of Examples 135-136 includes, the operations further comprising: repeating the adjusting, the re-forecasting, and the re-computing operations until at least one of: (i) the set of metrics corresponds to the predefined range, (ii) at least n adjustments have occurred where the set of metrics has not gotten closer to the predefined range, wherein n is a positive integer greater than or equal to two, and (iii) the adjusting, the re-forecasting, and the re-computing operations have been repeated at least a predefined number of times or over a predefined time period.

In Example 138, the subject matter of Examples 134-137 includes, wherein storing the set of game content items for transmission to the client device associated with the player model comprises: storing the set of game content items in a data repository, the data repository being accessible, via a network, by the client device.

Example 139 is a game server comprising: processing circuitry; and a memory storing instructions which, when executed by the processing circuitry, cause the processing circuitry to perform operations comprising: generating a set of game content items for a designated game, the set of game content items being customized for one or more user accounts based on numerical values from a player model representing the one or more user accounts, the player model being generated based on previous in-game behavior of the one or more user accounts while playing the designated game; forecasting, using the player model, a sequence of user actions of the one or more user accounts during gameplay of the designated game with the generated set of game content items, the sequence of user actions representing a prediction of in-game user interaction with the set of game content items; computing, based on the forecasted sequence of user actions and software-defined outcomes of the forecasted sequence of user actions in the designated game, a set of metrics associated with gameplay of the one or more user accounts represented by the player model in the designated game; and providing an output based on the set of metrics.

In Example 140, the subject matter of Example 139 includes, wherein providing the output based on the set of metrics comprises: determining whether the set of metrics corresponds to a predefined range; and upon determining that the set of metrics corresponds to the predefined range: storing the set of game content items for transmission to a client device associated with the player model.

Example 141 is a method implemented at a client device, the method comprising: receiving compiled software for a game engine, the game engine being for playing a designated game; receiving a game definition file for the designated game, the game definition file storing rules for the designated game, wherein the game definition file defines the rules using non-compiled machine-readable code; and executing the game engine at the client device to enable playing of the designated game via the client device, wherein executing the game engine comprises: accessing the game definition file; and providing, via a user interface generated on the client device, interactive gameplay of the designated game according to the rules for the designated game defined by the game definition file.

In Example 142, the subject matter of Example 141 includes, receiving an updated game definition file for the designated game; and executing the game engine at the client device to play the specified game, wherein executing the game engine comprises: accessing the updated game definition file; and providing, via the user interface generated on the client device, interactive gameplay of the designated game according to the rules for the designated game defined by the game definition file.

In Example 143, the subject matter of Example 142 includes, wherein the updated game definition file is received without receiving an updated game engine and without updating the game engine.

In Example 144, the subject matter of Examples 141-143 includes, wherein the game definition file represents a formal first order predicate logic for playing the designated game via the game engine.

In Example 145, the subject matter of Examples 141-144 includes, wherein the interactive gameplay of the designated game comprises providing, via the user interface, a graphical output and receiving, via the user interface at the client device, a user input for taking a user action in the designated game.

In Example 146, the subject matter of Examples 141-145 includes, wherein at least one rule from the rules for the designated game comprises a logical manipulation of a game state in response to a user action or a current game state.

In Example 147, the subject matter of Example 146 includes, wherein the logical manipulation of the game state indicates how a character or a content item is moved in the designated game or how points are assigned in the designated game.

In Example 148, the subject matter of Examples 141-147 includes, wherein: the compiled software for the game play engine is received, at the client device, from an application store server; and the game definition file is received, at the client device, from a game server.

In Example 149, the subject matter of Example 148 includes, wherein the application store server is separate and distinct from the game server.

In Example 150, the subject matter of Examples 141-149 includes, wherein at least a portion of the application store server is identical to at least a portion of the game server.

In Example 151, the subject matter of Examples 141-150 includes, wherein the game engine is for playing a plurality of games including the designated game.

Example 152 is a non-transitory machine-readable medium storing: a game definition file for a designated game, the game definition file storing rules for the designated game, wherein the game definition file defines the rules using non-compiled machine-readable code; and compiled software for a game engine, the game engine being for playing the designated game, wherein the game engine enables interactive gameplay of the designated game via a graphical user interface (GUI) according to the rules for the designated game defined by the game definition file.

In Example 153, the subject matter of Example 152 includes, wherein the game definition file represents a formal first order predicate logic for playing the designated game via the game engine.

In Example 154, the subject matter of Examples 152-153 includes, wherein the interactive gameplay of the designated game comprises providing, via the GUI, a graphical output and receiving, via the GUI, a user input for taking a user action in the designated game.

Example 155 is a client device comprising: processing circuitry; and a memory storing instructions which, when executed by the processing circuitry, cause the processing circuitry to perform operations comprising: receiving compiled software for a game engine, the game engine being for playing a designated game; receiving a game definition file for the designated game, the game definition file storing rules for the designated game, wherein the game definition file defines the rules using non-compiled machine-readable code; and executing the game engine at the client device to enable playing of the designated game via the client device, wherein executing the game engine comprises: accessing the game definition file; and providing, via a user interface generated on the client device, interactive gameplay of the designated game according to the rules for the designated game defined by the game definition file.

In Example 156, the subject matter of Example 155 includes, the operations further comprising: receiving an updated game definition file for the designated game; and executing the game engine at the client device to play the specified game, wherein executing the game engine comprises: accessing the updated game definition file; and providing, via the user interface generated on the client device, interactive gameplay of the designated game according to the rules for the designated game defined by the game definition file.

In Example 157, the subject matter of Example 156 includes, wherein the updated game definition file is received without receiving an updated game engine and without updating the game engine.

In Example 158, the subject matter of Examples 155-157 includes, wherein the game definition file represents a formal first order predicate logic for playing the designated game via the game engine.

In Example 159, the subject matter of Examples 155-158 includes, wherein the interactive gameplay of the designated game comprises providing, via the user interface, a graphical output and receiving, via the user interface at the client device, a user input for taking a user action in the designated game.

In Example 160, the subject matter of Examples 155-159 includes, wherein at least one rule from the rules for the designated game comprises a logical manipulation of a game state in response to a user action or a current game state.

Example 161 is at least one machine-readable medium including instructions that, when executed by processing circuitry, cause the processing circuitry to perform operations to implement of any of Examples 1-160.

Example 162 is an apparatus comprising means to implement of any of Examples 1-160.

Example 163 is a system to implement of any of Examples 1-160.

Example 164 is a method to implement of any of Examples 1-160.

Machine and Software Architecture

The systems, system components, methods, applications, and so forth described in conjunction with FIG. 1-FIG. 24B are implemented in some examples in the context of a machine and an associated software architecture. The sections below describe representative software architecture(s) and machine (e.g., hardware) architecture(s) that are suitable for use with the disclosed examples.

Software architectures are used in conjunction with hardware architectures to create devices and machines configured for particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. The software and hardware architectures presented here are example architectures for implementing the disclosure, and are not exhaustive as to possible architectures that can be employed for implementing the disclosure.

Software Architecture

Figure 25:
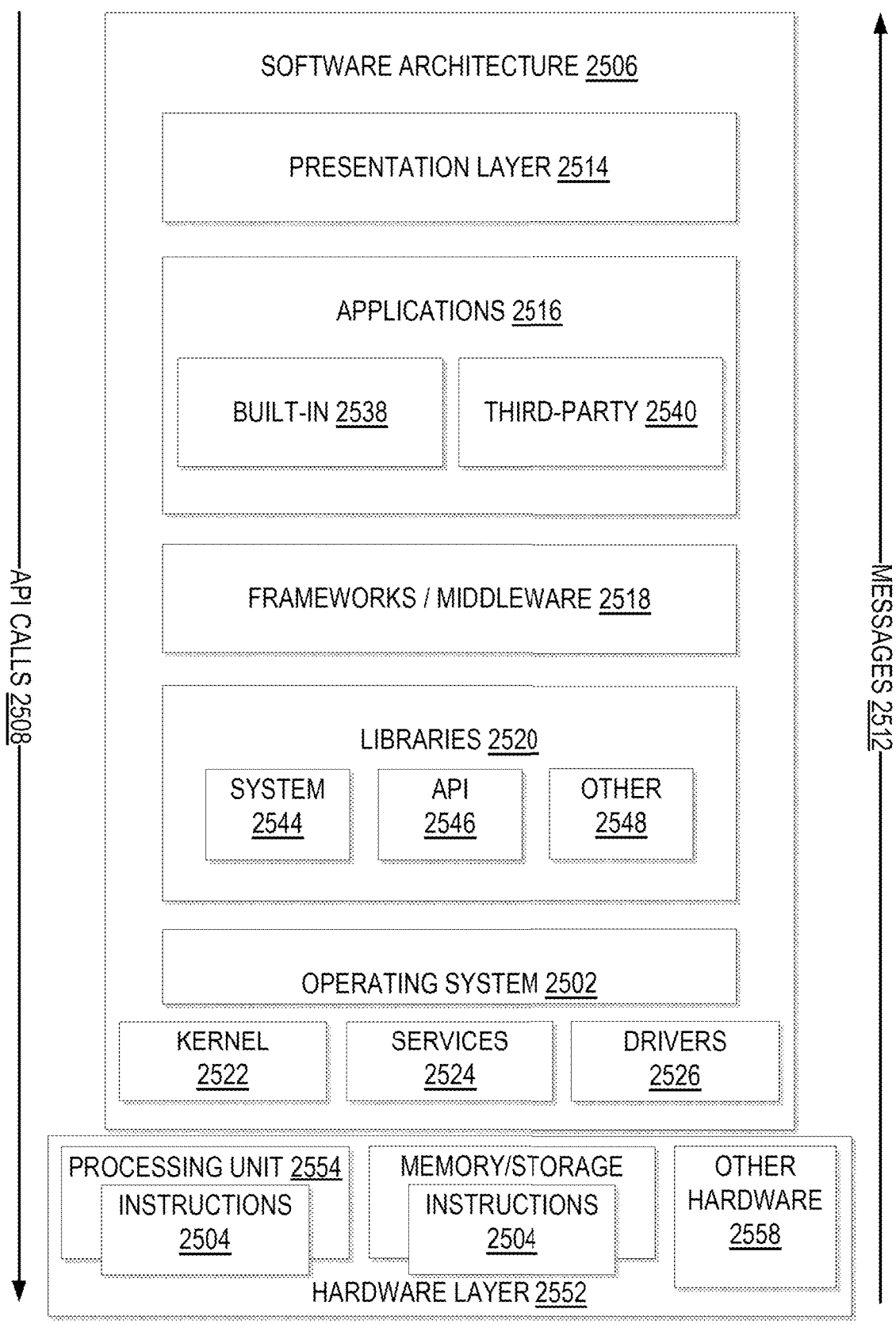
FIG. 25 is a block diagram illustrating a representative software architecture, which may be used in conjunction with various hardware architectures herein described.

FIG. 25 is a block diagram illustrating an example software architecture 2506, which may be used in conjunction with various hardware architectures herein described. FIG. 25 is a non-limiting example of a software architecture, and it will be appreciated that many other architectures may be implemented to facilitate the functionality described herein. The software architecture 2506 may execute on hardware such as a machine 2600 of FIG. 26 that includes, among other things, processors 2604, memory 2614, and I/O components 2618. A representative hardware layer 2552 is illustrated and can represent, for example, the machine 2600 of FIG. 26. The representative hardware layer 2552 includes a processing unit 2554 having associated executable instructions 2504. The executable instructions 2504 represent the executable instructions of the software architecture 2506, including implementation of the methods, components, and so forth described herein. The hardware layer 2552 also includes memory and/or storage modules memory/storage 2556, which also have the executable instructions 2504. The hardware layer 2552 may also comprise other hardware 2558.

In the example architecture of FIG. 25, the software architecture 2506 may be conceptualized as a stack of layers where each layer provides particular functionality. For example, the software architecture 2506 may include layers such as an operating system 2502, libraries 2520, frameworks/middleware 2518, applications 2516, and a presentation layer 2514. Operationally, the applications 2516 and/or other components within the layers may invoke application programming interface (API) calls 2508 through the software stack and receive a response in the form of messages 2508. The layers illustrated are representative in nature, and not all software architectures have all layers. For example, some mobile or special-purpose operating systems may not provide a frameworks/middleware 2518, while others may provide such a layer. Other software architectures may include additional or different layers.

The operating system 2502 may manage hardware resources and provide common services. The operating system 2502 may include, for example, a kernel 2522, services 2524, and drivers 2526. The kernel 2522 may act as an abstraction layer between the hardware and the other software layers. For example, the kernel 2522 may be responsible for memory management, processor management (e.g., scheduling), component management, networking, security settings, and so on. The services 2524 may provide other common services for the other software layers. The drivers 2526 are responsible for controlling or interfacing with the underlying hardware. For instance, the drivers 2526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2520 provide a common infrastructure that is used by the applications 2516 and/or other components and/or layers. The libraries 2520 provide functionality that allows other software components to perform tasks in an easier fashion than by interfacing directly with the underlying operating system 2502 functionality (e.g., kernel 2522, services 2524, and/or drivers 2526). The libraries 2520 may include system libraries 2544 (e.g., C standard library) that may provide functions such as memory allocation functions, string manipulation functions, mathematical functions, and the like. In addition, the libraries 2520 may include API libraries 2546 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 2520 may also include a wide variety of other libraries 2548 to provide many other APIs to the applications 2516 and other software components/modules.

The frameworks/middleware 2518 provides a higher-level common infrastructure that may be used by the applications 2516 and/or other software components/modules. For example, the frameworks/middleware 2518 may provide various graphic user interface (GUI) functions, high-level resource management, high-level location services, and so forth. The frameworks/middleware 2518 may provide a broad spectrum of other APIs that may be utilized by the applications 2516 and/or other software components/modules, some of which may be specific to a particular operating system 2502 or platform.

The applications 2516 include built-in applications 2538 and/or third-party applications 2540. Examples of representative built-in applications 2538 may include, but are not limited to, a contacts application, a browser application, a book reader application, a location application, a media application, a messaging application, and/or a game application. The third-party applications 2540 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 2540 may invoke the API calls 2508 provided by the mobile operating system (such as the operating system 2502) to facilitate functionality described herein.

The applications 2516 may use built-in operating system 2502 functions (e.g., kernel 2522, services 2524, and/or drivers 2526), libraries 2520, and frameworks/middleware 2518 to create user interfaces to interact with users of the system. Alternatively, or additionally, in some systems interactions with a user may occur through a presentation layer, such as the presentation layer 2514. In these systems, the application/component "logic" can be separated from the aspects of the application/component that interact with a user.

Hardware Architecture

Figure 26:
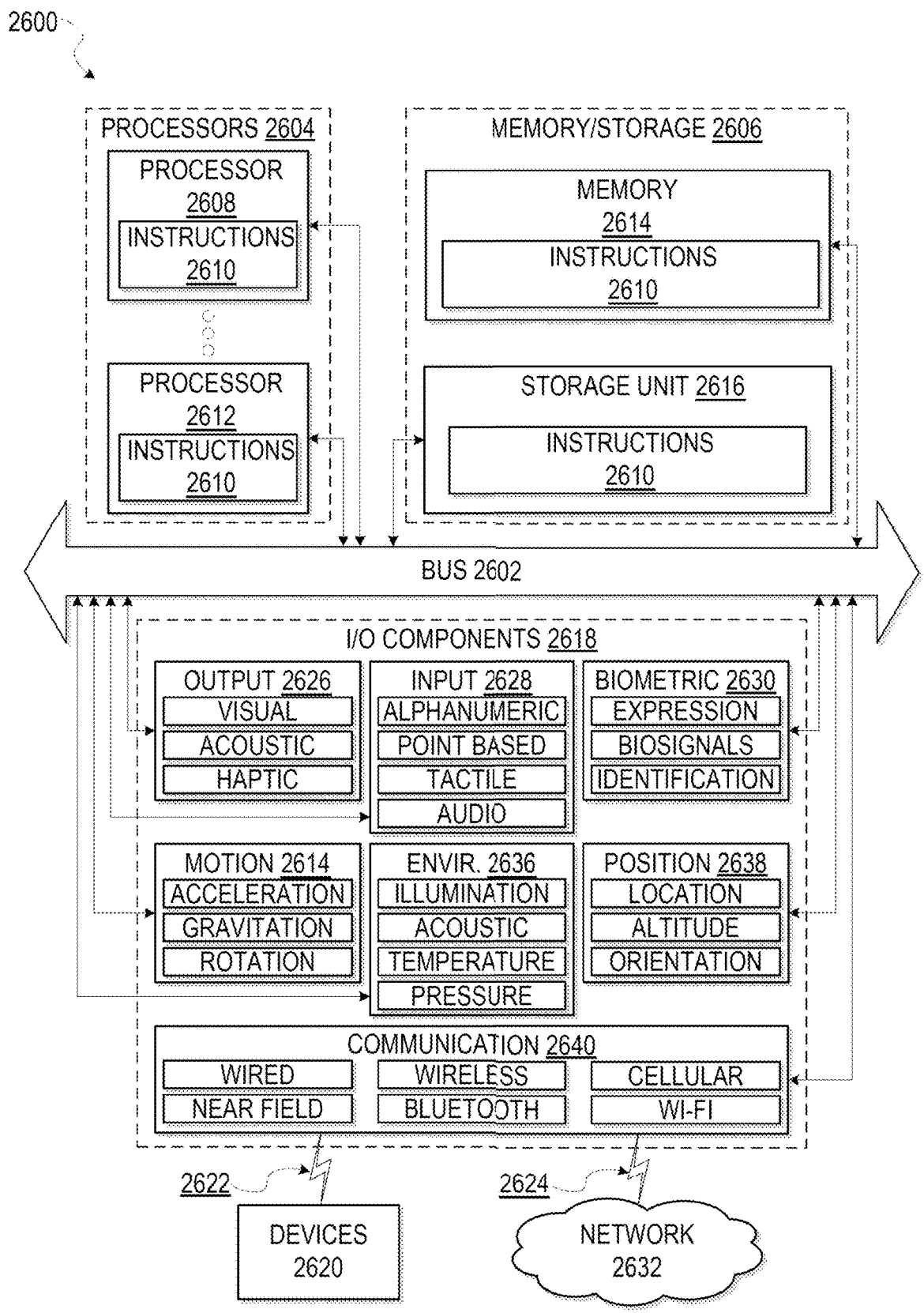
FIG. 26 is a block diagram illustrating components of a machine, according to some examples, able to read instructions from a machine-readable medium (e.g., a machine-readable storage medium) and perform any one or more of the methodologies discussed herein.

FIG. 26 is a block diagram illustrating components of a machine 2600, according to some examples, able to read instructions from a machine-readable medium (e.g., a machine-readable storage medium) and perform any one or more of the methodologies discussed herein. Specifically, FIG. 26 shows a diagrammatic representation of the machine 2600 in the example form of a computer system, within which instructions 2610 (e.g., software, a program, an application, an applet, an app, or other executable code) for causing the machine 2600 to perform any one or more of the methodologies discussed herein may be executed. As such, the instructions 2610 may be used to implement modules or components described herein. The instructions 2610 transform the general, non-programmed machine 2600 into a particular machine 2600 programmed to carry out the described and illustrated functions in the manner described. In alternative examples, the machine 2600 operates as a standalone device or may be coupled (e.g., networked) to other machines. In a networked deployment, the machine 2600 may operate in the capacity of a server machine or a client machine in a server-client network environment, or as a peer machine in a peer-to-peer (or distributed) network environment. The machine 2600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2610, sequentially or otherwise, that specify actions to be taken by the machine 2600. Further, while only a single machine 2600 is illustrated, the term "machine" shall also be taken to include a collection of machines that individually or jointly execute the instructions 2610 to perform any one or more of the methodologies discussed herein. In this respect, a game server as described in some examples in some examples comprise an interconnected collection of server machines and/or computer devices providing one or more computer processors respectively.

The machine 2600 may include processors 2604, memory/storage 2606, and I/O components 2618, which may be configured to communicate with each other such as via a bus 2602. The memory/storage 2606 may include a memory 2614, such as a main memory, or other memory storage, and a storage unit 2616, both accessible to the processors 2604 such as via the bus 2602. The storage unit 2616 and memory 2614 store the instructions 2610 embodying any one or more of the methodologies or functions described herein. The instructions 2610 may also reside, completely or partially, within the memory 2614, within the storage unit 2616, within at least one of the processors 2604 (e.g., within the processor's cache memory), or any suitable combination thereof, during execution thereof by the machine 2600. Accordingly, the memory 2614, the storage unit 2616, and the memory of the processors 2604 are examples of machine-readable media. In some examples, the processors 2604 comprise a number of distributed processors 2608-2612, each of which have access to associated memories storing instructions 2610.

The I/O components 2618 may include a wide variety of components to receive input, provide output, produce output, transmit information, exchange information, capture measurements, and so on. The specific I/O components 2618 that are included in a particular machine 2600 will depend on the type of machine. For example, portable machines such as mobile phones will likely include a touch input device or other such input mechanisms, while a headless server machine will likely not include such a touch input device. It will be appreciated that the I/O components 2618 may include many other components that are not shown in FIG. 26. The I/O components 2618 are grouped according to functionality merely for simplifying the following discussion, and the grouping is in no way limiting. In various examples, the I/O components 2618 may include output components 2626 and input components 2628. The output components 2626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2628 may include alphanumeric input components (e.g., a keyboard, a touchscreen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touchscreen that provides location and/or force of touches or touch gestures, or other tactile input components), audio input components (e.g., a microphone), and the like.

In further examples, the I/O components 2618 may include biometric components 2630, motion components 2634, environment components 2636, or position components 2638 among a wide array of other components. For example, the biometric components 2630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2634 may include acceleration sensor components (e.g., accelerometer), gravitation sensor components, rotation sensor components (e.g., gyroscope), and so forth. The environment components 2636 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 2638 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2618 may include communication components 2640 operable to couple the machine 2600 to a network 2632 or devices 2620 via a coupling 2624 and a coupling 2622 respectively. For example, the communication components 2640 may include a network interface component or other suitable device to interface with the network 2632. In further examples, the communication components 2640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2620 may be another machine or any of a wide variety of peripheral devices (e.g., a peripheral device coupled via a Universal Serial Bus (USB)).

Moreover, the communication components 2640 may detect identifiers or include components operable to detect identifiers. For example, the communication components 2640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2640, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible media to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronic system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

"MACHINE-READABLE MEDIUM" in this context refers to a component, a device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), or any combination thereof. A processor may further be a multi-core processor having two or more independent processors (sometimes referred to as "cores") that may execute instructions contemporaneously.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated, unless that the context and/or logic clearly indicates otherwise. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed subject matter has been described with reference to specific examples, various modifications and changes may be made to these examples without departing from the broader scope of examples of the present disclosure.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. The specification and drawings are, accordingly, to be regarded in an illustrative rather than a restrictive sense.

What is claimed is:

1. A method implemented at a game server, the method comprising:
   receiving, at the game server, data associated with gameplay of a target subset of user accounts used for playing a designated game;
   computing, based on the received gameplay data, a player model representing previous in-game behavior of the target subset of user accounts;
   generating, based on the player model, custom configuration values for the designated game, wherein the custom configuration values represent data to specify operation of the designated game according to a variant game mechanics configuration uniquely customized for player behavior consistent with the player model; and
   causing transmission of the custom configuration values to a client device associated with a member of the target subset, the custom configuration values enabling implementation of the variant game mechanics configuration by a game engine at the client device.

2. The method of claim 1, wherein the custom configuration values further comprise a custom game parameter configuration, and wherein the custom configuration values represent one or more of: a custom player configuration, a custom event configuration, a custom level configuration, and a custom scoring configuration.

3. The method of claim 1, wherein the custom configuration values are transmitted to the client device in a standalone data payload over the air, the standalone data payload being transmitted directly from the game server to the client device, without passing through an application store server.

4. The method of claim 1, wherein the client device stores the game engine, wherein the game engine is configurable using the custom configuration values, and wherein the custom configuration values do not modify software of the game engine and are stored externally to the software of the game engine.

5. The method of claim 1, wherein the previous in-game behavior of the target subset of user accounts comprises playing the designated game.

6. The method of claim 1, wherein the game engine is for playing, at the client device, a plurality of games including the designated game.

7. A method implemented at a client device, the method comprising:
   storing, in a memory of the client device, a game engine for playing a designated game;
   receiving, over a network, custom configuration values for the designated game, custom configuration values for the designated game, wherein the custom configuration values represent data to specify operation of the designated game according to a variant game mechanics configuration uniquely customized for player behavior consistent with a player model representative of historical in-game behaviour of a player subset of which a user account associated with the client device is a member; and
   adjusting game mechanics implemented by the game engine based on the received custom configuration values, thereby to implement the variant game mechanics configuration, without modifying software of the game engine.

8. The method of claim 7, wherein the custom configuration values further comprise a custom game parameter configuration, and wherein the custom configuration values represent one or more of: a custom player configuration, a custom event configuration, a custom level configuration, and a custom scoring configuration.

9. The method of claim 7, wherein the custom configuration values are received, at the client device, in a standalone data payload over the air, the standalone data payload being transmitted directly from a game server to the client device, without passing through an application store server.

10. The method of claim 9, further comprising:
    receiving the game engine from the application store server.

11. The method of claim 7, further comprising:
    storing, at the client device, the custom configuration values externally to the game engine.

12. The method of claim 7, wherein the game engine for playing a plurality of games, including the designated game.

13. A non-transitory machine-readable medium storing instructions which, when executed by a game server, cause the game server to perform operations comprising:
    receiving, at the game server, data associated with gameplay of a target subset of user accounts used for playing a designated game;
    computing, based on the received gameplay data, a player model representing previous in-game behavior of the target subset of user accounts;
    generating, based on the player model, custom configuration values for the designated game, wherein the custom configuration values represent data to specify operation of the designated game according to a variant game mechanics configuration uniquely customized for player behavior consistent with the player model; and
    causing transmission of the custom configuration values to a client device associated with a member of the target subset, the custom configuration values enabling implementation of the variant game mechanics configuration by a game engine at the client device.

14. The machine-readable medium of claim 13, wherein the custom configuration values further comprise a custom game parameter configuration, and wherein the custom configuration values represent one or more of: a custom player configuration, a custom event configuration, a custom level configuration, and a custom scoring configuration.

15. The machine-readable medium of claim 13, wherein the custom configuration values are transmitted to the client device in a standalone data payload over the air, the standalone data payload being transmitted directly from the game server to the client device, without passing through an application store server.

16. The machine-readable medium of claim 13, wherein the client device stores the game engine, wherein the game engine is configurable using the custom configuration values, and wherein the custom configuration values do not modify software of the game engine and are stored externally to the software of the game engine.

17. The machine-readable medium of claim 13, wherein the previous in-game behavior of the target subset of user accounts comprises playing the designated game.

18. The machine-readable medium of claim 13, wherein the game engine is for playing, at the client device, a plurality of games including the designated game.

\* \* \* \* \*

UNITED STATES PATENT AND TRADEMARK OFFICE
CERTIFICATE OF CORRECTION

| | |
|---|---|
| PATENT NO. | : 11,806,624 B2 |
| APPLICATION NO. | : 16/948502 |
| DATED | : November 7, 2023 |
| INVENTOR(S) | : Dicken et al. |

It is certified that error appears in the above-identified patent and that said Letters Patent is hereby corrected as shown below:

In the Drawings

Sheet 40 of 40, Fig. 26, reference numeral 2614 (Second Occurrence), Line 1, delete "2614" and insert --2634-- therefor In the Specification In Column 9, Line 25, delete "s" and insert --system-- therefor In Column 17, Line 49, delete "s" and insert --system-- therefor In Column 18, Line 52, delete "s" and insert --system-- therefor In Column 20, Table 1, Ordinal Slot 23, Line 2, delete "bombsused" and insert --bombs used-- therefor In Column 20, Table 1, Ordinal Slot 27, Line 2, delete "purchse-hints" and insert --purchase-hints-- therefor In Column 20, Table 1, Ordinal Slot 28, Line 2, delete "purchse-bombs" and insert --purchase-bombs-- therefor In Column 20, Table 1, Ordinal Slot 28, Line 2, delete "bones" and insert --bombs-- therefor In Column 20, Table 1, Ordinal Slot 29, Line 2, delete "purchse-score" and insert --purchase-score-- therefor In Column 20, Table 1, Ordinal Slot 30, Line 2, delete "purchse-big" and insert --purchase-big-- therefor Signed and Sealed this
Third Day of September, 2024

Katherine Kelly Vidal
*Director of the United States Patent and Trademark Office*

CERTIFICATE OF CORRECTION (continued)
U.S. Pat. No. 11,806,624 B2

In Column 20, Table 1, Ordinal Slot 31, Line 2, delete "purchse-letter" and insert --purchase-letter-- therefor In Column 20, Table 1, Ordinal Slot 37, Line 2, delete "purchsed-hints" and insert --purchased-hints-- therefor In Column 20, Table 1, Ordinal Slot 38, Line 2, delete "purchsed-bombs" and insert --purchased-bombs-- therefor In Column 20, Table 1, Ordinal Slot 39, Line 2, delete "purchsed-score" and insert --purchased-score-- therefor In Column 20, Table 1, Ordinal Slot 40, Line 2, delete "purchsed-big" and insert --purchased-big-- therefor In Column 20, Table 1, Ordinal Slot 41, Line 2, delete "purchsed-letter" and insert --purchased-letter-- therefor In Column 25, Line 18, delete "s" and insert --system-- therefor In Column 29, Line 21, delete "s" and insert --system-- therefor In Column 31, Line 35, delete "s" and insert --system-- therefor In Column 38, Line 7, delete "player player" and insert --player-- therefor In Column 38, Line 34, delete "method method" and insert --method-- therefor In Column 39, Line 49, delete "that that" and insert --that-- therefor